(12) United States Patent
Nakayasu et al.

(10) Patent No.: US 6,198,896 B1
(45) Date of Patent: Mar. 6, 2001

(54) IMAGE FORMATION APPARATUS CAPABLE OF DETECTING AND CORRECTING POSITIONAL OFFSETS

(75) Inventors: Hirofumi Nakayasu; Tsutomu Nagatomi, both of Kawaski (JP)

(73) Assignee: Fujisu Limited, Kawasaki (JP)

( * ) Notice: Subject to any disclaimer, the term of this patent is extended or adjusted under 35 U.S.C. 154(b) by 0 days.

(21) Appl. No.: 09/234,455

(22) Filed: Jan. 21, 1999

(30) Foreign Application Priority Data

Mar. 20, 1998 (JP) .................................................. 10-072089

(51) Int. Cl.⁷ .................................................. G03G 15/01
(52) U.S. Cl. ............................................. 399/301; 347/116
(58) Field of Search ........................... 399/301.39, 40.41; 347/116; 382/112; 356/429

(56) References Cited

U.S. PATENT DOCUMENTS

| | | | |
|---|---|---|---|
| 4,912,491 | * 3/1990 | Hoshino et al. | 347/116 |
| 4,916,547 | 4/1990 | Katasumata et al. | 358/300 |
| 5,523,823 | 6/1996 | Ashikaga . | |
| 5,550,625 | * 8/1996 | Takamatsu et al. | 399/301 |
| 5,587,771 | * 12/1996 | Mori et al. | 347/116 |
| 5,627,649 | 5/1997 | Sawayama | 358/296 |
| 5,729,353 | * 3/1998 | Sawayama et al. | 347/116 X |
| 5,768,671 | * 6/1998 | Komiya et al. | 399/301 |
| 5,778,280 | * 7/1998 | Komiya et al. | 347/166 X |
| 5,875,380 | * 2/1999 | Iwata et al. | 399/301 |
| 5,881,346 | * 3/1999 | Mori et al. | 399/301 |
| 5,909,235 | * 6/1999 | Folkins | 347/116 X |
| 5,946,523 | * 8/1999 | Fujioka et al. | 399/303 X |
| 5,946,537 | * 8/1999 | Nakayasu et al. | 399/301 |

FOREIGN PATENT DOCUMENTS

| | | |
|---|---|---|
| 0 717 323 | * 6/1996 | (EP) . |
| 0 744 669 A2 | 11/1996 | (EP) . |
| 0 789 283 A2 | 8/1997 | (EP) . |
| 63-271275 | 11/1988 | (JP) . |
| 05-301384 | * 11/1993 | (JP) . |
| 08-227195 | * 9/1996 | (JP) . |

OTHER PUBLICATIONS

European Search Report

* cited by examiner

*Primary Examiner*—William J. Royer
(74) *Attorney, Agent, or Firm*—Armstrong, Westerman, Hattori, McLeland & Naughton, LLP

(57) ABSTRACT

By means of a plurality of image carrying units, a correction mark formation unit transfers mixed color mark trains in right and left lines onto a moving member in the form of a belt. The mixed color mark trains serve as marks for correcting image offsets between color images and each consist of K-C, K-M and K-Y two-color marks which are superposed on each other in an offset manner. A correction value calculation unit detects a lightness pattern of the mixed color mark trains transferred onto the moving member and figures out correction values for image offsets between color images from the phase of this lightness pattern. A positional offset correction unit automatically corrects the offsets between the color images on the basis of the correction values acquired by the correction value calculation unit.

39 Claims, 49 Drawing Sheets

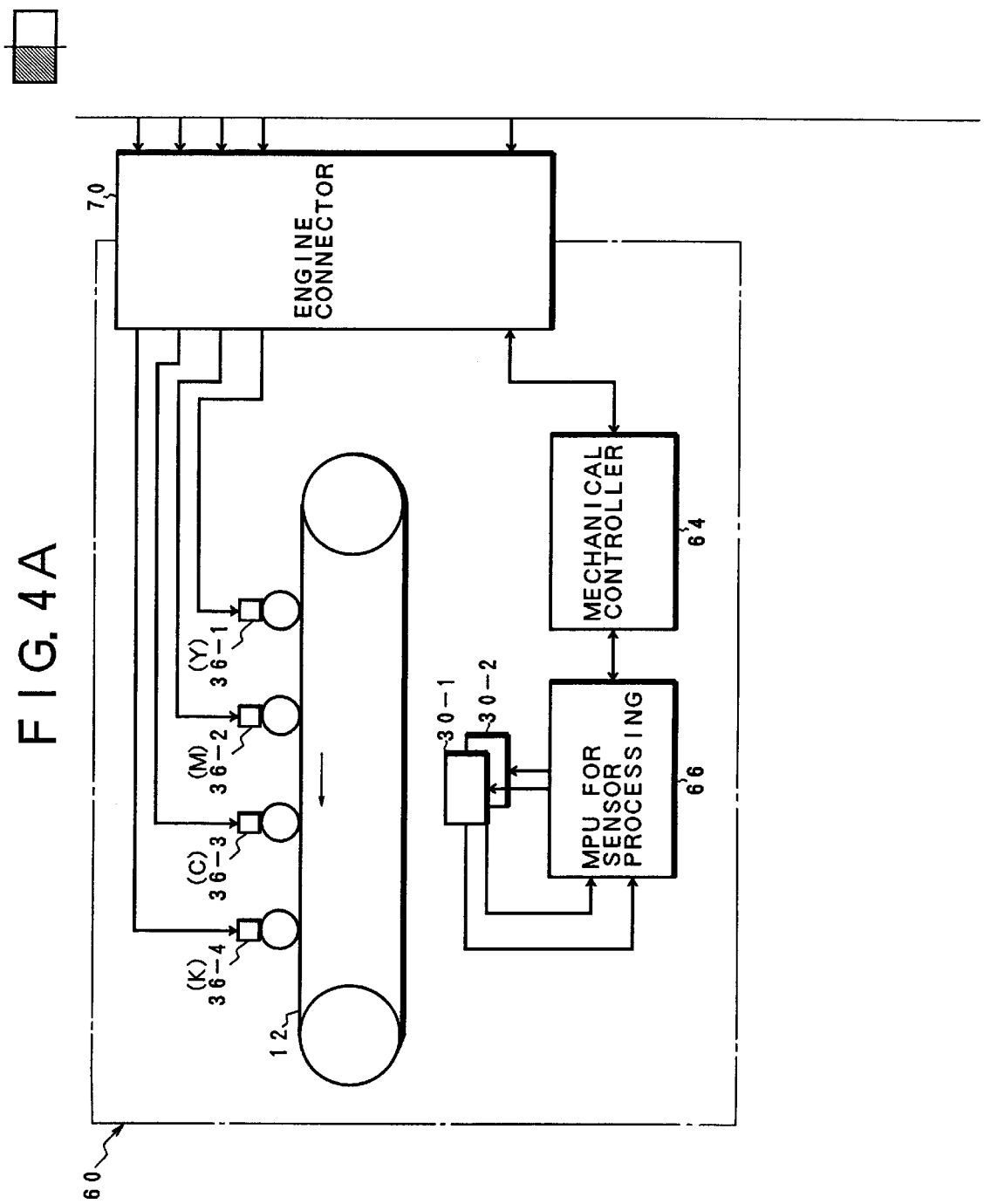

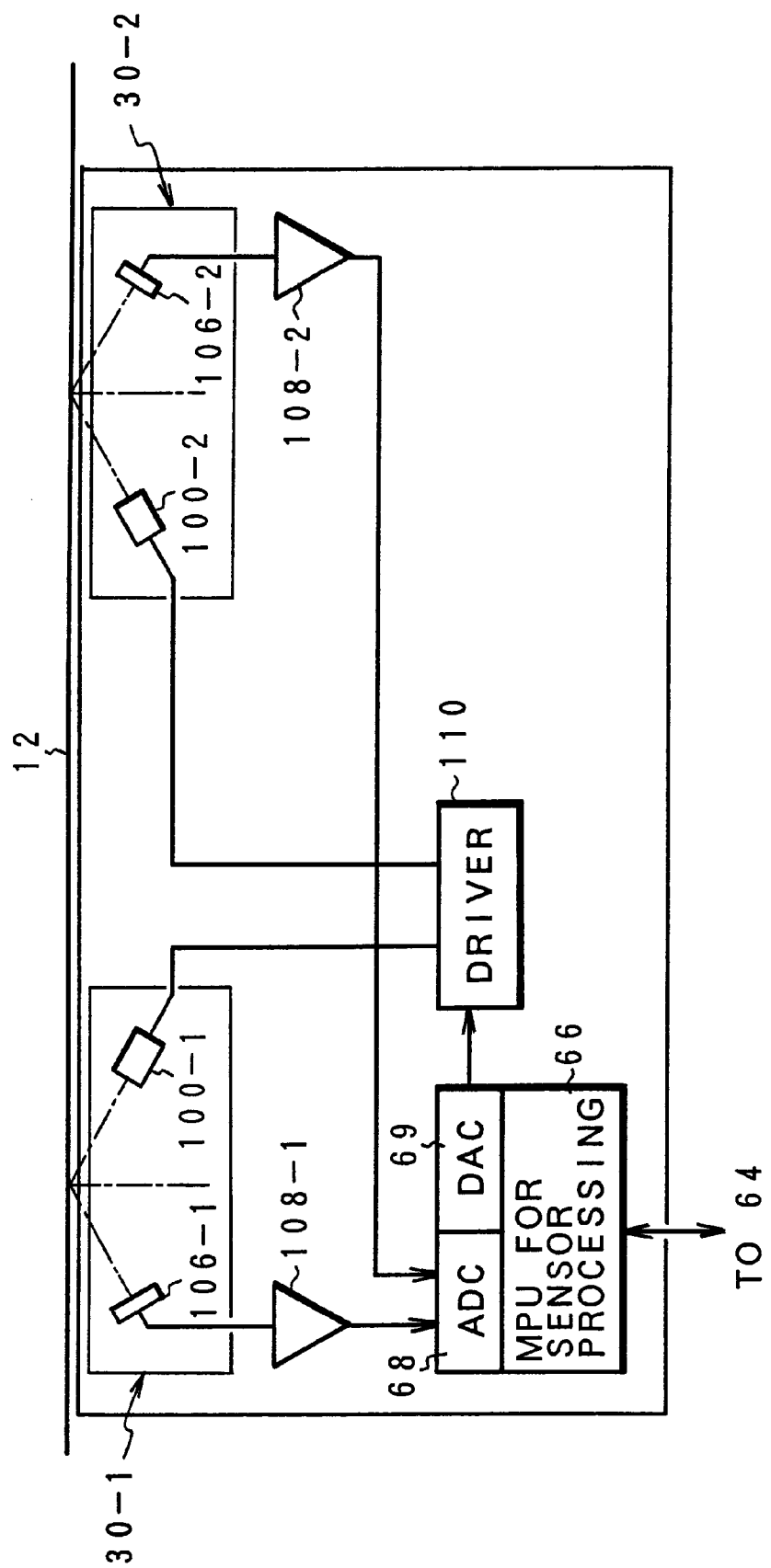

F I G. 8
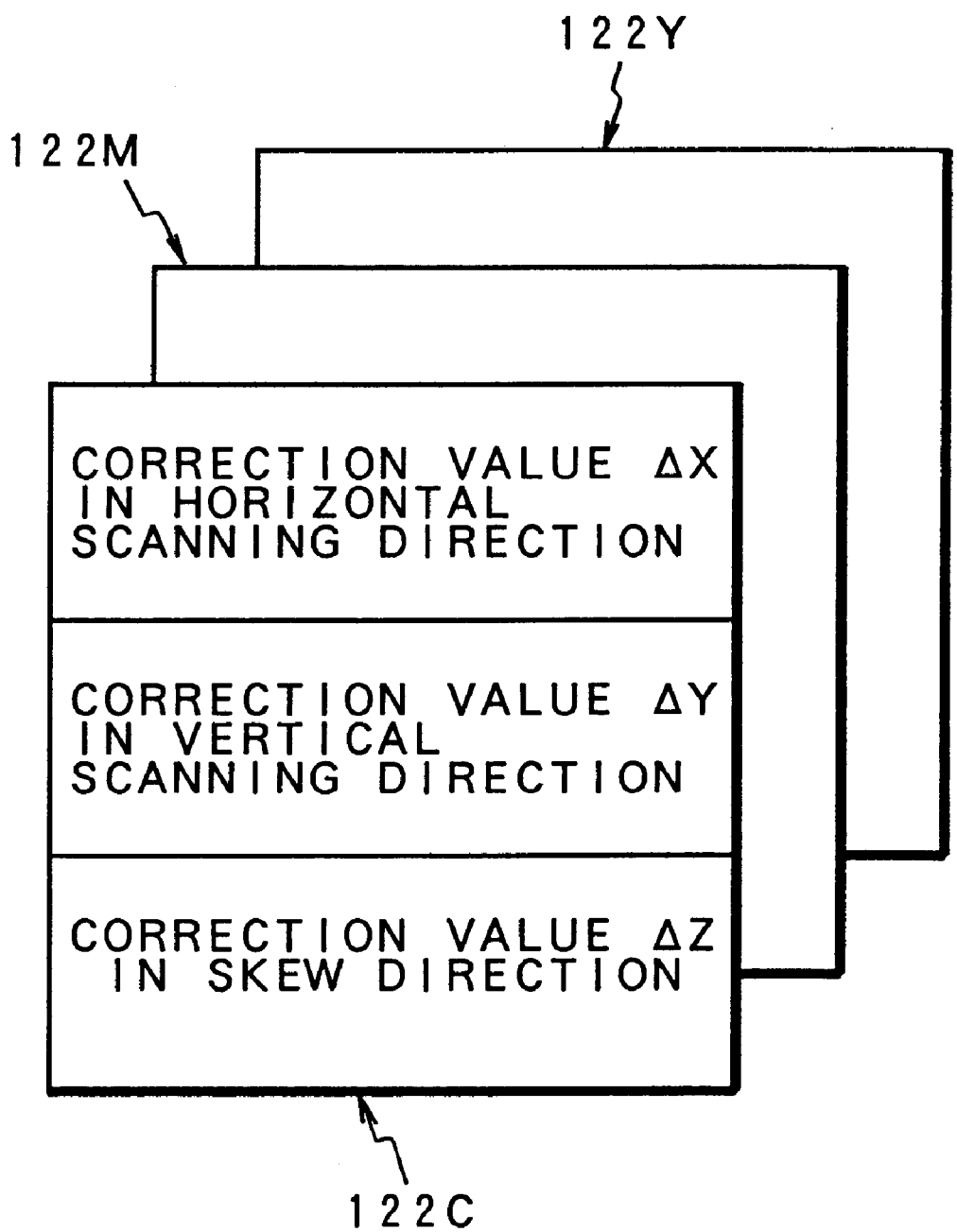

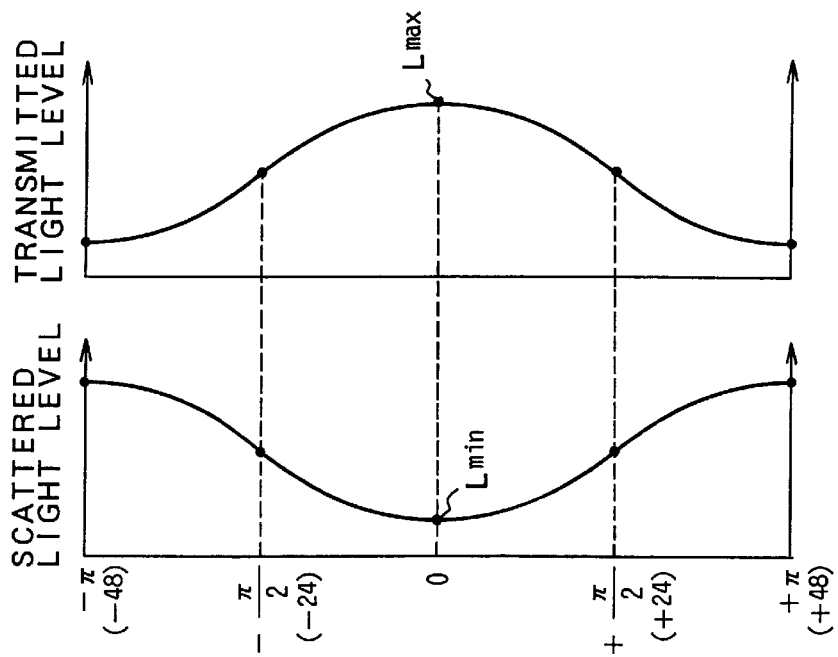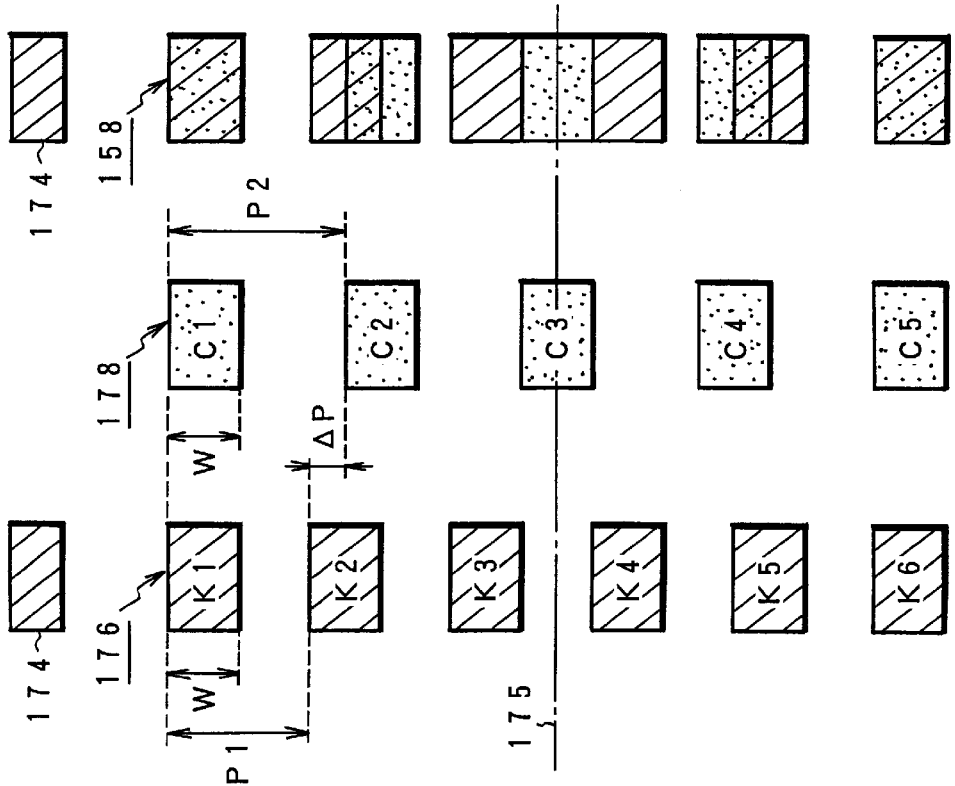

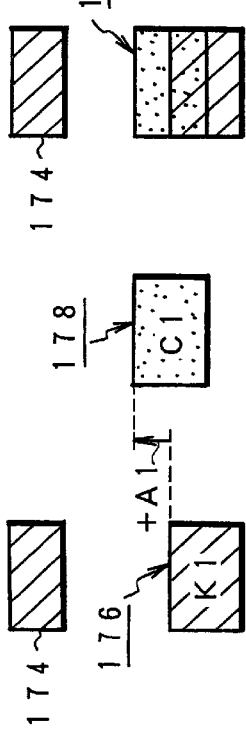
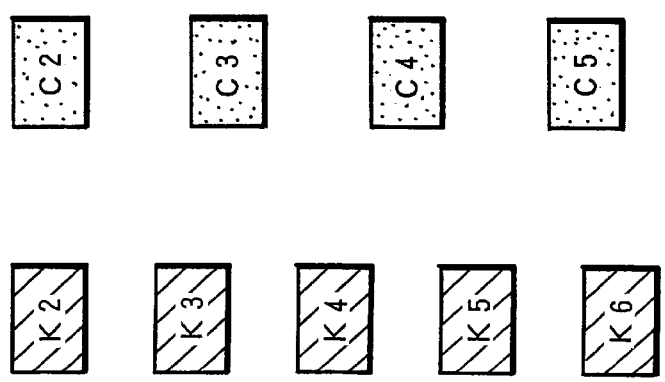
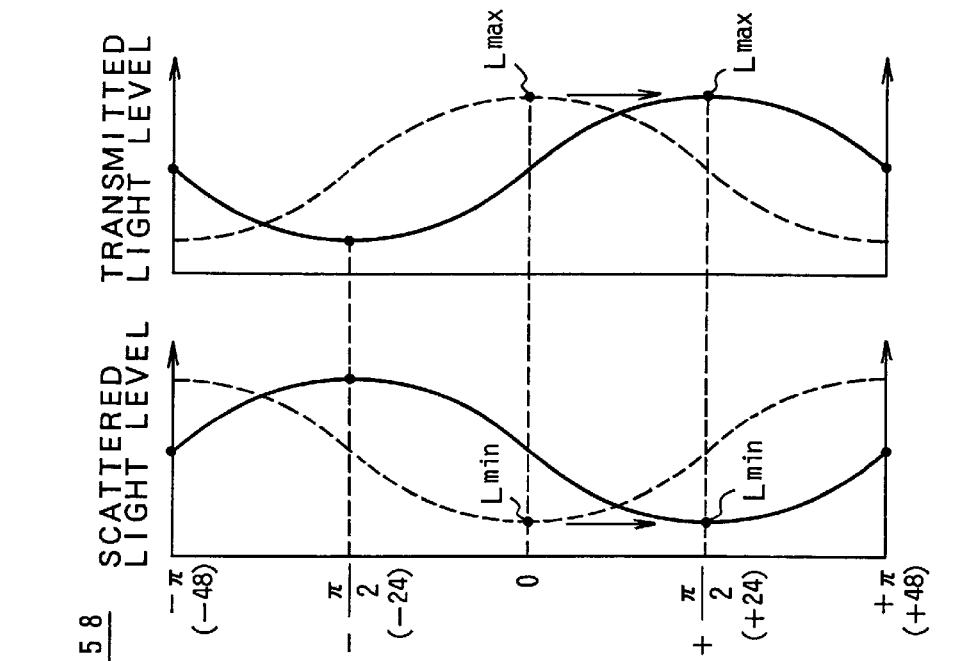
FIG. 19A
FIG. 19B
FIG. 19C
FIG. 19D
FIG. 19E

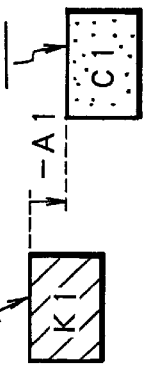
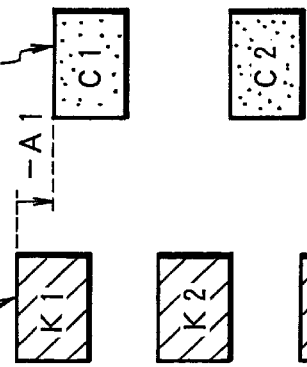
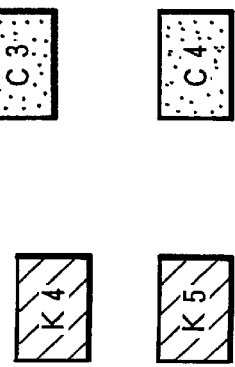
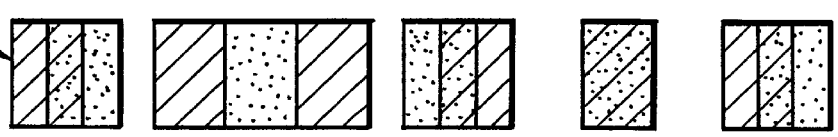
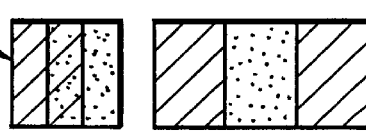
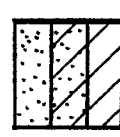
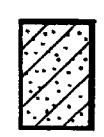
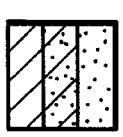
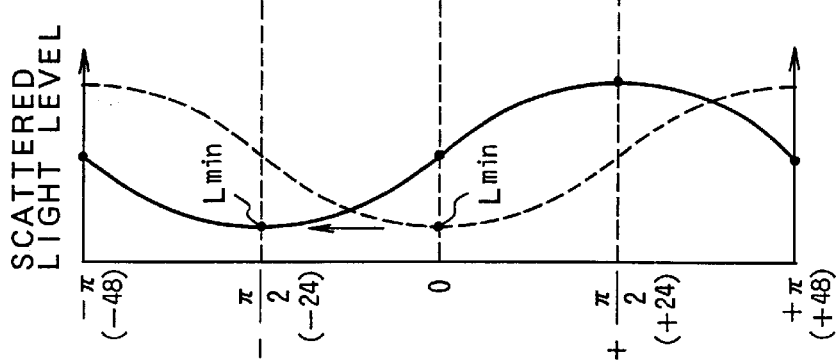
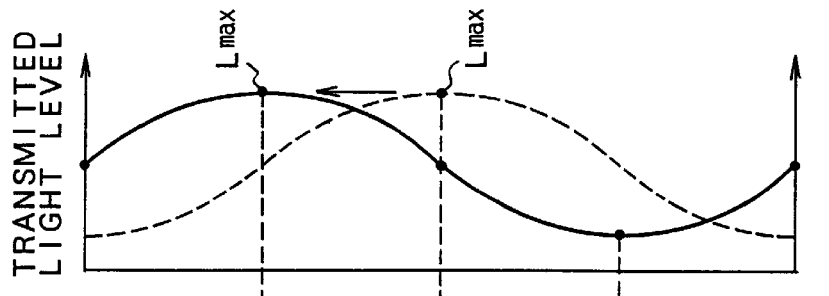

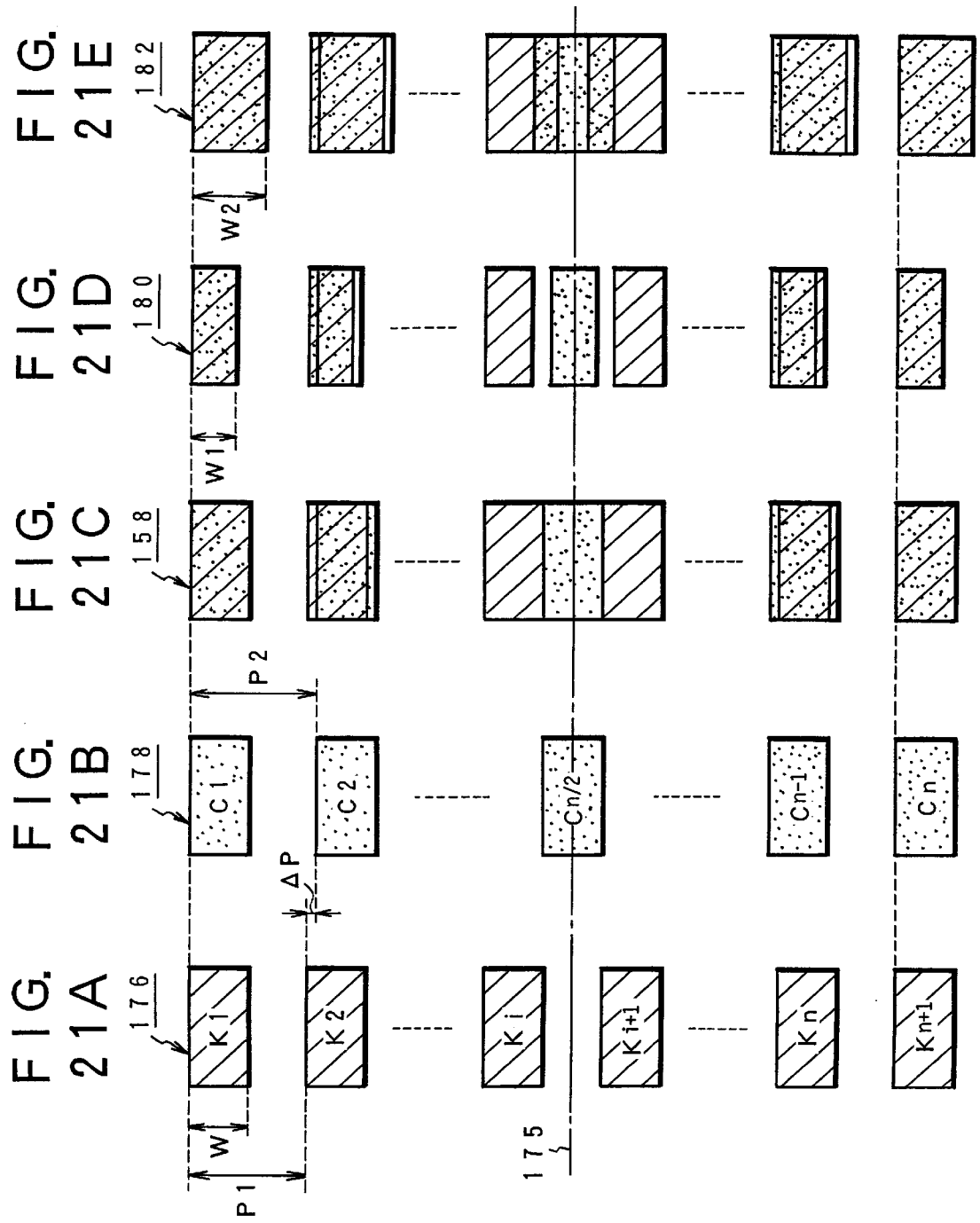

F I G. 29A    F I G. 29B
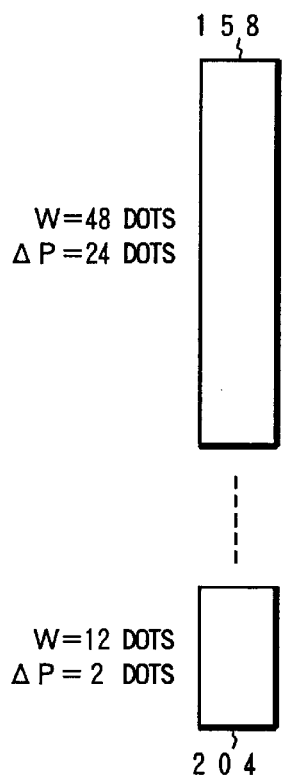
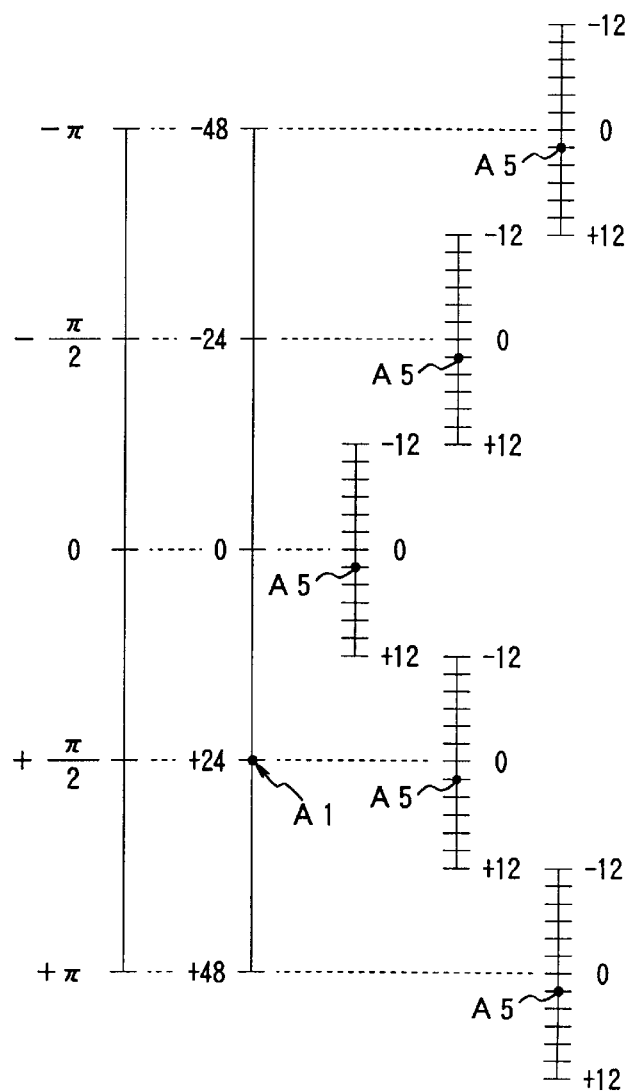

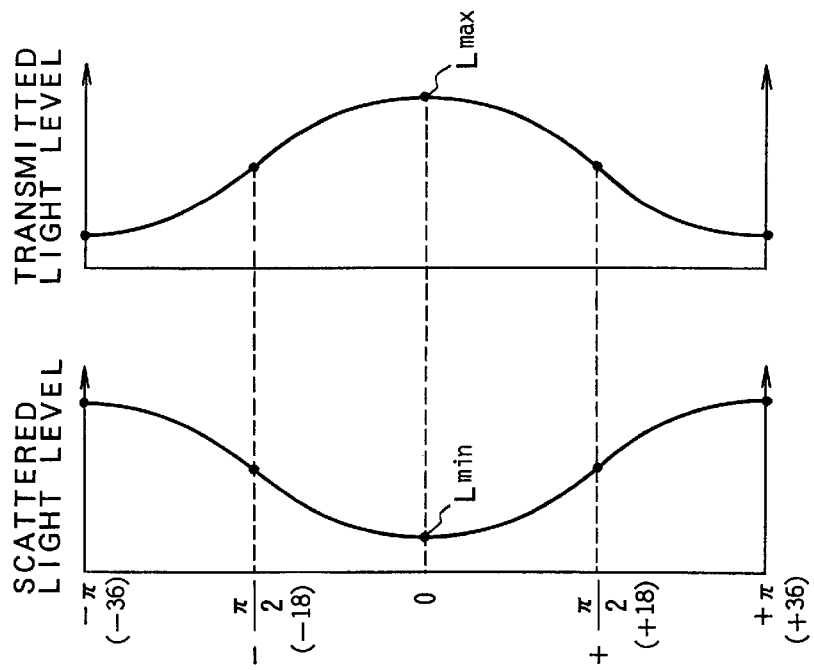
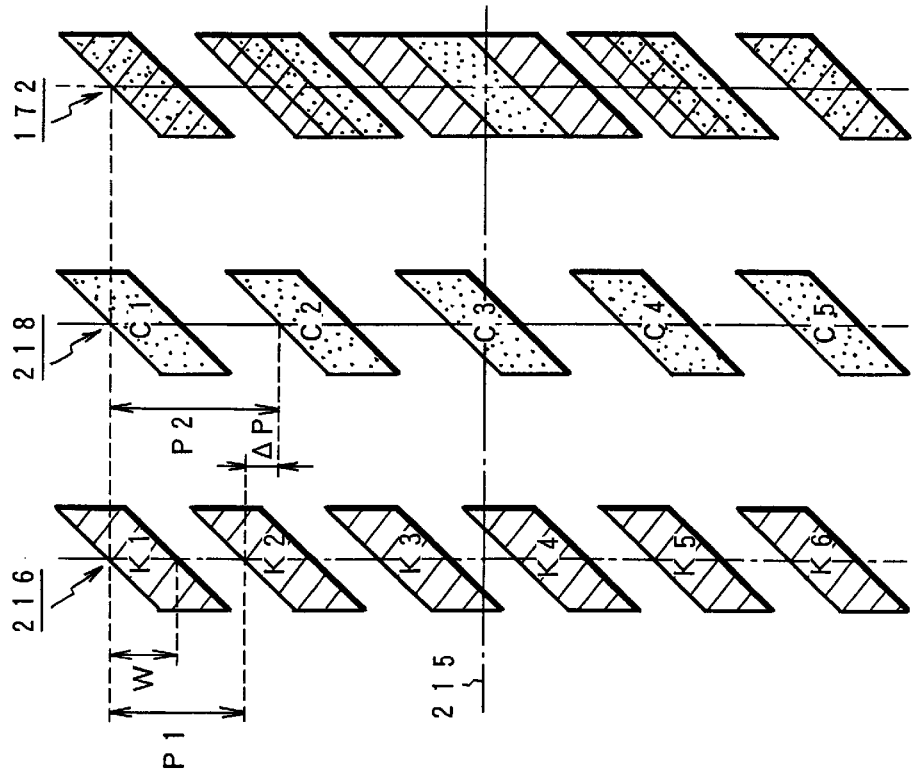

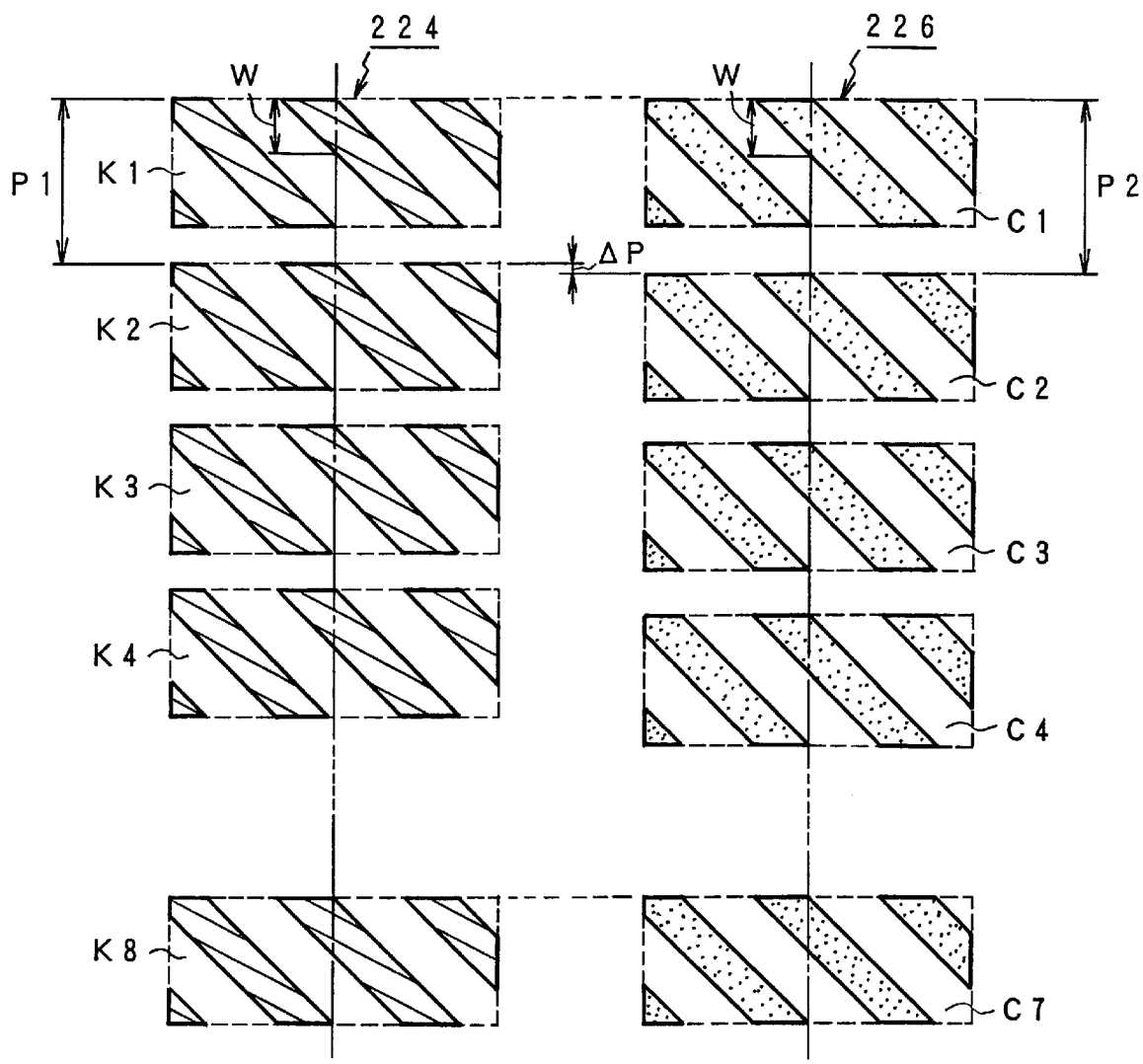

FIG. 40A

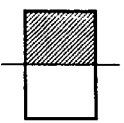

CORRECTION VALUE CALCULATION PROCESSING

S1 — CALCULATE CORRECTION VALUE ΔY IN VERTICAL SCANNING DIRECTION ON THE BASIS OF AMOUNT OF OFFSET A1l OF LEFT-HAND TRANSVERSE LINE MARK AND AMOUNT OF OFFSET A5r OF FINE TRANSVERSE LINE MARK
(1) LEFT-HAND AMOUNT OF OFFSET Bl IN VERTICAL SCANNING DIRECTION
= ROUNDED OFF (A1l − A5l) + A5l
(2) CORRECTION VALUE ΔY IN VERTICAL SCANNING DIRECTION
= ROUNDED OFF (3 × Bl)

S2 — CALCULATE CORRECTION VALUE ΔZ IN SKEW DIRECTION ON THE BASIS OF AMOUNT OF OFFSET A1r OF RIGHT-HAND SLANTED LINE MARK AND AMOUNT OF OFFSET A5r OF FINE TRANSVERSE LINE MARK
(1) RIGHT-HAND AMOUNT OF OFFSET Br IN VERTICAL SCANNING DIRECTION
= ROUNDED OFF (A1r − A5 + 0.5) + A5r
(2) CORRECTION VALUE ΔY IN VERTICAL SCANNING DIRECTION
= ROUNDED OFF {3 × (Br − Bl)}

S3 — CALCULATE LEFT-HAND CORRECTION VALUE ΔXl IN HORIZONTAL SCANNING DIRECTION
(1) CALCULATE COMBINED AMOUNT OF OFFSET Cl IN HORIZONTAL AND VERTICAL SCANNING DIRECTIONS FROM AMOUNTS OF OFFSET A2l AND A3l OF LEFT-HAND SLANTED LINE MARK AND LEFTWARDLY UPWARD SLANTED FINE LINE MARK
Cl = ROUNDED OF (A2l − A3l) + A3l
(2) CALCULATE AMOUNT OF OFFSET Dl IN HORIZONTAL SCANNING DIRECTION
(3) CALCULATE AMOUNT OF OFFSET El IN HORIZONTAL SCANNING DIRECTION FROM AMOUNTS OF OFFSET A3l AND A4l OF RIGHT AND LEFT SLANTED LINE MARKS
El = A3l − A4l
(4) CALCULATE LEFT-HAND CORRECTION VALUE ΔXl IN HORIZONTAL SCANNING DIRECTION
ΔXl = ROUNDED OFF (Dl − El) + El

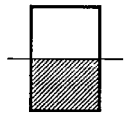
FIG. 40B
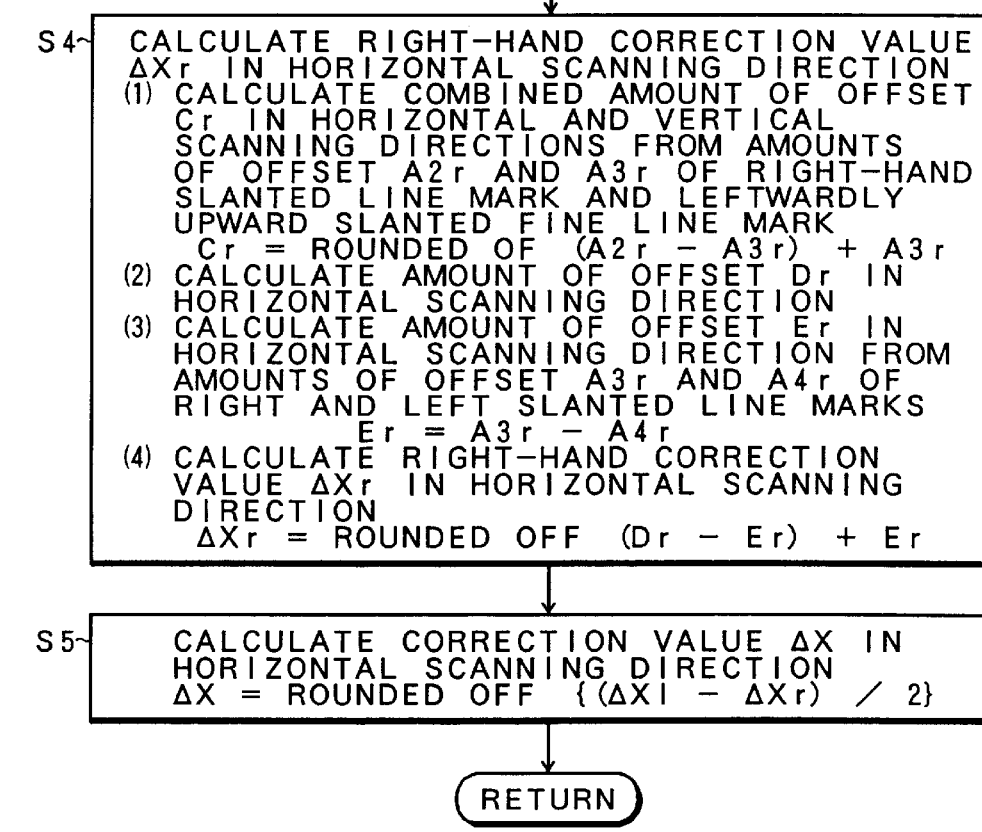

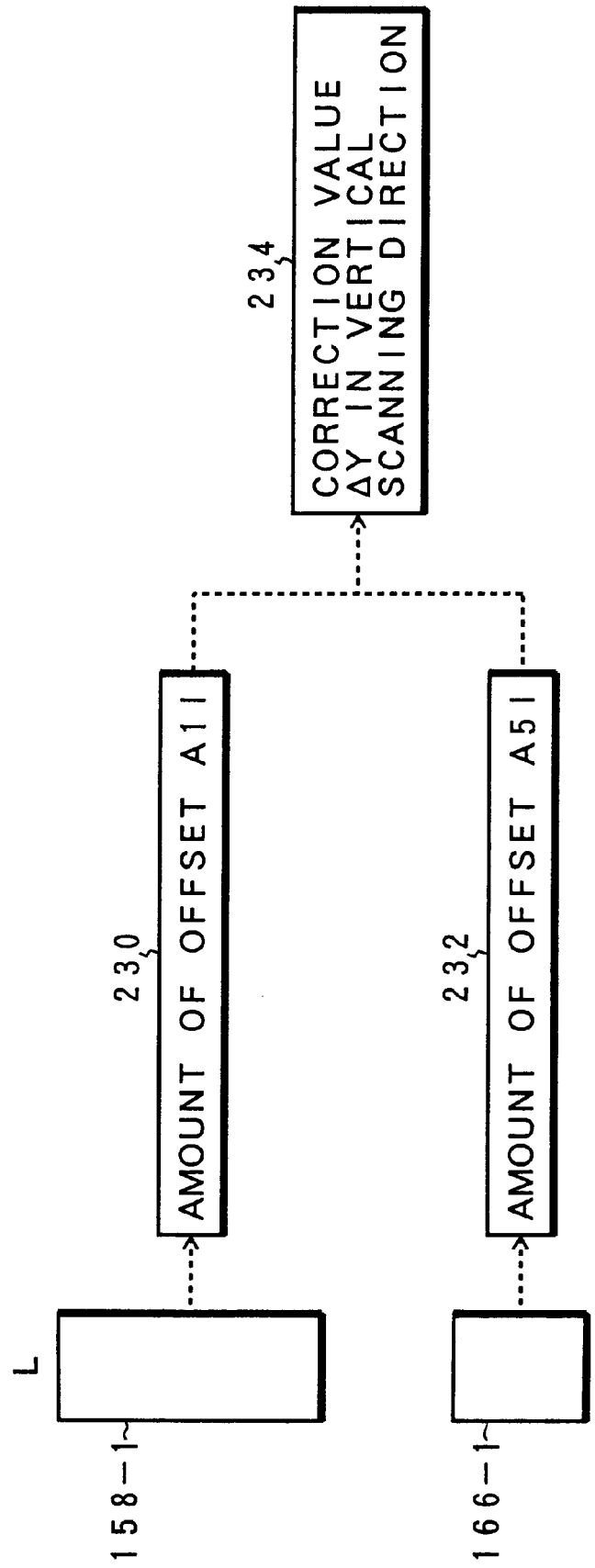

FIG. 44A  PIXEL SPACE
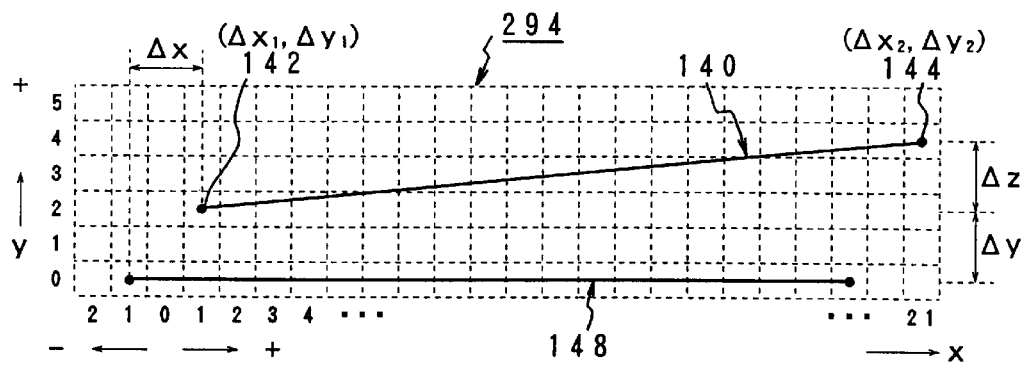
FIG. 44B  POSITIONAL OFFSET DATA
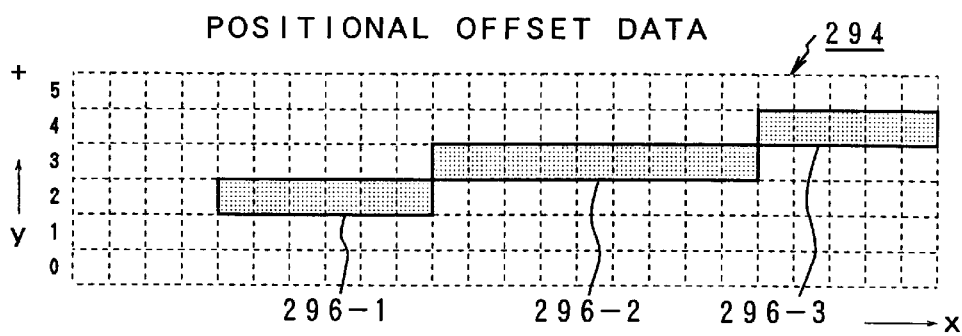
FIG. 44C  CORRECTION DATA
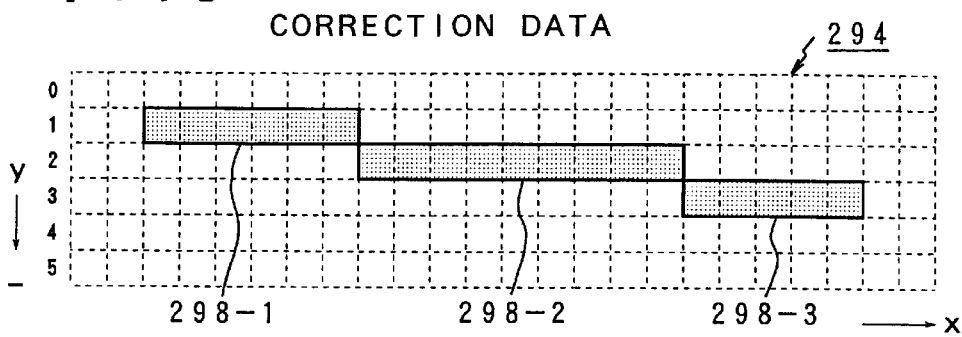
FIG. 44D  PRINT RESULT
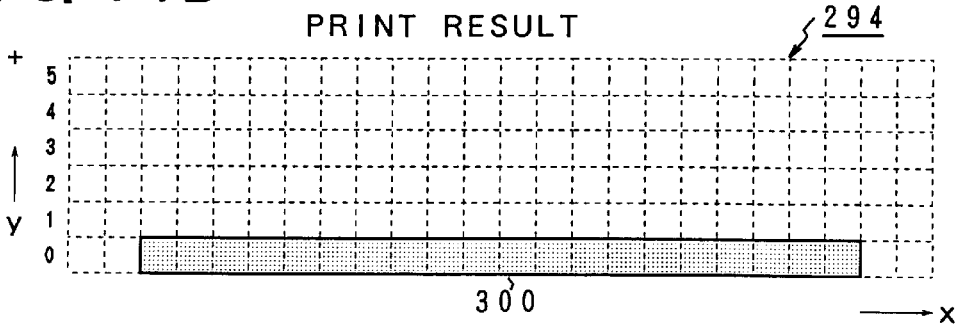

FIG. 46A
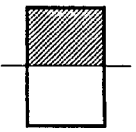
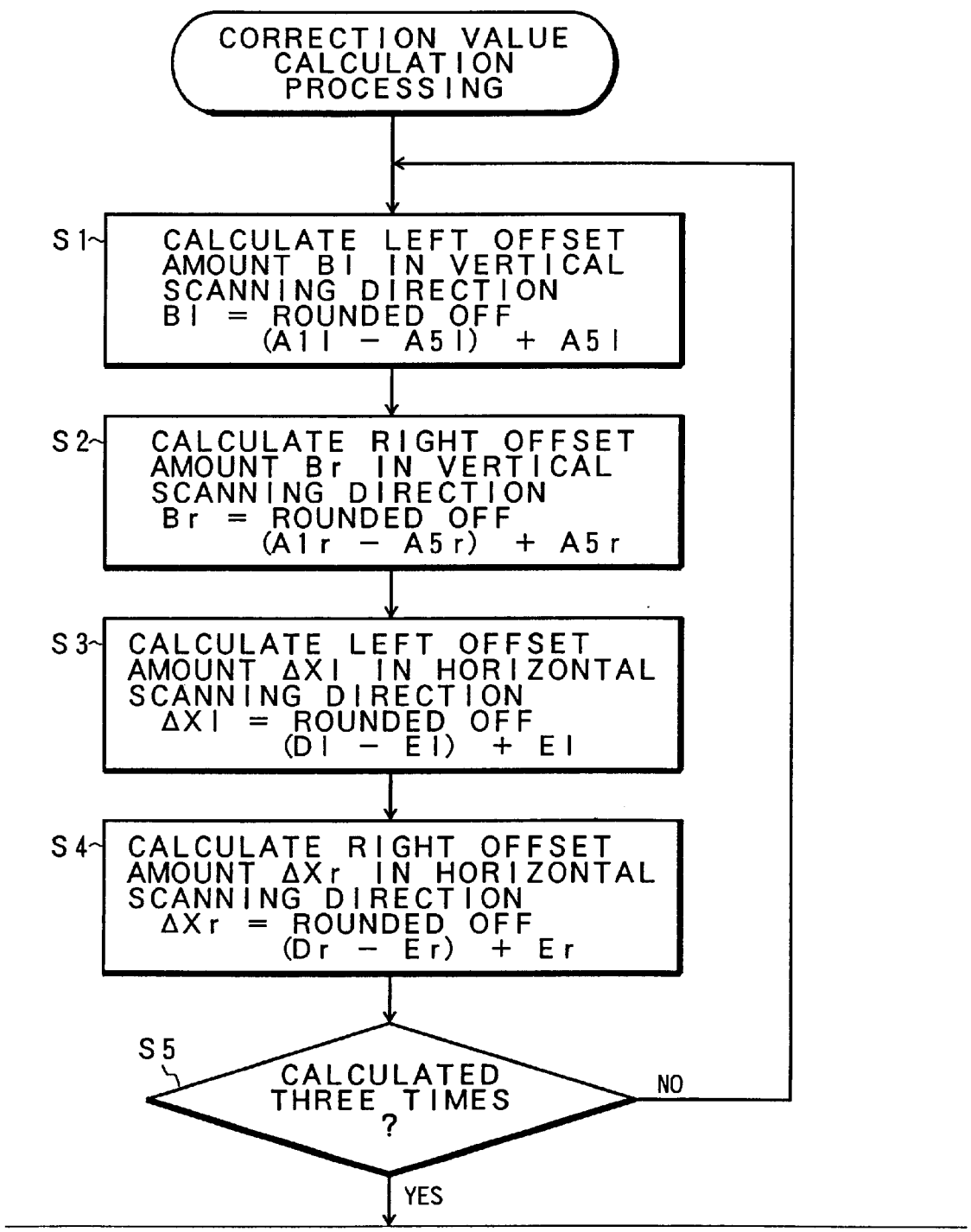

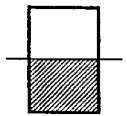
FIG. 46B
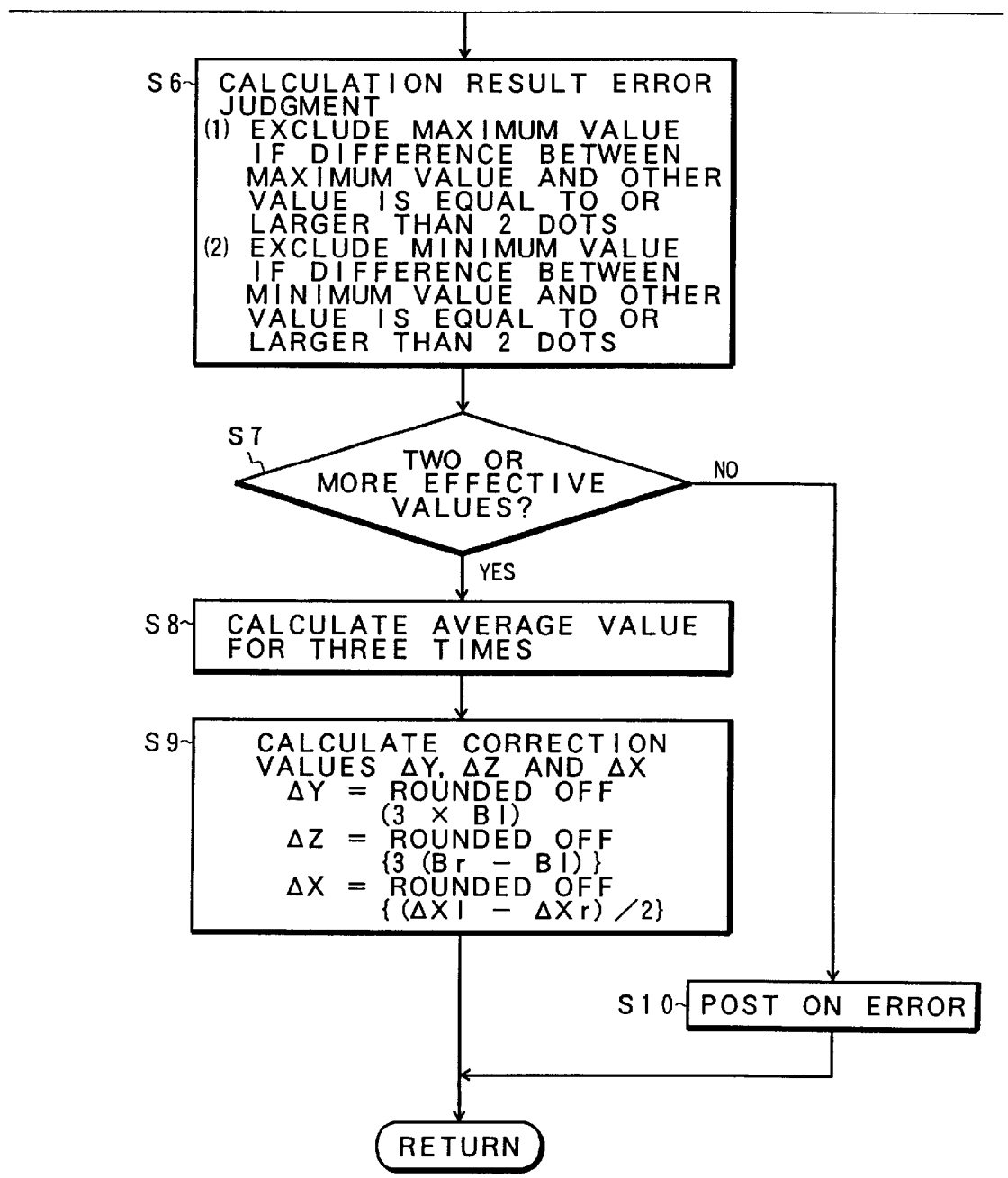

IMAGE FORMATION APPARATUS CAPABLE OF DETECTING AND CORRECTING POSITIONAL OFFSETS

BACKGROUND OF THE INVENTION

1. Field of the Invention

The present invention relates generally to an image formation apparatus for print forming full color images through superposing transfer of different color images by means of a plurality of electrostatic recording units having electrophotographic record printing facility of a printer, a copier, etc., and more particularly to an image formation apparatus capable of detecting and correcting positional offsets of color images between a plurality of removable electrostatic recording units.

2. Description of the Related Arts

Up until now, an electrophotographic recording type color printer is provided with four electrostatic recording units for black (K), cyan (C), magenta (M) and yellow (Y) which are arranged in tandem in the record paper conveyance direction. The electrostatic recording units for four colors optically scan a photosensitive drum on the basis of image data to form latent images, develop the latent images with color toners in developing vessels, transfer the developed images onto record paper being conveyed at a certain speed in a superposed manner in the order of yellow (Y), magenta (M), cyan (C) and black (K), and finally perform thermal fixing through a fixing device or other processes. In case of lack of color toners, the electrostatic recording units for yellow (Y), magenta (M), cyan (C) and black (K) must be subjected to replacement of the entire unit or of a part of the unit. To this end, the electrostatic recording units are each provided with a structure allowing easy removal with the apparatus cover opened.

On the other hand, to enhance the quality of the color printing in the color printer having such a structure in which the YMCK electrostatic recording units are arranged in tandem in the record paper conveyance direction, color matching accuracy must be enhanced by reducing the positional offsets of the toner images transferred onto the moving record paper by means of the electrostatic recording units. For example, if the resolving powers in the horizontal scanning direction (direction orthogonal to the conveyance direction) and in the vertical scanning direction (record paper conveyance direction) on the record paper are both 600 dpi, then the pixel pitch results in about 42 $\mu$m, so that the positional offset must be reduced to 42 $\mu$m or less.

In the case of the conventional tandem type color printer, however, it was difficult to achieve a color matching accuracy of 42 $\mu$m or less in positional offset through improvement of the mechanical machining accuracy or assembling accuracy because the YMCK electrostatic recording units are removably provided and suffer from larger positional offsets as compared with the case of mounting in a fixed manner. To solve this problem in the case of Japanese Patent Laid-open Pub. No. Hei8-85236 for instance, test pattern resist marks are transferred on a transfer belt at four rectangular corners and read by a CCD to detect image offsets in resist mark detection coordinates relative to previously defined absolute reference coordinates of the apparatus so that upon the output of image data to the laser scanner, correction is made on the basis of image offsets whose output coordinates positions have been detected. In such conventional positional offset detection and positional offset correction, however, all of the electrostatic recording units for yellow (Y), magenta (M), cyan (C) and black (K) necessitate detection of positional offsets of the resist marks relative to the absolute coordinates. In addition, use of the CCD for the detection of the resist mark needs more time for the processing of positional offset detection and a larger hardware amount resulting in the increase of production costs. Although it is also conceivable to correct the positional offsets by allowing the light emitting array to be mechanically adjustable, such a mechanical adjustment suppressing the positional offsets to 42 $\mu$m or less is unfeasible. For this reason, the color printer using the light emitting array often suffered from a positional offset as large as 300 $\mu$m for instance, making it difficult to realize a satisfactory printing quality through the superposition of color components.

Thus, the present inventors proposed a method in which right and left resist mark trains are transferred on the belt in the order of black (K), cyan (C), magenta (M) and yellow (Y) so that the position of the marks is read for each color to calculate an image offset as a difference between the distance to the black (K) mark from the other color marks and its nominal distance (U.S. Ser. No. 09/086,956 filed May 29, 1998). However, this method involved a deficiency that a greater mark-to-mark distance may allow the offset attributable to the fluctuation in the belt conveyance speed to be contained in the detected distance, preventing accurate detection of the image offsets.

SUMMARY OF THE INVENTION

According to the present invention there is provided an image formation apparatus capable of a high accuracy automatic image offset correction without being affected by the offset of the belt conveyance speed.

The image formation apparatus of the present invention comprises a moving member in the form of an endless belt with record paper adhered thereon, conveyed at a certain speed and a plurality of image carrying units (electrostatic recording units) arranged in the record paper conveyance direction, for forming latent images in conformity with image data through optical scanning on a photosensitive drum, developing them with different developing vessels and transferring them onto record paper lying on the moving member. In the case of the present invention, such an image formation apparatus of tandem type is provided with a correction mark formation unit, a correction amount calculation unit and a positional offset correction unit. The correction mark formation unit transfers mixed color mark trains onto the moving member by means of the plurality of image carrying units, the mixed color mark trains serving as marks for correcting image offsets between color images, the mixed color mark trains each consisting of a plurality of marks which are superposed on each other in an offset manner. The correction value calculation unit detects a lightness pattern of the mixed color mark transferred onto the moving member, to calculate correction values for image offsets between color images from the phase of the lightness pattern. The correction unit automatically corrects offsets between color images on the basis of the correction values acquired by the correction value calculation unit. The correction mark formation unit forms, as the mixed color mark trains, a mixed color slanted line mark train consisting of a plurality of transverse line marks substantially orthogonal to the direction in which the moving member moves, and a mixed color slanted line mark train consisting of a plurality of slanted line marks which traverse substantially diagonally the direction in which the moving member moves. Herein the mixed color transverse line mark train is used for the calculation of an image offset correction value $\Delta Y$ in the vertical scanning direction which is coincident with the direction in which the moving member moves. The mixed color slanted line mark train is used for the calculation of an image offset correction value ΔZ in the skew direction relative to the horizontal scanning direction substantially orthogonal to the direction in which the moving member moves. Furthermore, both the mixed color transverse line mark train and the mixed color slanted line mark train are used for the calculation of an image offset correction value ΔX in the horizontal scanning direction substantially orthogonal to the direction in which the moving member moves.

The correction mark formation unit forms the mixed color transverse line mark train by superposing a first transverse line of one of two colors and a second transverse line of the other of the two colors on each other so as to have the same line width L in the moving direction but have different respective pitch P1 and P2 in the moving direction with offsets therebetween. The correction mark formation unit defines the line width L of the first transverse line mark and the second transverse line mark in a manner corresponding to a detection range of image offset correction values which are calculated by the correction value calculation unit, and defines the difference ΔP between the pitches P1 and P2 of the first mark and the second mark in a manner corresponding to a resolving power (scale pitch accuracy) of correction values within the detection range. Preferably, the mark is formed with a resolving power of e.g., one dot, although in this case the mark train becomes too long, resulting in a large memory capacity for storing the mark read results. Thus, the correction mark formation unit forms a plurality of mixed color transverse line mark trains having different line widths L corresponding to the detection range and having different pitch differences ΔP corresponding to the resolving power, in the direction in which the moving member moves. More specifically, it forms a mixed color transverse line mark train having a large pitch and a mixed color transverse fine line mark train having a small pitch, and calculates an image offset for each range to add them together to find a correction value from this added image offset. As a result of this, the mark formation distance is shortened so that the memory can be reduced.

The correction mark formation unit forms iteratively the mixed color transverse line mark train in the direction in which the moving member moves. In particular, it forms iteratively the transverse fine line mark train having a small range and a high resolving power, to find an average value of the correction values calculated from the mark trains to improve the accuracy. When the pitch P2 of the second transverse line mark train is larger than the pitch P1 of the first transverse line mark train, the correction mark formation unit defines the number N2 of marks of the second transverse line mark train as $N2 = $(line width $L$)/(pitch difference $\Delta P$)×2+1 and the number N1 of marks of the first transverse line mark train as $N1 = N2+1$ The correction mark formation unit forms the mixed color slanted line mark train by superposing a first slanted line of one of two colors and a second transverse line of the other of the two colors on each other so as to have the same line width L in the moving direction but have different respective pitch P1 and P2 in the moving direction with offsets therebetween. The details of this mixed color slanted line mark train are also the same as those of the mixed color transverse line mark train. That is, the correction mark formation unit defines the line width L of the first transverse line mark and the second transverse line mark in a manner corresponding to a detection range of image offset correction values which are calculated by the correction value calculation unit, and defines the difference ΔP between the pitches P1 and P2 of the first slanted line mark and the second slanted line mark in a manner corresponding to a resolving power (scale pitch accuracy) of correction values within the detection range. The correction mark formation unit forms a plurality of mixed color slanted line mark trains having different line widths L corresponding to the detection range and having different pitch differences ΔP corresponding to the resolving power, in the direction in which the moving member moves. When the pitch P2 of the second slanted line mark train is larger than the pitch P1 of the first slanted line mark train, the correction mark formation unit defines the number N2 of marks of the second slanted line mark train as $N2 = $(line width $L$)/(pitch difference $\Delta P$)×2+1 and the number N1 of marks of the first slanted line mark train as $N1 = N2+1$

The correction mark formation unit forms as the mixed color slanted line mark trains a first mixed color slanted line mark train consisting of a plurality of slanted line marks which traverse substantially diagonally the direction in which the moving member moves, and a second mixed color slanted line mark train consisting of a plurality of slanted line marks which traverse diagonally reversely to the marks of the first mixed color slanted line mark train, the first and second mixed color slanted line mark trains being juxtaposed in the direction of move of the moving member. In the case of formation of two sets of mixed color slanted line mark trains having different slant directions in this manner, the mixed color phases of the mixed color slanted line mark trains vary reversely to each other with respect to the offset in the horizontal scanning direction whereas the same mixed color variations result for the offset in the vertical scanning direction, so that by addition averaging the two image offsets the image offset in the vertical scanning direction is canceled so that it is possible to accurately obtain only the image offset in the horizontal scanning direction even though uneven speed lies in the vertical scanning direction which is coincident with the belt moving direction. As an alternative mode of the mixed color slanted line mark train, the correction mark formation unit may form a first mixed color slanted line mark train and a second mixed color slanted line mark train having different slant directions in such a manner that they are juxtaposed in the direction substantially orthogonal to the direction of move of the moving member.

Herein the moving member is in the form of an endless belt, and the correction mark formation unit forms the mixed color mark trains over the length substantially integer times the circumferential length of the endless belt. The correction value calculation unit calculates, as a correction value for an image offset between color images, a correction value ΔY for an image offset in the vertical scanning direction which is coincident with the direction of move of the moving member. That is, the correction value calculation unit calculates the correction value ΔY for an image offset in the vertical scanning direction, on the basis of the phase of a lightness pattern of one of the right and left mixed color transverse line mark trains. The correction value calculation unit calculates, as a correction value for an image offset between color images, a correction value ΔX for an image offset in the horizontal scanning direction substantially orthogonal to the direction of move of the moving member. That is, the correction value calculation unit calculates the correction value ΔX for an image offset in the horizontal scanning direction, on the basis of the phases of lightness patterns of the mixed color transverse line mark train and the mixed color slanted line mark train. Basically, the correction value calculation unit subtracts an image offset Ab in the vertical scanning direction acquired from the lightness pattern phases of the mixed color transverse line mark trains having large and small pitches, from a combined image offset Ad in the horizontal and vertical scanning directions acquired from the lightness pattern phases of the mixed color transverse line mark trains having large and small pitches, the correction value calculation unit further adding to the difference an image offset Ae in the horizontal scanning direction acquired from the mixed color slanted line mark train having a different inclination and a small pitch, to calculate a correction value ΔX for an image offset in the scanning direction. More specifically, with respect to the right and left mixed color mark trains, the correction value calculation unit subtracts an image offset Ab in the vertical scanning direction acquired from the lightness pattern phases of the mixed color transverse line mark trains having large and small pitches, from a combined image offset Ad in the horizontal and vertical scanning directions acquired from the lightness pattern phases of the mixed color transverse line mark trains having large and small pitches, the correction value calculation unit further adding to the difference an image offset Ae in the horizontal scanning direction acquired from the mixed color slanted line mark train having a different inclination and a small pitch, to calculate correction values ΔXl and ΔXr for right and left image offsets in the scanning direction, the correction value calculation unit calculating the correction value ΔX in the horizontal scanning direction from the average value of image offsets in the horizontal scanning direction of the right and left trains. The correction value calculation unit calculates, as a correction value for an image offset between color images, a correction value ΔZ for an image offset in the skew direction relative to the horizontal scanning direction substantially orthogonal to the direction of move of the moving member. That is, the correction value calculation unit calculates the correction value ΔZ for an image offset in the skew direction, on the basis of the phases of lightness patterns of the right and left mixed color transverse line mark trains. More specifically, the correction value calculation unit finds image offsets Abl and Abr in the vertical scanning direction for the right and left trains on the basis of the phases of lightness patterns of the mixed color transverse mark trains, the correction value calculation unit calculating the correction value ΔZ for an image offset in the skew direction from the difference between the right and left image offsets.

The correction mark formation unit transfers, onto the moving member, respective mixed color mark trains of black and cyan, black and magenta, and black and yellow, and the correction value calculation unit detects lightness patterns of the respective mixed color mark trains of the black and cyan, black and magenta, and black and yellow, to figure out respective correction values for image offsets of images of cyan, magenta and yellow relative to the black image from the phases of respective lightness patterns.

In a further mode of the present invention, to prevent errors from occurring in the calculation results of the correction values as a result of transfer of resist marks onto the moving member, i.e., endless belt having a defective, e.g., damaged or dirty surface, the correction mark formation unit transfers iteratively the mixed color mark trains onto the moving member over a plurality of cycles, and correspondingly the correction value calculation unit calculates correction values for image offsets from the mixed color marks transferred over a plurality of cycles, the correction value calculation unit judging effective values among a plurality of correction values, to find a final correction value from an average value of the effective values.

In this case, the correction mark formation unit forms, as the mixed color mark trains, a mixed color transverse line mark train consisting of a plurality of transverse line marks substantially orthogonal to the direction of move of the moving member, and a mixed color slanted line mark train consisting of a plurality of slanted line marks which traverse substantially diagonally the direction of move of the moving member, the correction mark formation unit transferring the mixed color transverse line mark train of the two onto the moving member over a plurality of cycles with its position shifted for each cycle.

The above and other objects, features and advantages of the present invention will become more apparent from the following detailed description with reference to the accompanying drawings.

BRIEF DESCRIPTION OF THE DRAWINGS

FIGS. 4A and 4B are block diagrams of a configuration of the hardware of the present invention;

FIG. 5 is an explanatory diagram of an arrangement of sensors for detecting resist marks transferred onto the belt;

FIG. 8 is an explanatory diagram of tables storing therein correction values for correcting image offsets;

FIGS. 17A and 17B are explanatory diagrams of a K transverse line mark train and a C transverse line mark train which are superposed on each other to form a K-C transverse line mark train of FIG. 16;

FIGS. 18A to 18E are explanatory diagrams of the arrangement structure of the K transverse line mark train, the C transverse line mark train and a mixed color K-C transverse line mark trains, as well as of lightness patterns acquired through the sensor read;

FIGS. 19A to 19E are explanatory diagrams of the K-C transverse line mark train obtained when the C transverse line mark train has shifted toward the positive direction (phase lead direction) relative to the K transverse line mark train, as well as of the lightness patterns;

FIGS. 20A to 20E are explanatory diagrams of the K-C transverse line mark train obtained when the C transverse line mark train has shifted toward the negative direction (phase lag direction) relative to the K transverse line mark train, as well as of the lightness patterns;

FIGS. 21A to 21E are explanatory diagrams of two color transverse line mark trains and mixed color transverse line mark trains shown in general forms;

FIGS. 29A and 29B are explanatory diagrams of the image offset range and the resolving power, acquired by the combination of the transverse line mark train and the transverse fine line mark train;

FIGS. 33A to 33E are explanatory diagrams of the arrangement structure of the K slanted line mark train, the C slanted line mark train and the mixed color K-C slanted line mark train of FIGS. 32A and 32B, as well as of lightness patterns acquired by the sensor read;

FIGS. 37A and 37B are explanatory diagrams of a K reversely slanted fine line mark train and a C reversely slanted fine line mark train which are superposed on each other to form a K-C reversely slanted fine line mark train of FIG. 35;

FIGS. 40A and 40B are flowcharts of the correction value calculation processing effected by the correction value calculation processing unit of FIG. 7;

FIG. 41 is an explanatory diagram of a procedure of calculation of a correction value ΔY in the vertical scanning direction in step S1 of FIG. 40A;

FIGS. 44A to 44D are explanatory diagrams of correction processing effected by a positional offset correction unit of FIG. 7;

FIGS. 46A and 46B are flowcharts of correction value calculation processing based on the detection of the resist marks of FIG. 45 transferred over the plurality of cycles.

DETAILED DESCRIPTION OF THE PREFERRED EMBODIMENTS (Structure of Apparatus)

Figure 1:
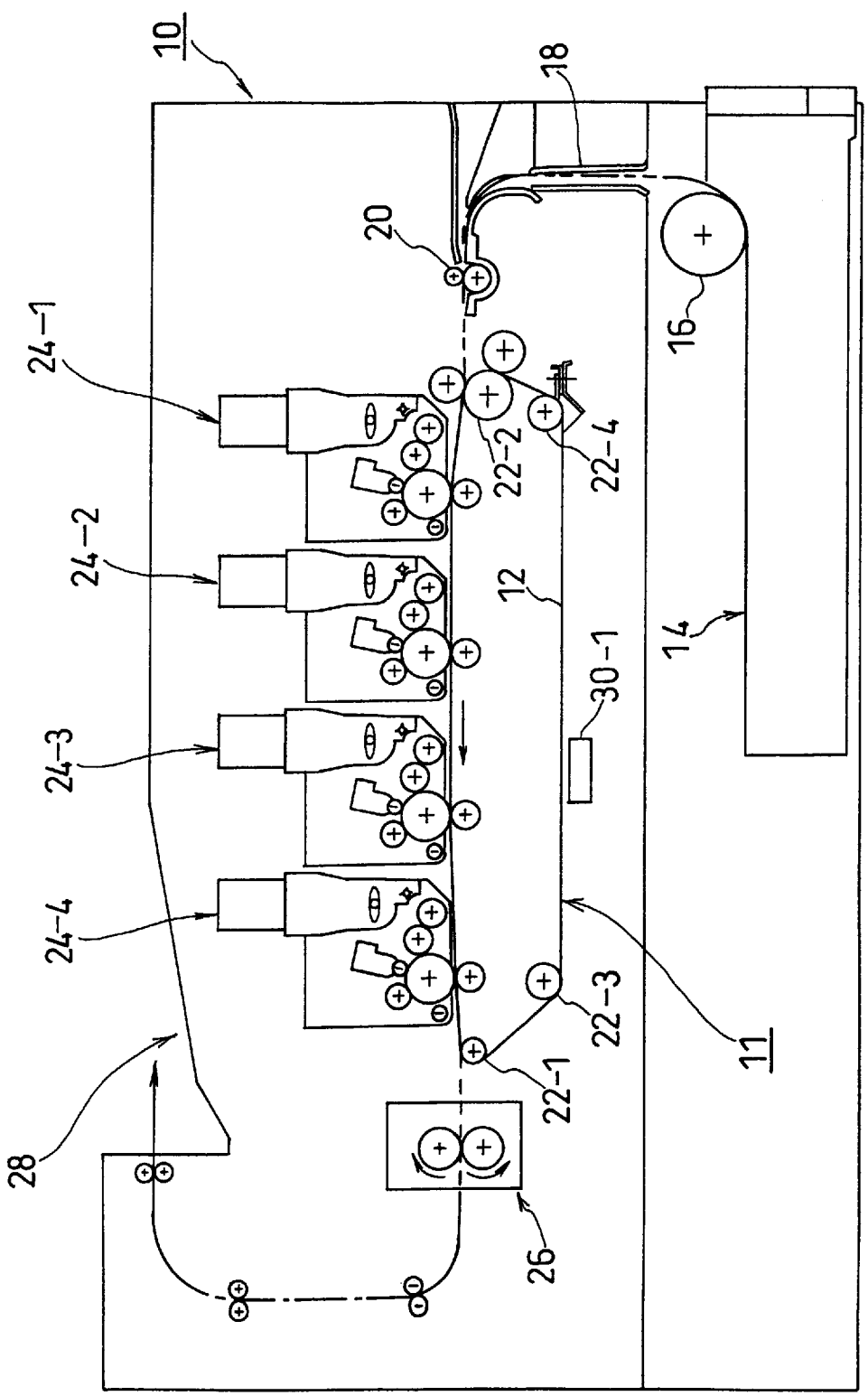
FIG. 1 is an explanatory diagram of an internal structure of the apparatus body in accordance with the present invention.

FIG. 1 illustrates an internal structure of a printing apparatus in accordance with the present invention. An apparatus body 10 accommodates a conveyance belt unit 11 for conveying record media, e.g., record sheets of paper, which conveyance belt unit 11 is provided rotationally with an endless belt 12 made of a transmittable dielectric material, e.g., a suitable synthetic resin material. The endless belt 12 extends around round four rollers 22-1, 22-2, 22-3 and 22-4. The conveyance belt unit 11 is removably mounted to the apparatus body 10. The roller 22-1 functions as a drive roller. By means of a drive mechanism (not shown), the driving roller 22-1 causes the endless belt 12 to run at a certain speed in the clockwise direction indicated by an arrow. The drive roller 22-1 functions also as an AC elimination roller for eliminating electric charge from the endless belt 12. The roller 22-2 acts as a driven roller. The driven roller 22-2 acts also as a charging roller for imparting electric charge to the endless belt 12. The rollers 22-3 and 22-4 serve as guide rollers and are arranged in the vicinity of the driving roller 22-1 and the driven roller 22-2, respectively. An upper running portion of the endless belt 12 between the driven roller 22-2 and the driving roller 22-1 forms a moving path for the record sheets of paper. The record sheets of paper are accumulated within a hopper 14 and are picked up one by one from the topmost record sheet of paper in the hopper 14 by means of a pickup roller 16. The record sheet of paper then passes through a record paper guide passage 18 and is led by a pair of record paper feeding rollers 20 from the endless belt 12 closer to the driven roller 22-2 onto the record paper moving path on the belt upper side. After passing through the record paper moving path, the record paper is discharged from the drive roller 22-1. Since the endless belt 12 is charged by the driven roller 22-2, the record paper electrostatically adheres to the endless belt 12 when it is led from the driven roller 22-2 onto the record paper moving path, so that the record paper in motion is prevented from being positionally offset. On the other hand, the driving roller 22-1 on the discharge side serves as a charge eliminating roller, so that the endless belt 12 is cleared of electric charge at the portion where the endless belt 12 comes into contact with the driving roller 22-1. For this reason, the record paper is cleared of electric charge when it passes through the driving roller 22-1, with the result that it is easily separated and discharged from the endless belt 12 without being caught by the lower belt portion. The apparatus body 10 accommodates four electrostatic recording units 24-1, 24-2, 24-3 and 24-4 for Y, M, C and K, which are arranged in series, i.e., in a tandem manner from upstream toward downstream in the mentioned order along the record paper moving path on the upper side of the endless belt 12 defined between the driven roller 22-2 and the driving roller 22-1. The electrostatic recording units 24-1 to 24-4 have the same structure although developing agents used are a yellow toner component (Y), a magenta toner component (M), a cyan toner component (C) and a black toner component (K), respectively. For this reason, the electrostatic recording units 24-1 to 24-4 transfers and records a yellow toner image, a magenta toner image, a cyan toner image and a black toner image onto the record paper moving along the record paper moving path on the upper side of the endless belt 12, in sequence and in a superposed manner, to form a full-color toner image.

Figure 2:
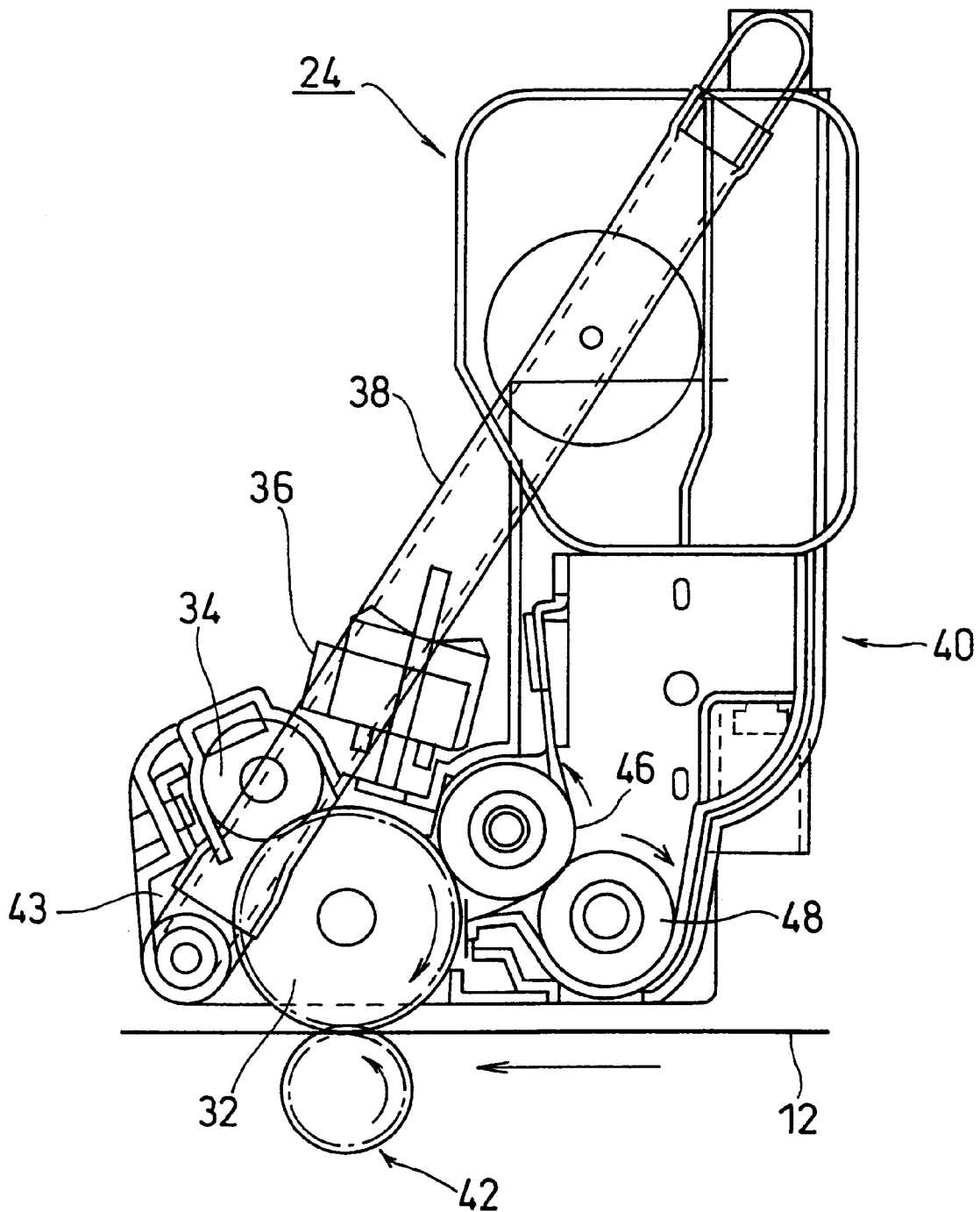
FIG. 2 is a sectional view of an electrostatic recording unit of FIG. 1.

FIG. 2 illustrates one of the electrostatic recording units 24-1 to 24-4 of FIG. 1 in an exclusive and enlarged manner. An electrostatic recording unit 24 comprises a photosensitive drum 32 which is rotated clockwise upon the recording action. Above the photosensitive drum 32 there is disposed a precharger 34 in the form of a corona charger or a scorotron charger for instance, the precharger 34 charging the rotating surface of the photosensitive drum 32 with uniform electric charge. Confronting the charged area of the photosensitive drum 32 there is arranged an LED array 36 acting as an optical writing unit which emits a light for scanning to write an electrostatic latent image onto the photosensitive drum 32. More specifically, light emitting elements are arranged in the horizontal scanning direction of the LED array 36 and are driven on the basis of graduation levels of pixel data (dot data) derived from image data provided as print information from a computer or a word processor, so that the electrostatic latent image is written as a dot image. The electrostatic latent image written onto the photosensitive drum 32 is electrostatically developed as a charged toner image of a predetermined toner by a developing vessel 40 located above the photosensitive drum 32. The charged toner image on the photosensitive drum 32 is electrostatically transferred onto a record paper by means of an electrically conductive transfer roller 42 located below. More specifically, the electrostatic transfer roller 42 is positioned with a minute gap relative to the photosensitive drum 32 by way of the endless belt 12 and imparts electric charge having a polarity opposite to that of the charged toner image to the record paper being conveyed by the endless belt 12, so that the charged toner image on the photosensitive drum 32 is electrostatically transferred onto the record paper. Through the transfer process, a toner residue adheres to the surface of the photosensitive drum 32 without being transferred onto the record paper. The toner residue is removed from the photosensitive drum 32 by means of a toner cleaner 43 which is located downstream of the record paper moving path. The thus removed toner residue is returned by a screw conveyor 38 to the developing vessel 40 for reuse as the developing toner.

Referring again to FIG. 1, during the passage along the record paper moving path of the endless belt 12 defined between the driven roller 22-2 and the driving roller 22-1, the record paper is subjected to a transfer through the superposition of images of the four colors, Y, M, C and K to form a full-color image. The record paper is then delivered from the driving roller 22-1 toward a heat roller type thermal fixing device 26 for the execution of thermal fixation of the full-color image onto the record paper. After the completion of the thermal fixation, the record paper passes through the guide roller and is stacked in a stacker 28 disposed above the apparatus body. Confronting the lower belt surface of the endless belt 12, there are arranged a pair of sensors 30-1 to 30-2 in a direction orthogonal to the belt moving direction, although only the sensor 30-1 closer to the viewer is visible in the state of FIG. 1. The sensors 30-1 and 30-2 are used to optically read a resist mark for the detection of a positional offset, which has been transferred onto the endless belt 12 upon the positional offset detection in accordance with the present invention.

Figure 3:
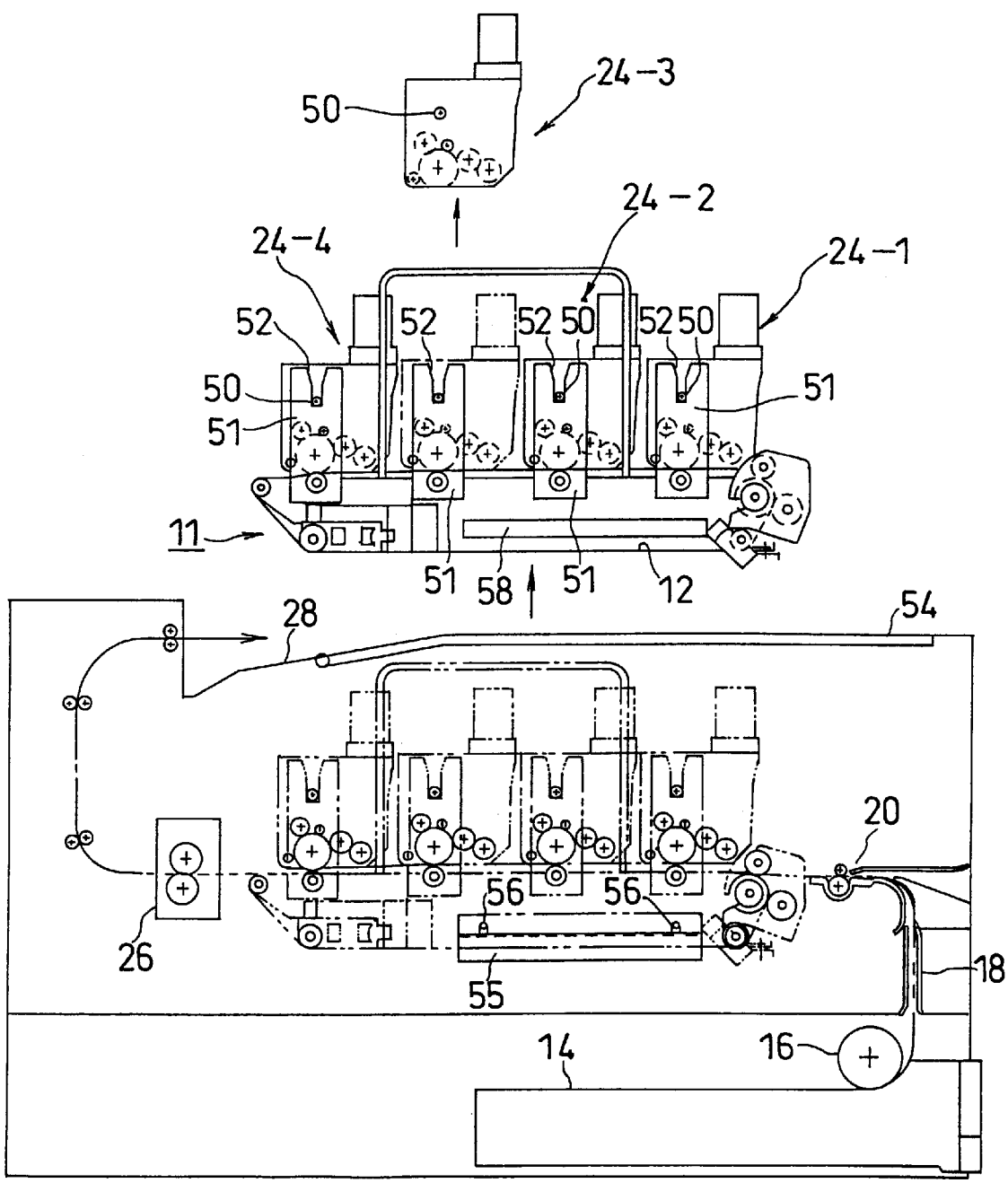
FIG. 3 is an explanatory diagram of the dismounted state of a conveyance belt unit and the electrostatic recording unit.

FIG. 3 illustrates the conveyance belt unit 11 dismounted from the interior of the apparatus body 10 of FIG. 1, with an attachment/detachment structure of the electrostatic recording units 24-1 to 24-4 provided on the conveyance belt unit 11. A cover 54 is attached to the top of the apparatus body 10 in such a manner that the cover 54 can freely be opened or closed around the left-hand end. A frame 55 is disposed within the apparatus body 10 and two pins 56 are arranged on the frame 55 at its top. On the other hand, the side surface of the conveyance belt unit 11 shown taken out above is provided with a frame 58 confronting the frame 55 on the apparatus body 10 side and having pin holes at positions corresponding to the pins 56. By virtue of this structure, the conveyance belt unit 11 can be pulled up after opening the cover 54 so that it can be drawn out upward from the pins 56 on the apparatus body 10 side. The electrostatic recording units 24-1 to 24-4 are mounted on the conveyance belt unit 11 in such a manner that pins 50 provided on the side surfaces of the electrostatic recording units 24-1 to 24-4 are fitted into attachment grooves 52 opening upward on the top of attachment plates 51 arranged on both side surfaces of the conveyance belt unit 11. The attachment groove 52 consists of an upper V-shaped opening and a lower straight groove continuous with the opening and having the same width as that of the pins 50 so that the pins 50 can be aligned with the attachment grooves 52 and pushed downward so as to ensure precise positioning at predetermined locations on the conveyance belt unit 11. In cases where it is desired that the electrostatic recording units 24-1 to 24-4 be replenished with toner or subjected to maintenance, they can easily be dismounted from the unit 11 by pulling up as the electrostatic recording unit 24-3 for instance.

(Hardware Configuration and Function)

Figure 4B:
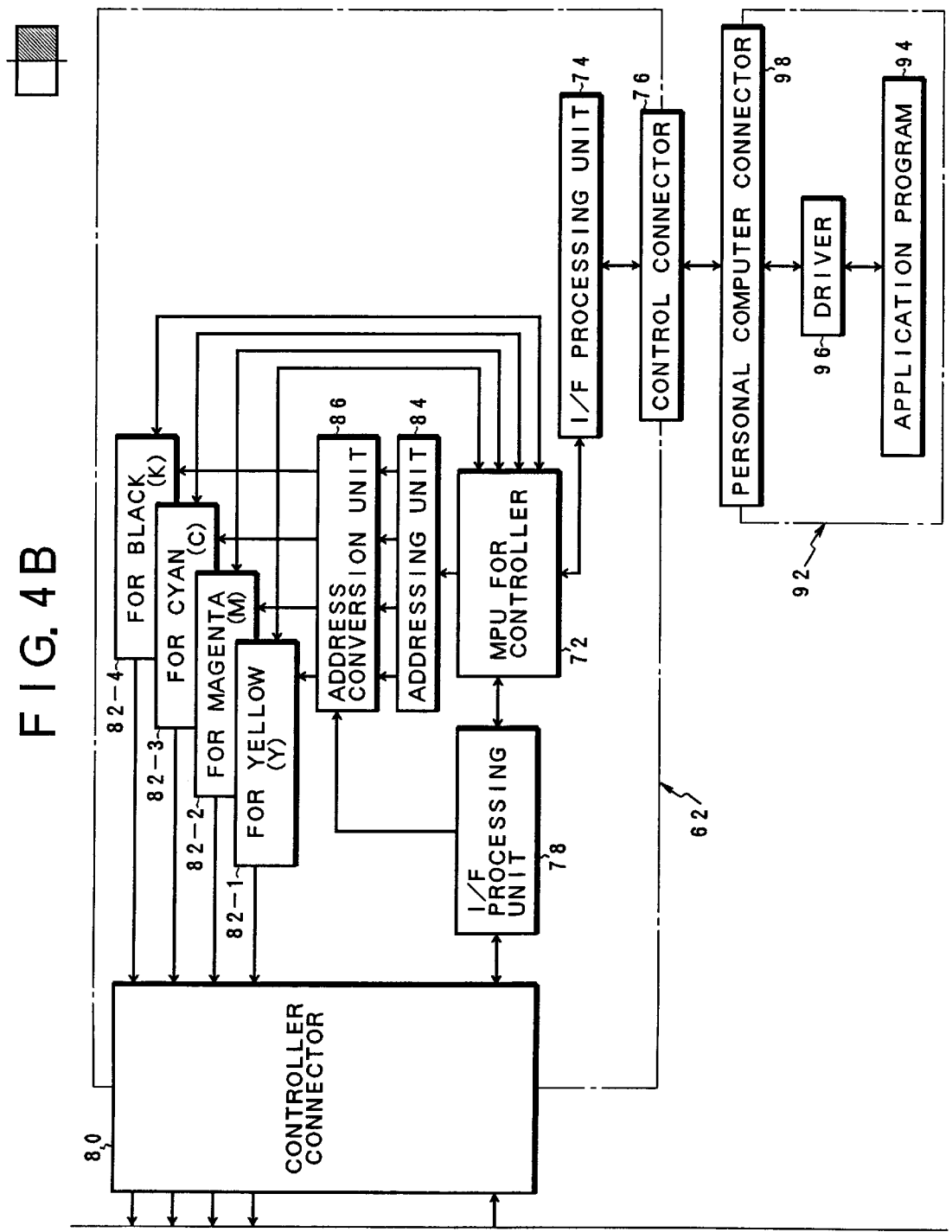

FIGS. 4A and 4B are block diagrams of a hardware configuration of the printing apparatus in accordance with the present invention. The hardware of the present invention is constituted by an engine 60 and a controller 62. The engine 60 comprises a mechanical controller 64 which performs actions controlling print mechanism section including the conveyance belt unit 11 and the electrostatic recording units 24-1 to 24-4 of FIG. 1. Associated with the mechanical controller 64 is an MPU 66 for sensor processing which executes offset amount correction processing in accordance with the present invention. The MPU 66 for sensor processing receives detection signals from the pair of sensors 30-1 and 30-2 disposed below the endless belt 12. The mechanical controller 64 is connected via an engine connector 70 to the controller 62 side. As shown taken out, the print mechanism provided in the engine comprises the endless belt 12 and LED arrays 36-1, 36-2, 36-3 and 36-4 provided on the Y, M, C and K electrostatic recording units, respectively. The controller 62 comprises an MPU 72 for controller, which is connected via an interface processing unit 74 and a controller connector 76 to a personal computer 92 for instance serving as a host apparatus. The personal computer 92 includes a driver 96 for the print processing of color image data provided from any application program 94, with the driver 96 being connected via a personal connector 98 to the control connector 76 of the controller 62. The MPU 72 for controller of the controller 62 is provided with image memories 82-1, 82-2, 82-3 and 82-4 for expanding Y, M, C and K image data transmitted from the personal computer 92 into pixel data (dot data) for storage. On the other hand, the MPU 72 for controller is connected via an interface processing unit 78 and a controller connector 80 to the engine 60, with the interface processing unit 78 receiving positional offset information detected by the engine 60 side, thereby allowing the pixel data on each image expanded into the image memories 82-1 to 82-4 to be subjected to positional offset correction. The MPU 72 for controller is provided with an addressing unit 84 for performing addressing when each color pixel data are expanded in the image memories 82-1 to 82-4. The addressing unit 84 is followed by an address conversion unit 86 which performs address conversion for positional offset correction on the basis of positional offset information provided via the interface processing unit 78 from the engine 60 side.

FIG. 5 is a cross section taken along a transverse line orthogonal to the direction of conveyance of the endless belt 12, showing the structure of arrangement of the sensors 30-1 and 30-2 and a drive circuit unit provided on the engine 60 side of FIGS. 4A and 4B. The two sensors 30-1 and 30-2 are juxtaposed underneath the endless belt 12 in the direction orthogonal to the belt conveying direction. The sensors 30-1 and 30-2 are provided respectively with laser diodes 100-1 and 100-2 having a wavelength of 780 nm and respectively with photodiodes 106-1 and 106-2. The laser diodes 100-1 and 100-2 are driven for light emission by a driver 110. Light receiving signals from the photodiodes 106-1 and 106-2 are amplified by amplifiers 108-1 and 108-2 and then fetched through an AD converter 68 into the MPU 66 for sensor processing. The driver 110 is operated in response to a signal from a DA converter provided in the MPU 66 for sensor processing, to drive the laser diodes 100-1 and 100-2 for light emission.

Figure 6:
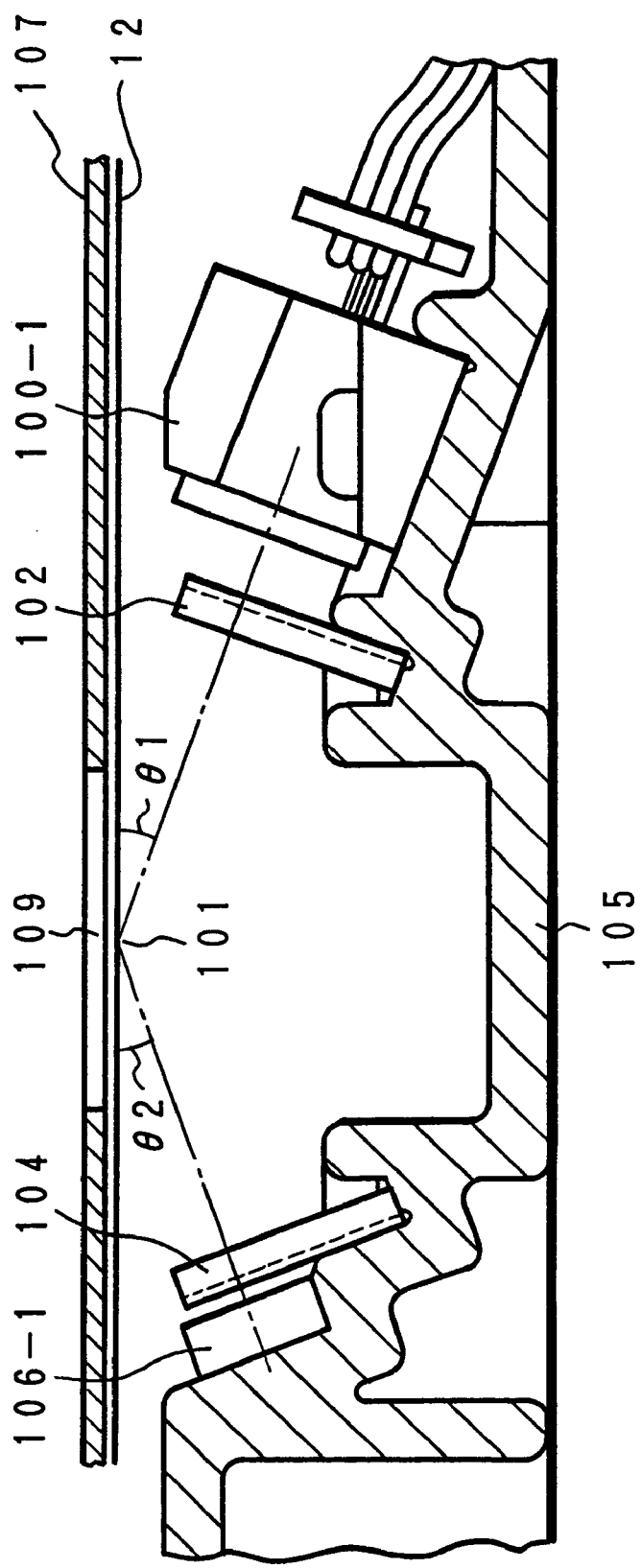
FIG. 6 is an explanatory diagram of the structure of the sensor of FIG. 5.

FIG. 6 illustrates a specific structure of the sensor 30-1 of FIG. 5 by way of example. In FIG. 6, the laser diode 100-1 is disposed on the right side of a housing 105. In front of the laser diode 100-1 is disposed an image forming lens 102 with a collimator, through which lens beams of light from the laser diode 100-1 are gathered to form a minute beam spot on the surface of the belt 12 at an image forming position 101 with an incident angle $\theta_1$. The diameter of the beam spot of laser beams irradiated onto the image forming position 101 is restricted to for instance of the order of several tens of microns. The photodiode 106-1 is disposed by way of a condensing lens 104 in the direction of the optical axis with an output angle $\theta_2$ from the image forming position 101 on the belt 12. In the case of the image offset correction processing in accordance with the present invention, in order to detect image offsets of the K, C, M and Y color images, a mixed color resist mark obtained by superposing C, M, and Y toner resist marks onto the K toner resist mark in an offset manner is transferred onto the belt so that the lightness pattern of this mixed color resist mark is detected by the sensors 30-1 and 302. In this event, the mixed color resist mark transferred onto the surface of the belt 12 is an unfixed toner and has substantially no or little gloss so that any optical detection by reflection is not to be expected. Thus, in the case of the sensors 30-1 and 30-2 of the present invention, a minute beam spot from the laser diode 100-1 is irradiated on the unfixed transfer toner so that resultant scattered light is received by the photodiode 106-1. For this reason, when the belt surface bears no unfixed toner as a result of transfer of the resist mark, detection signals of the sensors 30-1 and 30-2 are in white level, although the level lowers toward black level depending on the amount of transfer of the unfixed toner. The endless belt 12 is guided along a guide plate 107 positioned on its reverse side. However, in case the guide plate 107 is positioned behind a detection position 101 on which a beam spot from the laser diode 100-1 is formed, the beam spot irradiated on the translucent belt 12 may be reflected by the guide plate 107 positioned on the reverse side, allowing scattered light to enter the photodiode 106-1, resulting in noise light. Thus, the guide plate 107 positioned behind the endless belt 12 is provided with a through hole 109 formed in a portion around the detection position 101 where the scattered noise light may occur, to thereby prevent the noise light from occurring as a result of the reflection on the guide plate 107. The sensors 30-1 and 30-2 for use in the present invention can be transmission type sensors consisting of a light emitting element and a light receiving element which are arranged oppositely to each other at positions opposite to the belt. In the case of the transmission type sensors, when there is no resist mark, the detection signal turns white level as a result of a reception of light which has passed through the belt. Upon the transfer of the resist mark, the level of the light receiving signal lowers toward the black level depending on the amount of transfer of the unfixed toner. Since the sensors 30-1 and 30-2 for use in the present invention detect the lightness of the mixed color mark trains transferred onto the endless belt, there is sufficiently available a sensor having an optically low resolving power such as toner adhesion amount sensor for detecting the presence or absence of the toner adhesion having a lower focus, without using a laser beam having an extremely restricted beam system as in FIG. 6.

Figure 7:
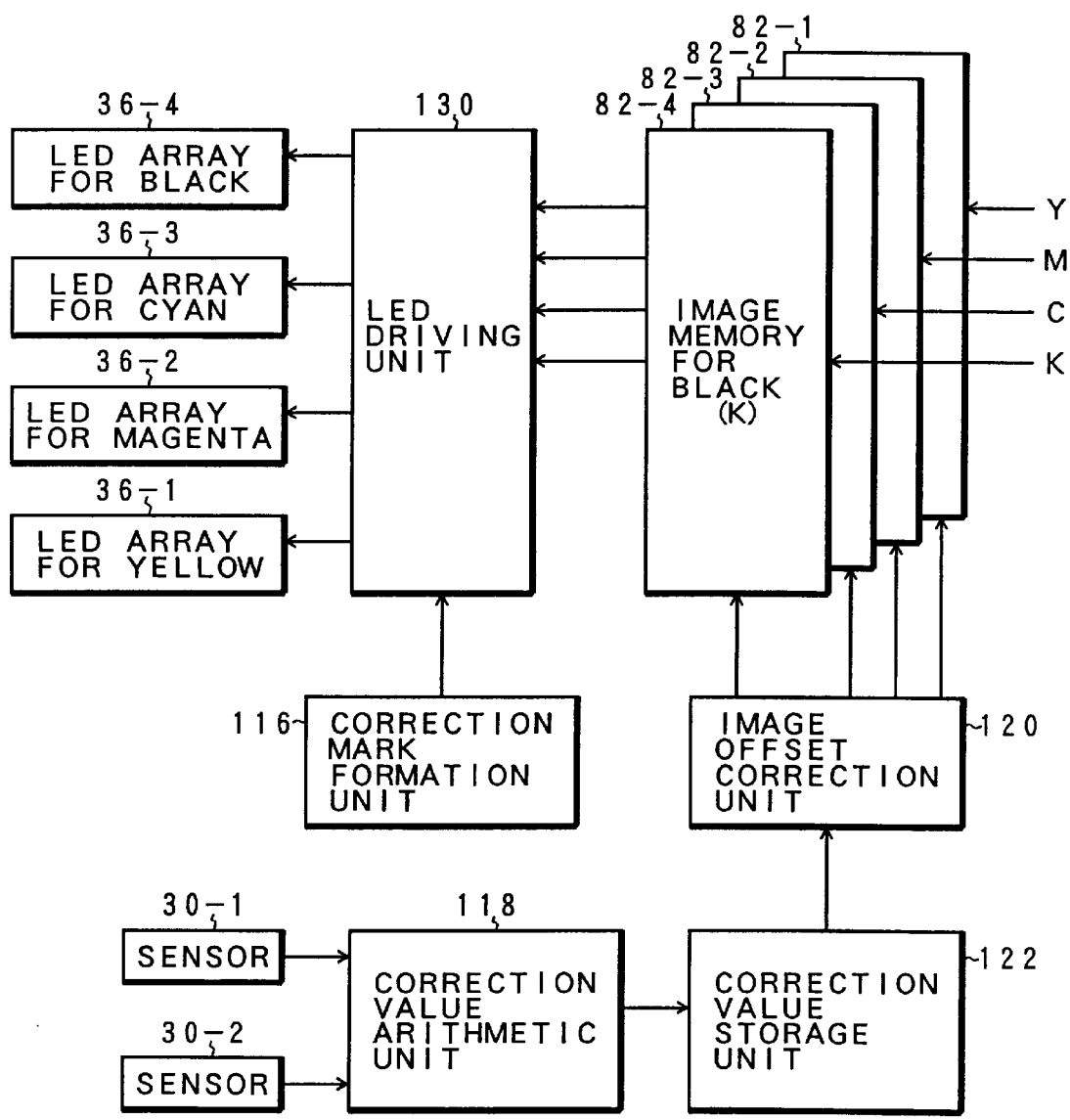
FIG. 7 is a block diagram of the processing function of the present invention.

FIG. 7 is a function block diagram of the printing apparatus in accordance with the present invention, which is constituted by the hardware of FIGS. 4A and 4B, the apparatus comprising a correction mark formation unit 116, a correction value arithmetic unit 118, a correction value storage unit 122 and an image offset correction unit 120. These functions are implemented by the MPU 66 for sensor processing provided in the engine 60 of FIGS. 4A and 4B and by the MPU 72 provided in the controller 62. Previous to the image offset correction, the correction mark formation unit 116 by way of an LED drive unit 130 forms a mixed color mark train for the detection of correction values onto the endless belt 12 by means of the LED arrays 36-1 to 36-4 for Y, M, C and K. The mixed color mark train for the image offset correction is transferred to both the leading edge and the trailing edge of the scanning range in the horicaontal scanning direction orthogonal to the conveying direction of the endless belt 12, the two mark trains being detected by the sensors 30-1 and 30-2, respectively. The image offset correction of the present invention employs as its criterion the printed image of K having the strongest contrast and detects correction values for the correction of the image offsets of the printed images of the remaining Y, M and C relative to the K. More specifically, the correction mark formation unit 116 holds printing information on the mixed color mark train having a pattern form which will be described later. By using this printing information on the mixed color mark train, the mixed color mark train obtained through the offset superposition of two colors of K-C, K-M and K-Y is transferred and formed on the endless belt 12 by means of the parallel drive of the LED arrays 36-1 to 36-4 of four colors Y, M, C and K for example. The information on the mixed color mark train held by the correction mark formation unit 116 may be in the form of a bit map pattern, although it it preferred that it is in the form of vector information, which in turn is expanded into bit map data for printing by means of the LED drive unit 130. On the basis of the phases of the lightness patterns of the mixed color mark trains of K-C, K-M and K-Y read by the sensors 30-1 and 30-2, the correction value arithmetic unit 118 figures out image offset correction values, relative to the black K resist mark having the strongest contrast, of the remaining colors Y, M and C. Correction values figured out by the correction value arithmetic unit 118 are correction values $\Delta X$ in the horizontal scanning direction of the other colors C, M and Y with respect to the absolute position of the black K in the horizontal scanning direction, correction values $\Delta Y$ in the vertical scanning direction with respect to the black K, and a correction value $\Delta Z$ (a skew correction value) in the skew direction of the other colors C, M and Y with respect to the black K. In order to enhance the accuracy of the calculation of the correction values from the lightness pattern of the mixed color mark trains of K-C, K-M and K-Y detected by the sensors 30-1 and 30-2, the correction value arithmetic unit 120 finds Fourier coefficients a and b through the Fourier transform and detects a phase $\phi$ from these Fourier coefficients a and b to figure out correction values from the phase $\phi$. The correction values figured out by the correction value arithmetic unit 118 are stored in the form of a table 122C for cyan, a table 122M for magenta and a table 122Y for yellow as shown in FIG. 8, for example. On the basis of the image offset correction values stored in the correction value storage unit 122, the image offset correction unit 120 of FIG. 7 performs address conversion for the image offset correction upon the expansion of pixel data of the image memories 82-1 to 82-4. To provide a function of this address conversion, the controller 62 of FIG. 4 includes a dedicated address conversion unit 86.

Figure 9:
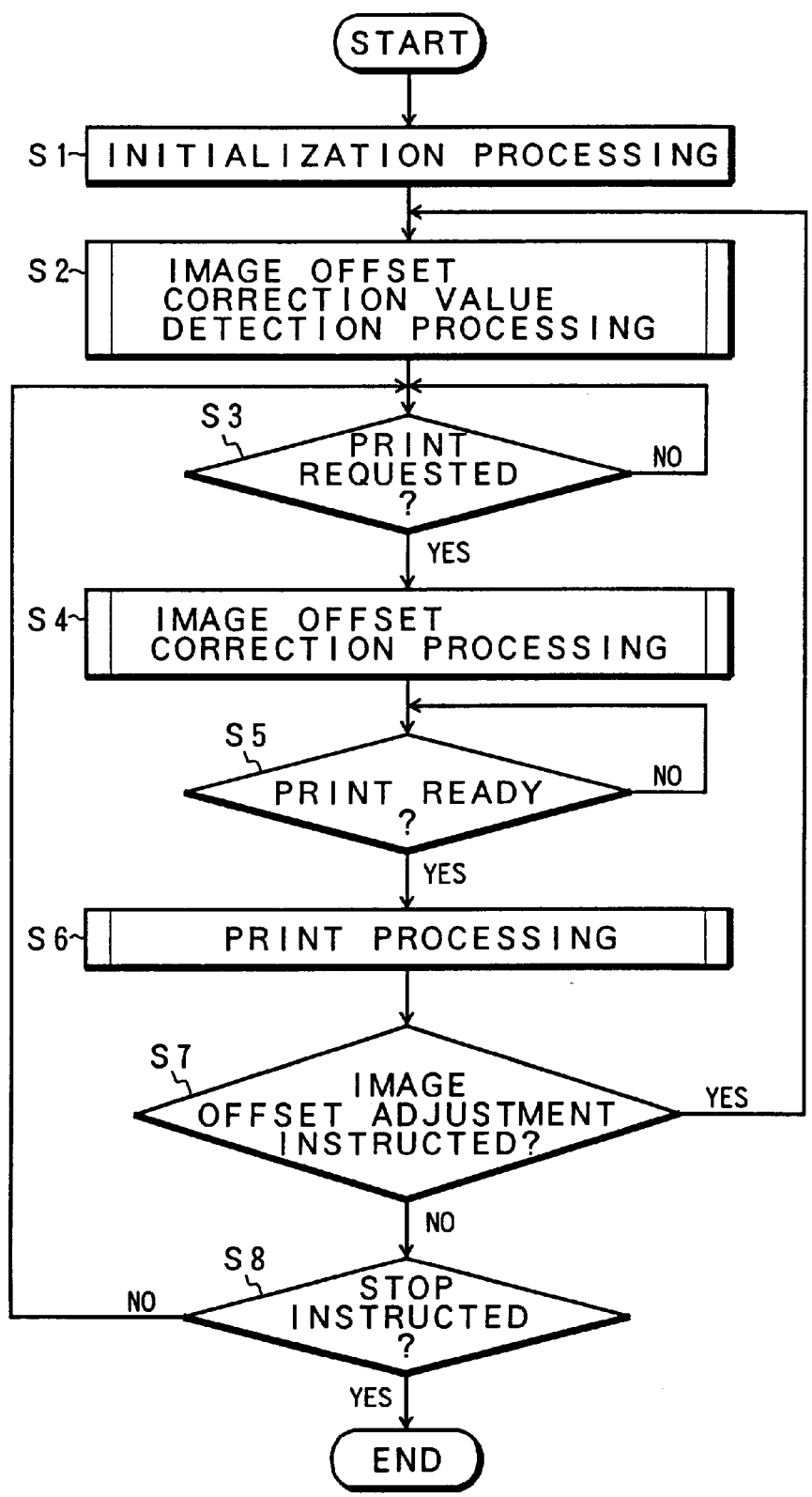
FIG. 9 is a flowchart of overall print processing in accordance with the present invention.

FIG. 9 is a generic flowchart of the print processing action executed in the printing apparatus of the present invention equipped with the functions of FIG. 7. When the apparatus is first activated, predetermined initialization processing is carried out in step S1, with the initialization processing including processing for detecting image offset correction values in step S2. After the completion of the processing for detecting image offset correction values in step S2, a check is made in step S3 to see if a request for print has been issued from a host personal computer. If the request for print has been issued, then the procedure advances to step S4 in which image offset correction processing is carried out upon the expansion into the image memories of image data transmitted from the personal computer. Then, when the preparation for print is complete in step 5, the print processing by the engine 60 is carried out in step S6. During the processing, a check is made in step S7 to see if an instruction for adjustment of the image offset has been issued. If the instruction for adjustment of the image offset has been issued, the procedure goes back to step S2 to again perform the processing for detecting the image offset correction values similar to that upon the activation by the power supply. The instruction for adjustment of image offset effected in step S7 includes a manual instruction by the operator or an instruction based on a command from the upper personal computer. Furthermore, the image offset may attribute to mechanical factors of the electrostatic recording units provided in the engine 60 and may vary depending on the environmental temperature within the apparatus. It is therefore possible to monitor the elapsed time from the supply of power to automatically perform detection processing of image offset correction values in step S2 every time the time in conformity with preset time schedule has elapsed. The time schedule in this case can be set such that immediately after the supply of power, the execution intervals of detection of the image offset correction values are shortened due to the large variation in the temperature within the apparatus and that accordingly as the elapsed time from the supply of power increases, the execution intervals of detection of the image offset correction values are elongated.

(Detection of Image Offset Correction Value)

Figure 10:
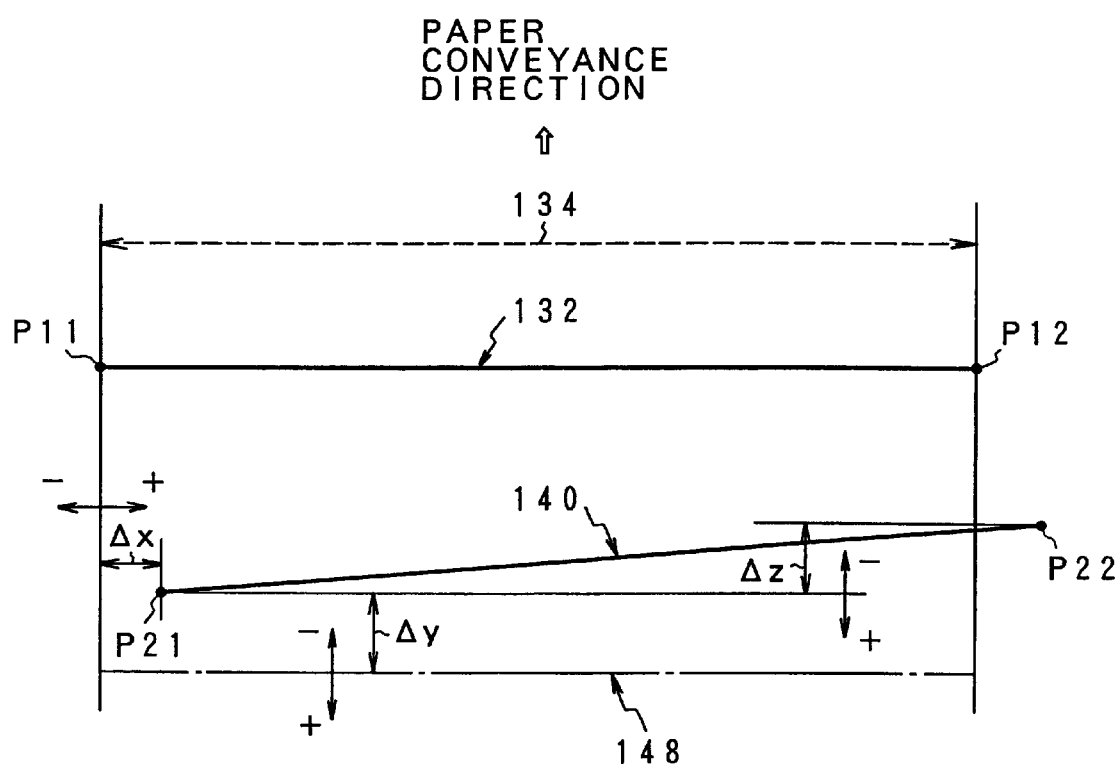
FIG. 10 is an explanatory diagram of a principle for the detection of image offsets.

FIG. 10 illustrates a principle of image offset detection of object images of the other colors Y, M and C with respect to the image of the black K having the strongest contrast, executed by the correction value arithmetic unit 118 of FIG. 7, showing the case of the image offset of the object image of cyan C. First, a reference print line 132 is defined as a print line of black K having an AT4 paper width 134 orthogonal to the paper conveyance direction. With respect to this reference print line 132, the object print line 140 of the printed cyan C has a positional offset relative to an ideal print line 148 due to a mechanical offset or the like of the C electrostatic recording unit relative to the black K electrostatic recording unit. Where P11 is a start position of the reference line 132, P12 an end position thereof, P21 is a start position of an offset of the object print line 140, and P22 is an end position thereof, the positional offset of the object print line 140 relative to the ideal print line 148 can be defined by three elements:

I. an image offset correction value $\Delta X$ in the horizontal scanning direction of the start position P21;
II. an image offset correction value $\Delta Y$ in the vertical scanning direction of the position P21; and
III. a correction value (skew correction value) $\Delta Z$ in the skew direction, indicative of the inclination of a line defined by the image offset correction values in the vertical scanning direction of the positions P21 and P22.

Figure 11:
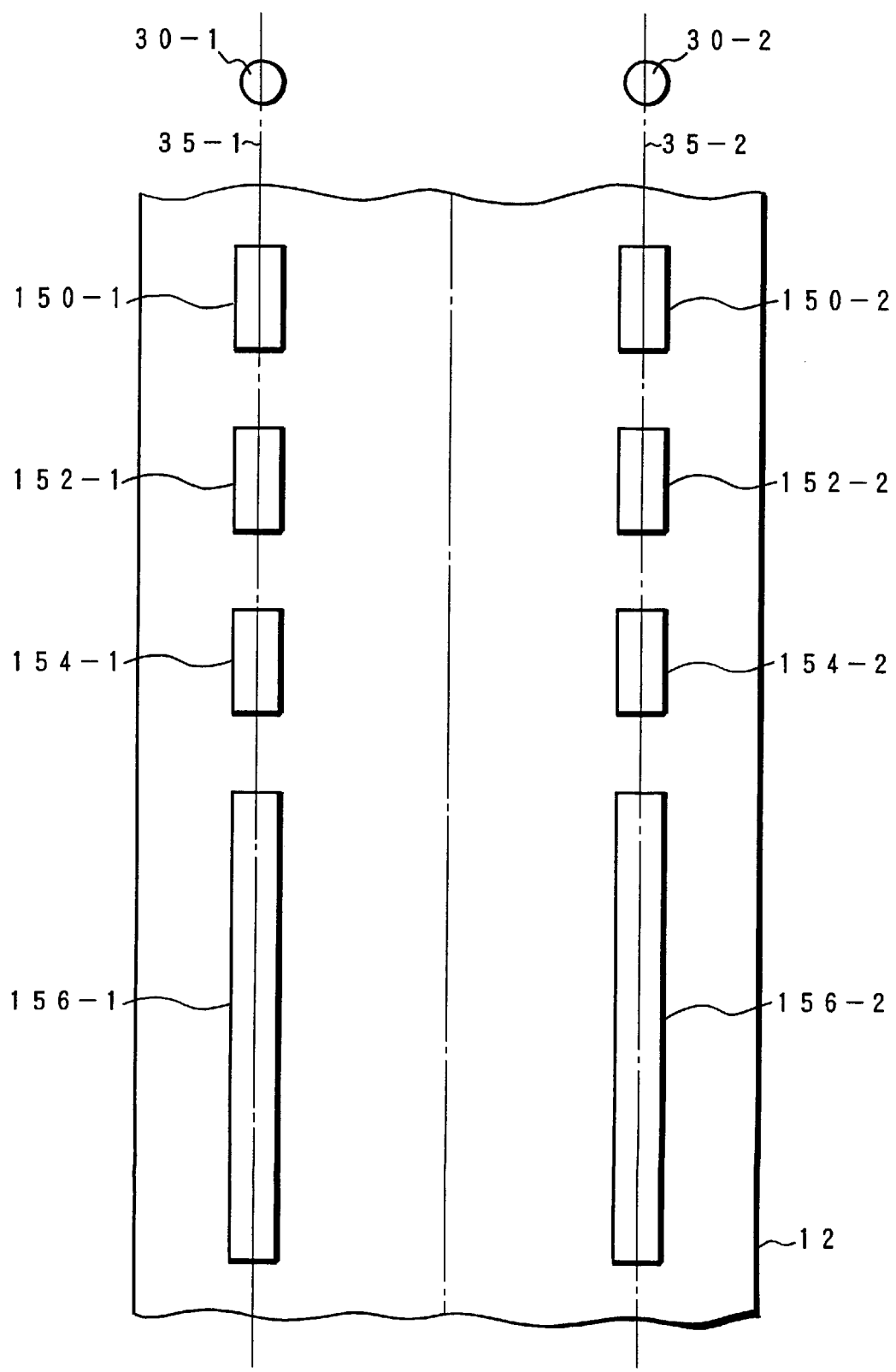
FIG. 11 is an explanatory diagram of an arrangement of mixed color mark trains transferred onto the belt for use in the detection of correction values of the amount of image offsets.

In order to effect the detection of the image offset correction values $\Delta X$, $\Delta Y$ and $\Delta Z$ of FIG. 10, two trains of resist marks are transferred onto the endless belt 12 in its moving direction as shown in FIG. 11 and are detected for calculation by the sensors 30-1 and 30-2. On the left side of the endless belt 12 lying on a detection line 35-1 of the sensor 30-1 there are formed a K-C mark train 150-1, a K-M mark train 152-1, a K-Y mark train 154-1 and a transverse fine line mark train 156-1 through the transfer of the resist marks by the correction mark formation unit 116 of FIG. 7. Similarly, on the right side of the endless belt 12 lying on a detection line 35-2 of the sensor 30-2 there are formed a K-C mark train 150-2, a K-M mark train 152-2, a K-Y mark train 154-2 and a transverse fine line mark train 156-2. Description is now made of the case of the left side mark trains detected by the sensor 30-1. The K-C mark train 150-1 is a mixed color mark train formed by superposing a K mark train and a C mark train on each other in an offset manner. The K-M mark train 152-1 is a mark train formed by superposing a K mark train and an M mark train on each other in an offset manner. The K-Y mark train 154-1 is a mark train formed by superposing a K mark train and a Y mark train on each other. Furthermore, the transverse fine line mark train 156-1 is formed by iterating the overlap of mark trains of two colors of K-C, K-M and K-Y by predetermined number of times.

With a mark train group of FIG. 11 as one unit, the correction mark formation unit 116 of FIG. 7 forms iteratively a pattern of the mark train group of FIG. 11 over the length equal to substantially integer times the circumferential length of the endless belt 12.

Figure 12:
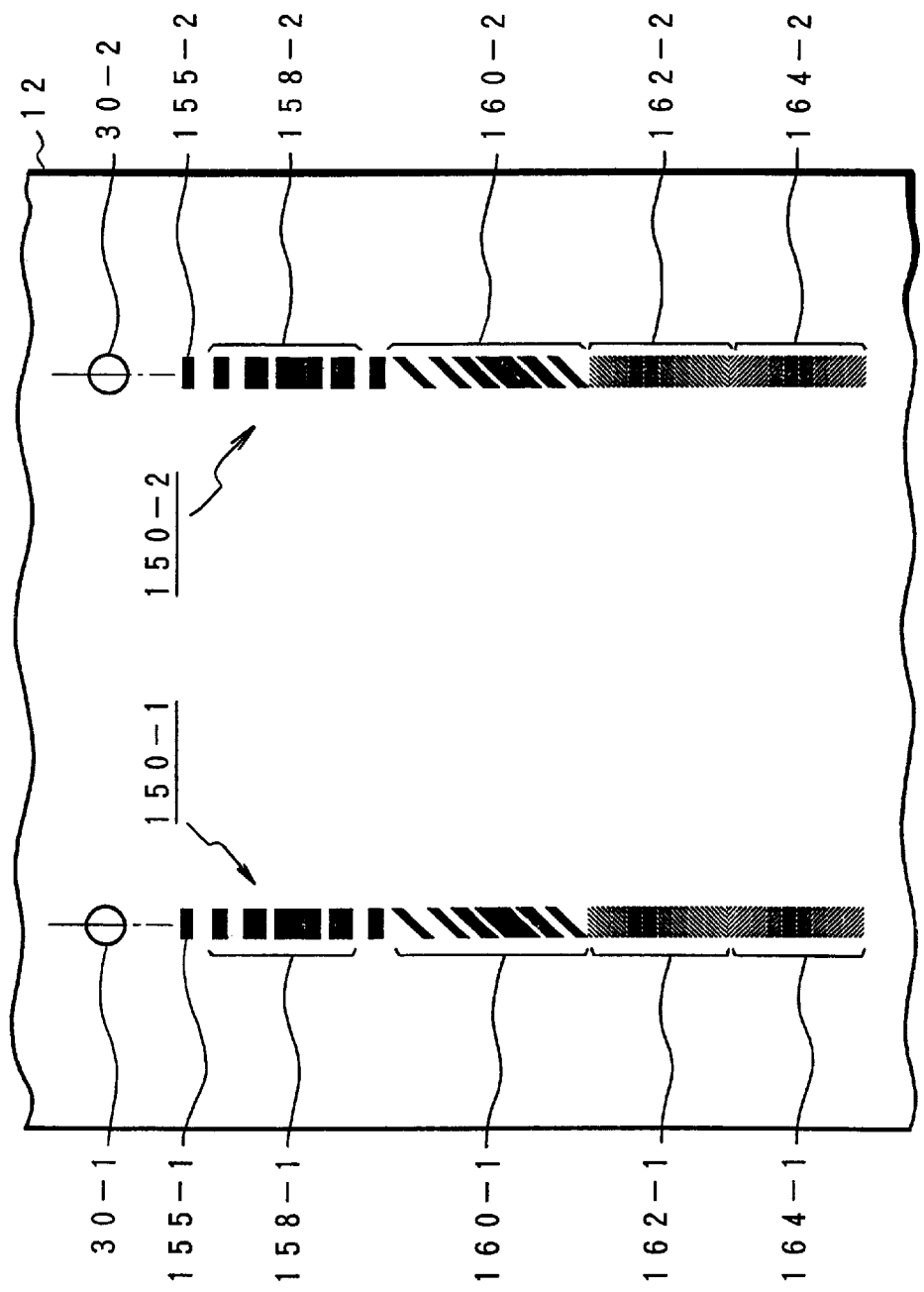
FIG. 12 is an explanatory diagram of K-C mark trains of FIG. 11 shown in an exclusive manner.

FIG. 12 illustrates a specific example of the K-C mark trains 150-1 and 150-2 positioned at the top of FIG. 11. In the case of the left side K-C mark train 150-1 for example, a K premark 155-1 is formed at the fore-end, which is followed by a transverse line mark train 158-1, a slanted line mark train 160-1, a slanted fine line mark train 162-1, a reversely slanted fine line mark train 164-1. In the case of the right side K-C mark train 150-2 as well, there are formed a transverse line mark train 158-2, a slanted line mark train 160-2, a slanted fine line mark train 162-2 and a reversely slanted fine line mark train 164-2. It is natural that each mark is in the form of a mixed color mark train formed by superposing the C mark train on the K mark train in an offset manner. This mark train structure of the K-C mark trains 150-1 and 150-2 applies to the second K-M mark trains 152-1 and 152-2 and the third K-Y mark trains 154-1 and 154-2 of FIG. 11.

Figure 13:
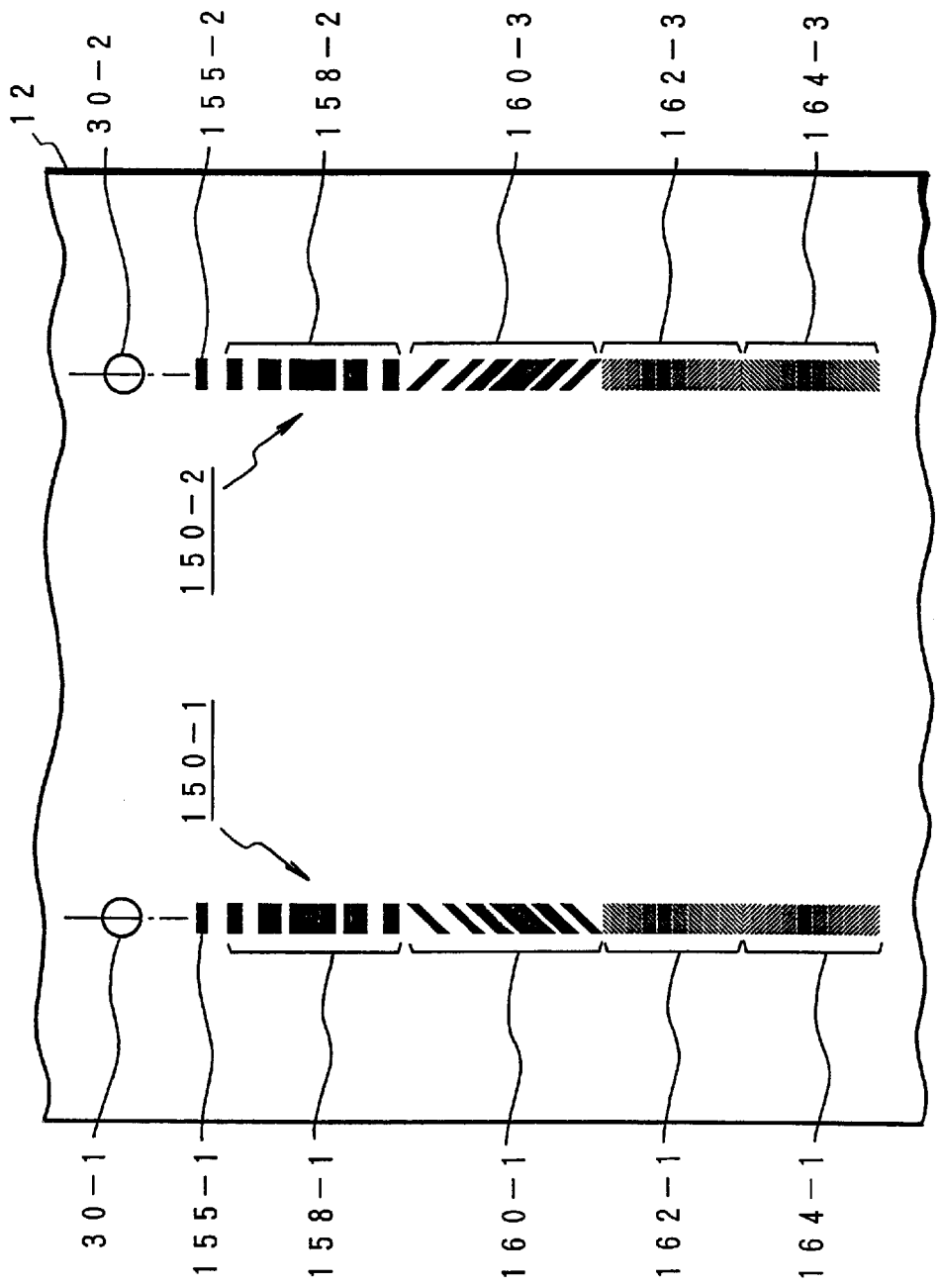
FIG. 13 is an explanatory diagram of another embodiment of the K-C mark trains of FIG. 11.

FIG. 13 illustrates another embodiment of the K-C mark trains 150-1 and 150-2 of FIG. 11, which is characterized in that the right side mark train slanted lines have an inclination reverse to that of the left side mark train slanted lines. That is, the same direction of inclination is imparted to the right and left slanted line mark trains 160-1 and 160-2, slanted fine line mark trains 162-1 and 162-2, and reversely slanted fine line mark trains 164-1 and 164-2 of FIG. 12. In FIG. 13, as opposed to this, the left side slanted line mark train 160-1, slanted fine line mark train 162-1 and reversely slanted fine line mark train 164-1 have the direction of inclination reverse to that of the right side slanted line mark train 160-3, slanted fine line mark train 162-3 and reversely slanted fine line mark train 164-3.

Figure 14:
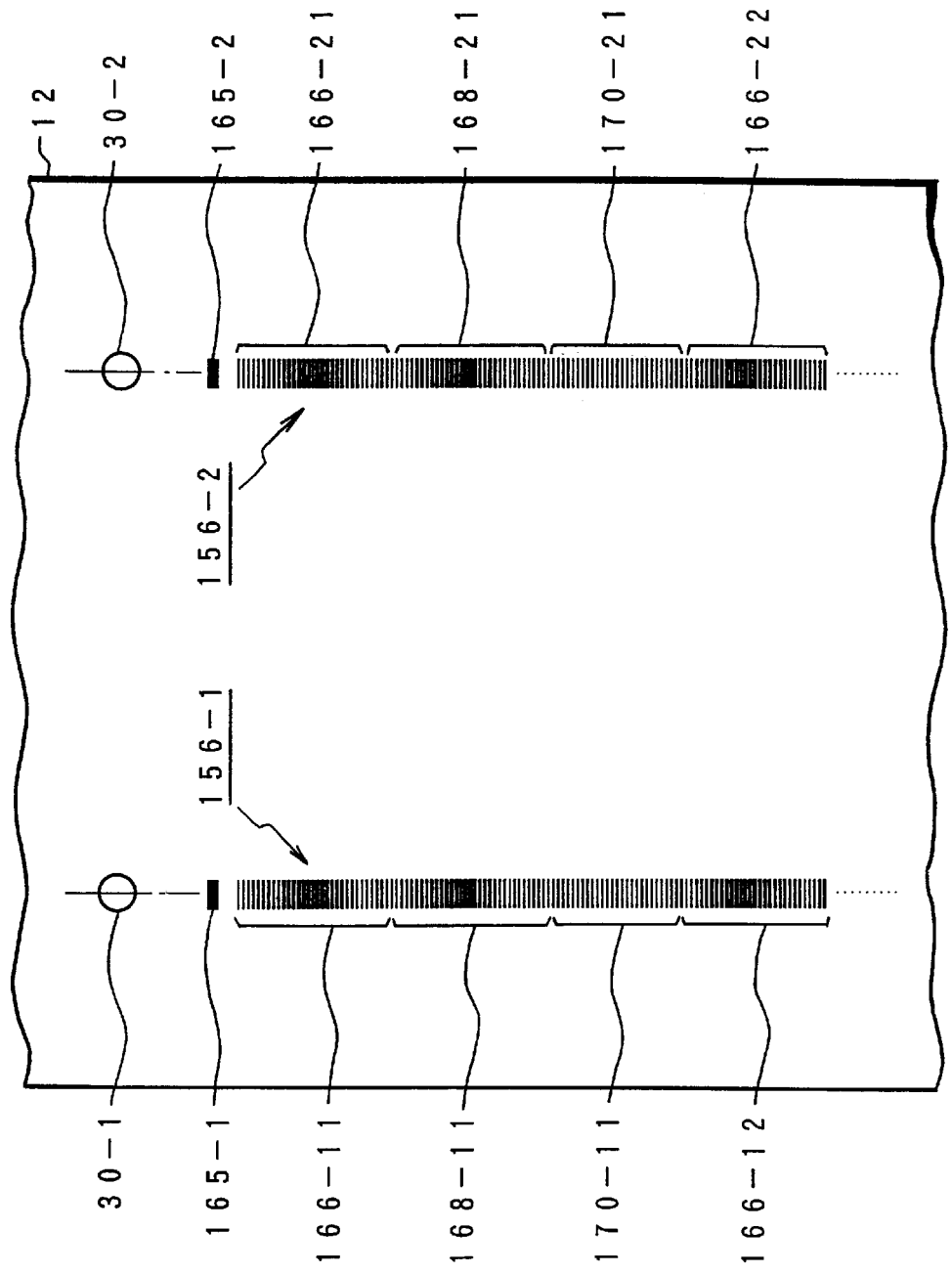
FIG. 14 is an explanatory diagram of the foremost portion of transverse fine line mark trains of FIG. 11 shown in an exclusive manner.

FIG. 14 illustrates an embodiment of the fore-end portion of the transverse fine line mark trains 156-1 and 156-2 of FIG. 11. In the case of the left side transverse fine line mark train 156-1 detected by the sensor 30-1 by way of example, a K premark 165-1 is positioned at the fore-end, which is followed by three mark train patterns in the form of a K-C transverse fine line mark train 166-11, a K-M transverse fine line mark train 168-11 and a K-Y transverse fine line mark train 170-11, with the subsequent iteration of the same mark train patterns. In the embodiment of the present invention, the number of times of iteration of the patterns is 39. In the case of the right side transverse fine line mark train 156-2 as well, a K premark 165-2 is positioned at the fore-end, which is followed by three mark trains in the form of a K-C transverse fine line mark train 166-21, a K-M transverse fine line mark train 168-21 and a K-Y transverse fine line mark train 170-21, with the subsequent total 39 times iteration of the three mark trains.

Figure 15:
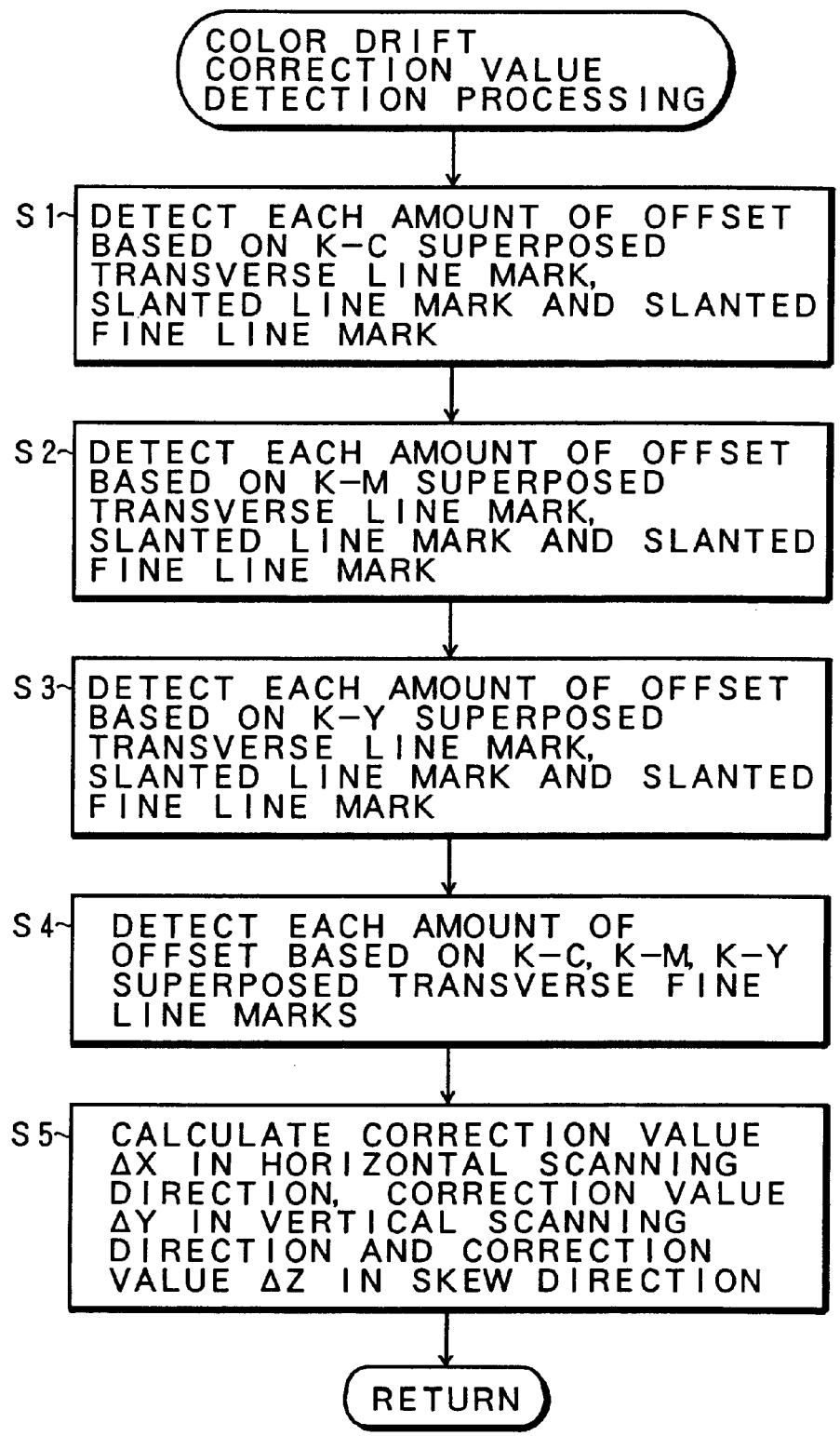
FIG. 15 is a generic flowchart of image offset correction value detection processing effected by a correction value calculation unit of FIG. 7.

FIG. 15 is a flowchart of a generic procedure of processing effected by the correction value arithmetic unit 118 for detecting three offset correction amounts $\Delta X$, $\Delta Y$ and $\Delta Z$ of FIG. 10 through the read by the sensors 30-1 and 30-2 of the mark trains of FIGS. 11 to 14 formed on the endless belt 12 by the correction mark formation unit 116 of FIG. 7. In the case of this image offset correction value detection processing, first in step S1, from read signals by the sensors 30-1 and 30-2 of the K-C mark trains 150-1 and 150-2 of FIG. 11 there are detected image offsets corresponding to the mark trains based on the transverse line mark trains 158-1 and 15802, slanted line mark trains 160-1 and 160-2 and the slanted fine line mark trains 162-1, 162-2, 164-1 and 164-2, the details of which are shown in FIG. 12. Then in step S2, the K-M mark trains 152-1 and 152-2 of FIG. 11 are subjected to similar image offset detection based on each mark train. Then in step S3, the K-Y mark train 154-1 and 154-2 of FIG. 11 are subjected to image offset detection based on each mark train. Then in step S4, detection is made of each image offset on the basis of the transverse fine line mark trains obtained by superposing K-C, K-M and K-Y in the transverse fine line mark trains 156-1 and 156-2 as shown in FIG. 14 in detail. After the completion of such image offset detection from the mark trains in steps S1 to S4, finally in step S5, based on the detected image offsets there are calculated a correction value $\Delta X$ in the horizontal scanning direction, a correction value $\Delta Y$ in the vertical scanning direction and a correction value (skew correction value) $\Delta Z$ in the skew direction shown in FIG. 10.

(Image Offset Detection Based on Transverse Line Mark Trains)

Figure 16:
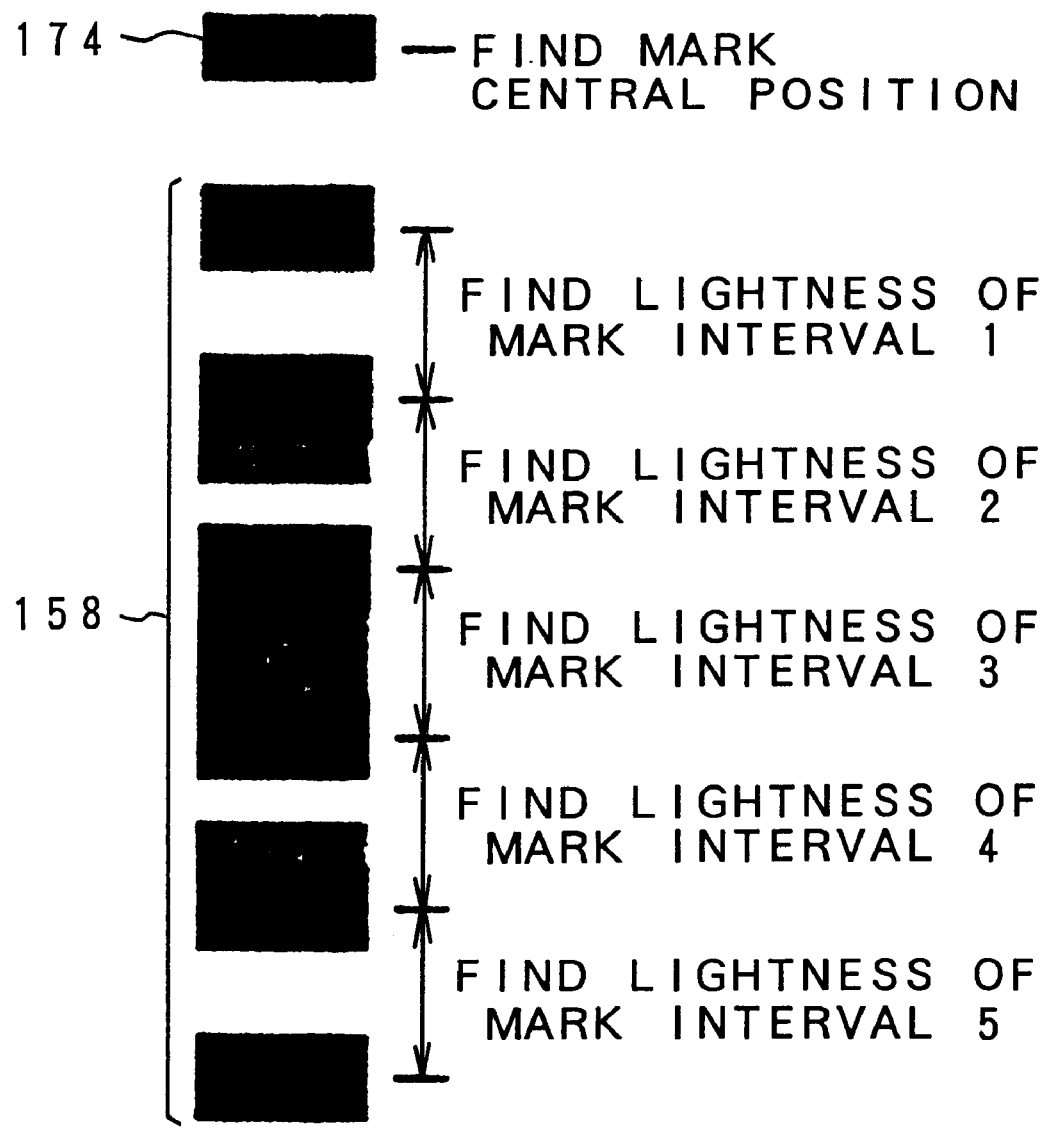
FIG. 16 is an explanatory diagram of the K-C transverse line mark train of FIG. 12 shown in an enlarged scale.
Figures 17A, 17B:
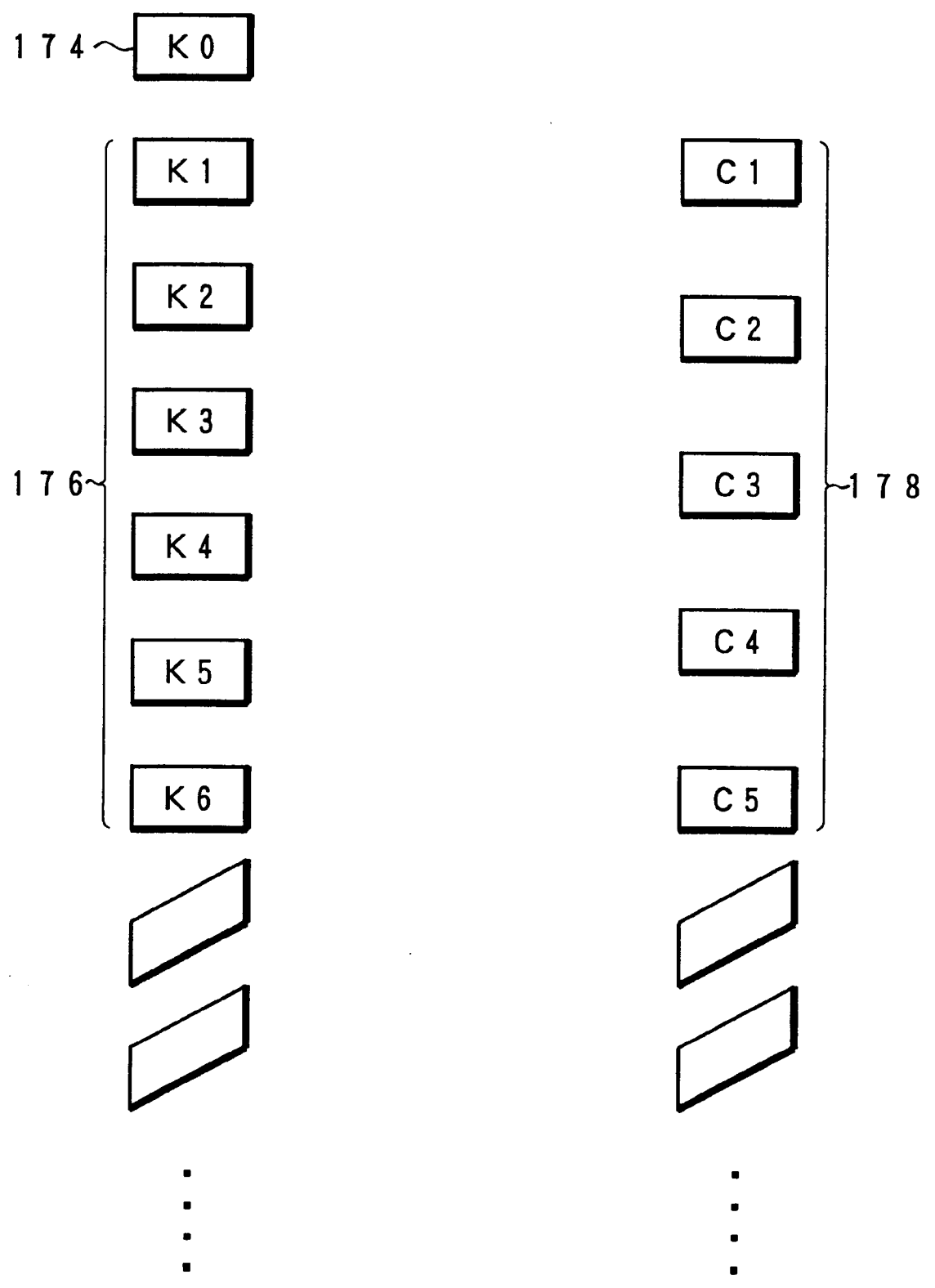

FIG. 16 is an enlarged view of the transverse line mark train 158-1 positioned at the fore-end of the left side K-C mark train 150-1 detected by the sensor 30-1 of FIG. 12, the mark train consisting of a K premark 174 and a K-C transverse line mark train 158. This K-C transverse line mark train 158 is formed by superposing a K transverse line mark train 176 of FIG. 17A and a C transverse line mark train 178 of FIG. 17B on each other and by transferring them in the form of a mixed color mark train of two colors. In FIG. 17A, the K premark 174 is followed by the formation of the K transverse line mark train 176 consisting of six juxtaposed marks K1 to K6. As opposed to this, the C transverse line mark 178 of FIG. 17B consists of five marks C1 to C5. In the K transverse line mark train 176 and C transverse line mark train 178, the fore-end marks K1 and C1 lie at the same position and the tail-end marks K6 and C5 also lie at the same position, with different mark pitches.

FIGS. 18A to 18E illustrate a relationship with K and C transverse line mark trains 176 and 178 of FIG. 16 for forming the K-C transverse line mark train 158 of FIG. 16, and a lightness pattern obtained when the K-C transverse line mark train 158 has been read by the sensor. FIG. 18A shows the K transverse line mark train 176 following the K premark 174, the mark train 176 consisting of six marks K1 to K6, with a mark line width W in the endless belt moving direction (vertical scanning direction), and with a pitch P1. FIG. 18B shows the C transverse line mark train 178 consisting of five marks C1 to C5, with its line width W which is equal to that of the K transverse line mark train 176, but with its pitch P2 which is larger than P1. In this case, a difference between the pitches P1 and P2 of the K transverse line mark train 176 and the C transverse line mark train 178 is $\Delta P$. In the present invention, the resolving power in the endless belt moving direction (vertical scanning direction) is for example 1800 dpi which depends on the processing speed of a plotting LSI used as the controller unit 62 of FIG. 4, whereas the resolving power in the horizontal scanning direction orthogonal to the endless belt moving direction is set to 600 dpi which is determined by the arrangement of the LED chips of the LED arrays 36-1 to 36-4 provided in the K, C, M and Y electrostatic recording units 24-1 to 24-4. Using dots determined by the resolving power of 600 dpi in the belt moving direction, the dimensions of marks of FIGS. 18A to 18C are specifically presented as follows.

Line width W=48 dots
Pitch P1=96 dots
Pitch P2=120 dots
Pitch difference ΔP=24 dots The dot pitch for 600 dpi results in 42.3 $\mu$m. Thus, if the dot count is represented as $\mu$m, the following results.

Line width W=2,030.4 $\mu$m
Pitch P1=4,060.8 $\mu$m
Pitch P2=5,076.0 $\mu$m
Pitch difference ΔP=1,015.2 $\mu$m In the case of the line width W for example, with W=48 dots, the conversion of dot count of 600 dpi into $\mu$m can be given as $$48 \text{ dots} \times 42.3 \ \mu\text{m} = 2{,}030.4 \ \mu\text{m}$$

Such K transverse line mark train 176 of FIGS. 18A and C transverse line mark train 178 of FIG. 18B are superposed on each other for transfer to obtain a K-C transverse line mark train 158 as shown in FIG. 18C. When observing the degree of overlap of the K-C transverse line mark train 158, the fore-end marks K1 and C1 and the tail-end marks K6 and C5 are completely superposed on each other. Between the opposite ends, the degree of overlap of the marks K and C is shifted by the pitch difference ΔP, with the mark C3 lying at the central position 175 without overlapping with the marks K3 and K4. Subsequently, overlap occurs from the reverse direction as the marks K5 and C4 so that the marks K6 and C5 completely coincide with each other at the final positions. When the K-C transverse line mark train 158 having such overlaps of K and C is read by the scattered light type sensor of FIGS. 5 and 6, there is obtained a lightness pattern of a scattered light level shown in FIG. 18D, whereas in the case of the transmission type sensor, there is obtained a lightness pattern of a transmitted light level as in FIG. 18E. In the lightness pattern of the scattered light level of FIG. 18D, the phase at the central position 175 of the K-C transverse line mark train 158 in the endless belt moving direction, i.e., in the vertical scanning direction is zero, with the phase at the mark start position being $-\pi$, and with the phase at the mark end position being $+\pi$, so that if the average value of the detection mode of the mark trains is found by dividing into five regions, there are obtained discrete values of a sine curve, which results in maximum value at its both ends $\pm\pi$, with minimum value Lmin at the center, and with intermediate value at $\pm\pi/2$. On the other hand, in the case of the transmitted light level by the transmission type sensor of FIG. 18E, there is obtained discrete values of a sine curve which results in a minimum value at opposite ends $\pm\pi$ with its maximum value Lmax at the central position 175.

FIGS. 19A to 19E illustrate a case where the C transverse line mark train 178 has been offset in the advance direction from the state of no image offset of FIGS. 18A to 18E. As shown in FIG. 19B, the C transverse line mark train 178 is offset by +A1 in the advance direction relative to the K transverse line mark train 176 of FIG. 19A. An example herein is such that +A1 is equal to 24 dots, which means that the offset is equal to a half of the mark line width W. In this case, the K-C transverse line mark train 158 presents the degree of overlap as shown in FIG. 18C, with the lightness patterns of the scattered light level and the transmitted light level read by the sensors being shown in FIGS. 19D and 19E, respectively. When viewing the lightness pattern of the scattered light level of FIG. 19D, the minimum value Lmin of a broken line free from any image offset is subjected to a phase shift by $+\pi/2$ as the minimum value Lmin indicated by a solid line. In the case of the lightness pattern of the transmitted light level of FIG. 19E as well, the maximum value Lmax of a broken line with no image offset suffers from a phase shift by $+\pi/2$ as the maximum value Lmax indicated by a solid line. That is, there occurs a variation in phase of the lightness pattern, which results in an image offset $+A1 = +\pi/2$.

FIGS. 20A to 20E illustrate a case where the C transverse line mark train 178 has been offset in the lag direction. That is, the C transverse line mark train 178 of FIG. 20B is subjected to an image offset −A in the lag direction relative to the K transverse line mark train 176 of FIG. 20A. An example herein is a case where −A is equal to −24 dots. In this case, there is obtained a mark train through the overlap of two colors of the K-C transverse line mark train 158 as shown in FIG. 20C. The lightness patterns read by the sensors are shown as the scattered light level of FIG. 20D or as the transmitted light level of FIG. 20E.

In the case of the lightness pattern of the transmitted light level of FIG. 20D, the minimum value Lmin with no image offset is subjected to a shift of $-\pi/2$. In the case of the transmitted light level of FIG. 20E as well, the maximum value Lmax with no image offset is subjected to a shift of $-\pi/2$. This means that there is established a relation of image offset $-A = -\pi/2$.

It is thus possible to unitarily detect an image offset by recognizing phase positions where the lightness becomes minimum or maximum, from the lightness patterns of the superposed mark trains relative to the image offset of the K and C mark trains of FIGS. 20A to 20E.

FIGS. 21A to 21E illustrate in a general form the transverse line mark trains for use in the present invention, with the case of two colors of K and C for example. FIG. 21A shows the K transverse line mark train 176 as a reference, with the mark line width W and with the pitch P1. FIG. 21B shows the C transverse line mark train 178 to be subjected to the image offset detection, with the mark line width W as well, and with the pitch P2. Between the pitches P1 and P2 of the two trains, there lies a relation expressed by P1<P2, with a pitch difference ΔP. Let N1 be the number of marks of the K transverse line mark train 176 as the reference, N2 be the number of marks of the C transverse line mark train 178 to be subjected to the image offset detection, then N1 and N2 are given as Number of C marks N2=(line width W)/(pitch difference ΔP)×2+1     (1)

Number of K marks N1=N2+1     (2)

In FIG. 21B, the C transverse line mark train 178 consists of marks C1 to Cn, with a mark Cn/2 at the central position 175. As opposed to this, the K transverse line mark train 176 consists of marks K1 to Kn+1 which is larger by one in number. Furthermore, the dot count defining the mark line width W in the two transverse line mark trains 176 and 178 provides a range of ±π in the scattered light level and the transmitted light level of FIGS. 18D and 18E for example, with the pitch difference ΔP providing a resolving power resulting in a memory pitch between ±π. In FIGS. 18A to 18C for example, W is equal to 48 dots, so that the phase range ±π of FIGS. 18D and 18E corresponds to ±48 dots. Furthermore, the pitch difference ΔP is equal to 24 dots, so that the memory pitch π/2 providing the resolving power of FIGS. 18D and 18E results in 24 dots. In other words, the phase information of FIGS. 18D and 18E has a one-to-one corresponding relationship with the dot count defining an image offset, so that by representing the phase of −π to +π by the dot count, it is possible to immediately find the image offset from the minimum value Lmin and the maximum value Lmax.

Figures 22A, 22B, 22C:
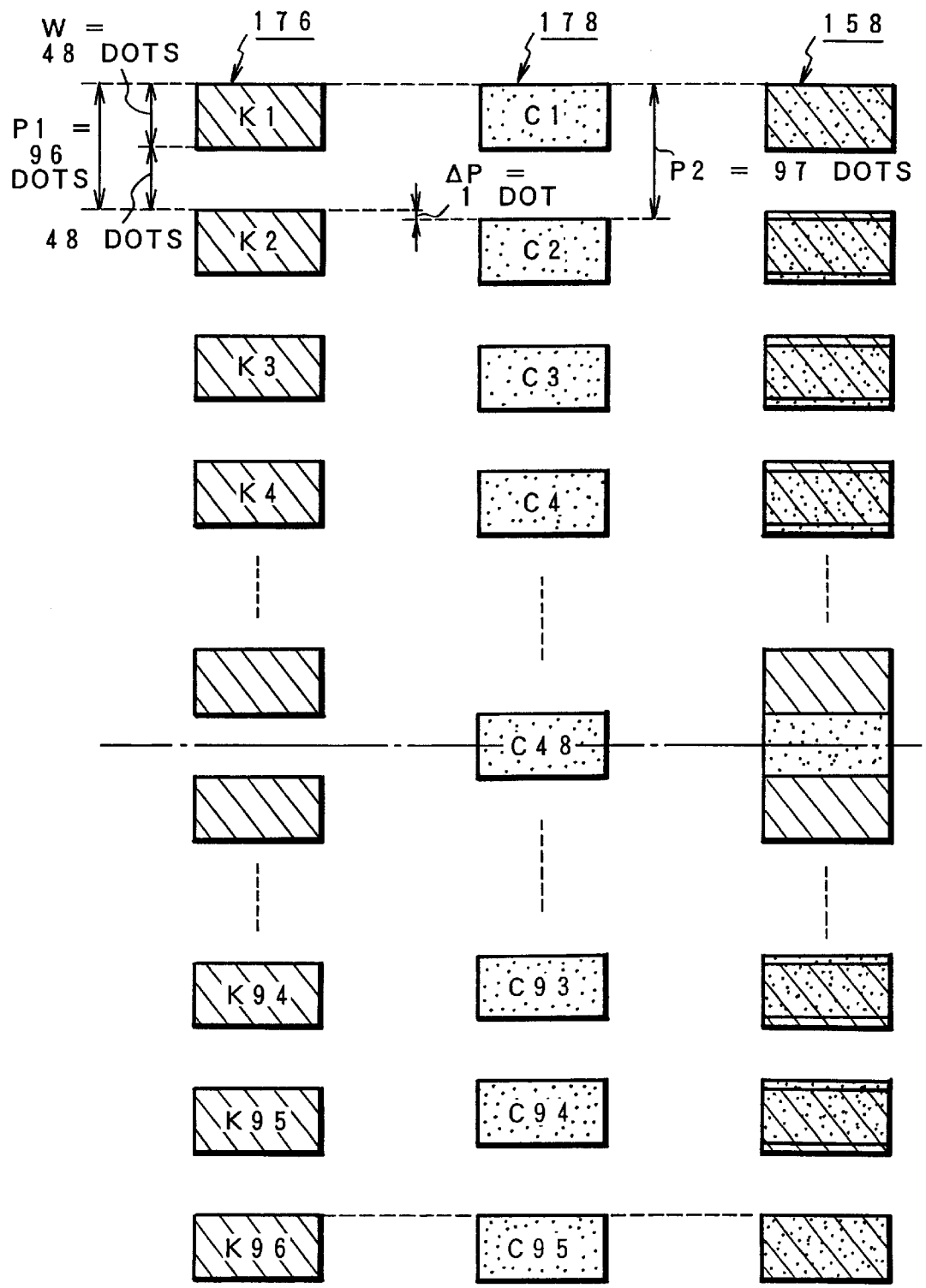
FIGS. 22A to 22C are explanatory diagrams of an ideal transverse line mark train having an image offset detection resolving power of ±1 dot.

FIGS. 22A for 22C illustrate ideal mixed color mark trains in the present invention, with the image offset detection resolving power being set to ±1 dot. FIG. 22A shows the K transverse line mark train 176 as the reference, which has a line width W being equal to 48 dots and a pitch P1 equal to 96 dots in the same manner as the case of FIG. 18A. FIG. 22B shows the C transverse line mark train 178 subjected to the image offset detection, which has a line width W being again equal to 48 dots but a pitch P2 being equal to P1+1=97 dots so as to correspond to the pitch difference ΔP=1 dot for providing a resolving power of ±1 dot. FIG. 22C shows the K-C transverse line mark train 158 obtained through the superposition of the K transverse line mark train 176 and the C transverse line mark train 178 of FIGS. 22A and 22B.

By using the mixed color mark trains as shown in FIGS. 22A to 22C, it is possible to detect the image offset at an accuracy of ±1 dot from the read pattern of the K-C transverse line mark train 158. In cases where the resolving power has been set to ±1 dot, however, there must be arranged 96 K marks K1 to K96 and 95 C marks C1 to C95, so that the length of the mark array in the belt moving direction results in $$96 \text{ dots} \times 96 \text{ dots} = 9216 \text{ dots}$$
$$= 389,936.8 \mu m \text{ (about 39cm)}$$

For this reason, there is remarkably increased the amount of use of the memories based on the A/D conversion of the read signals upon the read by the sensors, which results in an increase of the apparatus costs. Thus, in the case of the present invention, as will be made apparent from the description which follows, the image offset detection range is divided into two steps, that is, a larger one and a smaller one, which are then added together to obtain a resolving power of ±2 dots.

Figure 23:
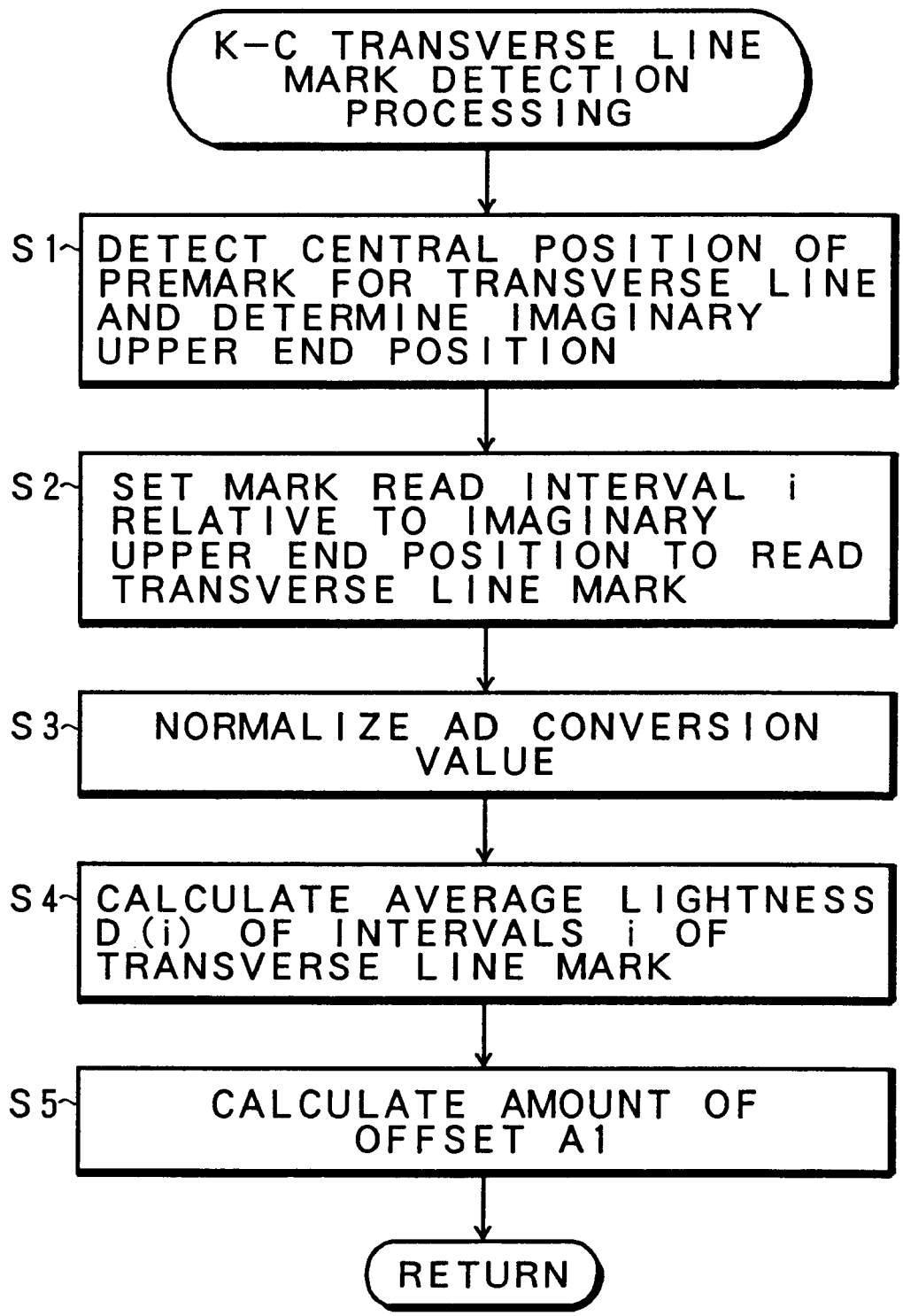
FIG. 23 is a flowchart of the K-C transverse line mark detection processing effected by the correction value calculation unit of FIG. 7.

FIG. 23 is a flowchart of K-C transverse line mark detection processing for detecting the image offset with respect to the transverse line mark train 158-1 of FIG. 16 as the object. First in step S1, the central position of the K premark 174 of FIG. 16 is detected, and the dot count equal to a half of the predetermined mark width is added to the central position to determine an imaginary upper end position. Then in step S2, a mark read interval i is set with respective to the imaginary upper end position as the reference, to read the transverse line mark. More specifically, as shown on the right side of the K-C transverse line mark train 158 in FIG. 16, intervals 1, 2, 3, 4 and 5 are set so that the lightness is obtained as the A/D conversion value of the sensor read signal for each interval. Then in step S3, the A/D conversion value of the mark lightness read by the sensor is normalized.

Figures 24A, 24B:
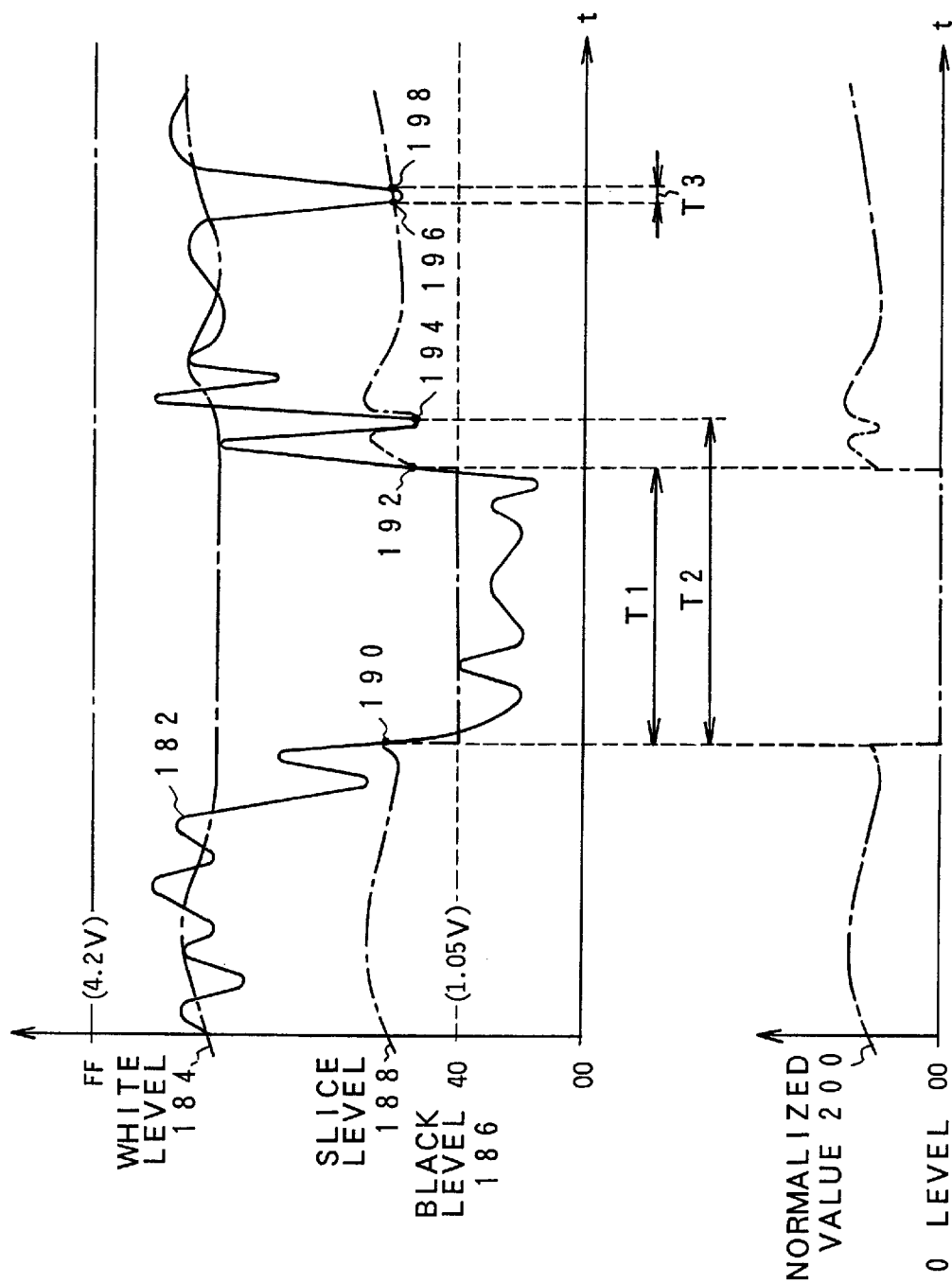
FIGS. 24A and 24B are explanatory diagrams of A/D conversion value normalization processing effected in step S3 of FIG. 23.

FIGS. 24A and 24B illustrate the contents of the normalization processing of the A/D conversion values. In FIG. 24A, the axis of abscissas represents time and the axis of ordinates represents 00h to FFh in hexadecimal as the voltage level of the sensor read signal and the conversion level of the A/D conversion value, to express the mark read signal 182. Furthermore, the mark read signal from the sensor passes through an emitter-follower so that its output creates a white level 184. A black level 186 defining a markless region assumes 40h as the A/D conversion value and 1.05 volts as the signal voltage. In other words, the black level 186 is equal to one fourth the A/D conversion value FF and the maximum voltage of 42 volts. Herein, the following limitation is given as a slice level 188 for the normalizing conversion.

Slice level=(white level−black level)/4+black level

The creation of such a slice level 188 restricts a large noise involved in the mark read signal 182. In case the value obtained by subtracting the black level 186 from the mark read signal 182 becomes negative, the normalization value is 00h. As a result of this, there is obtained a normalization value 200 as shown in FIG. 24B. Furthermore, in FIG. 24A, the mark read signal 182 contains large noises at its falling edge and rising edge in the interval free form marks. Thus, defined as 0 level interval is a term T1 having a start point 190 lower than the slice level 188 and having an end point 192 higher than the slice level 188. In this case, the mark read signal 182 varies to a large extent after the point 192, resulting in a point 194 again exceeding the slice level 188. In this event, the average value of the mark read signals 182 in the interval T1 is compared with the average value of the mark read signals 182 in the interval T2 so that the interval T1 having a smaller average value is selected as an interval of normalization level 00h. Assume that during the subsequent mark read, the mark read signal 182 has fallen to a large extent, resulting in occurrence of a falling point 196 and a rising point 198 of the slice level 188. In this case as well, there is obtained an interval T3 from the point 196 to the point 198, and if the result is equal to or lower than the normal value, then the slice level 188 is intactly kept to eliminate the noise, in disregard of the falling variation of this mark read signal 182.

Referring again to FIG. 23, after the completion of the normalization of the A/D conversion value in step S3, the procedure advances to step S4 in which average lightness D(i) of the intervals i=1 to 5 in FIG. 6 is figured out. Then in step S5, an image offset A1 is figured out. For the calculation of this image offset A1, a discrete Fourier transform is utilized so that the phase φ of the lightness pattern is obtained from the following expression.

$$\phi = \text{ArcTan (sine Fourier coefficient } a \text{ / cosine Fourier coeffiecient } b) \quad (3)$$
$$= \text{ArcTan}\left[\sum\{Di \times \sin(2\pi i/5)\} / \{\sum(Di \times \cos(2\pi i/5))\}\right]$$

where
i=1, 2, 3, . . . , n,
n=5,
φ=−π to +π

After the calculation of the phase φ of the lightness pattern in this manner, it is converted into an image offset A1 represented in dot count using the following expression $$A1 = \text{(segment number conversion value of phase } \phi) \times \text{(resolving power } \Delta P) \quad (4)$$
$$= -\{(\phi/2\pi) \times 5 - 0.5\} \times 24 \text{ [dots]}$$

Figure 25:
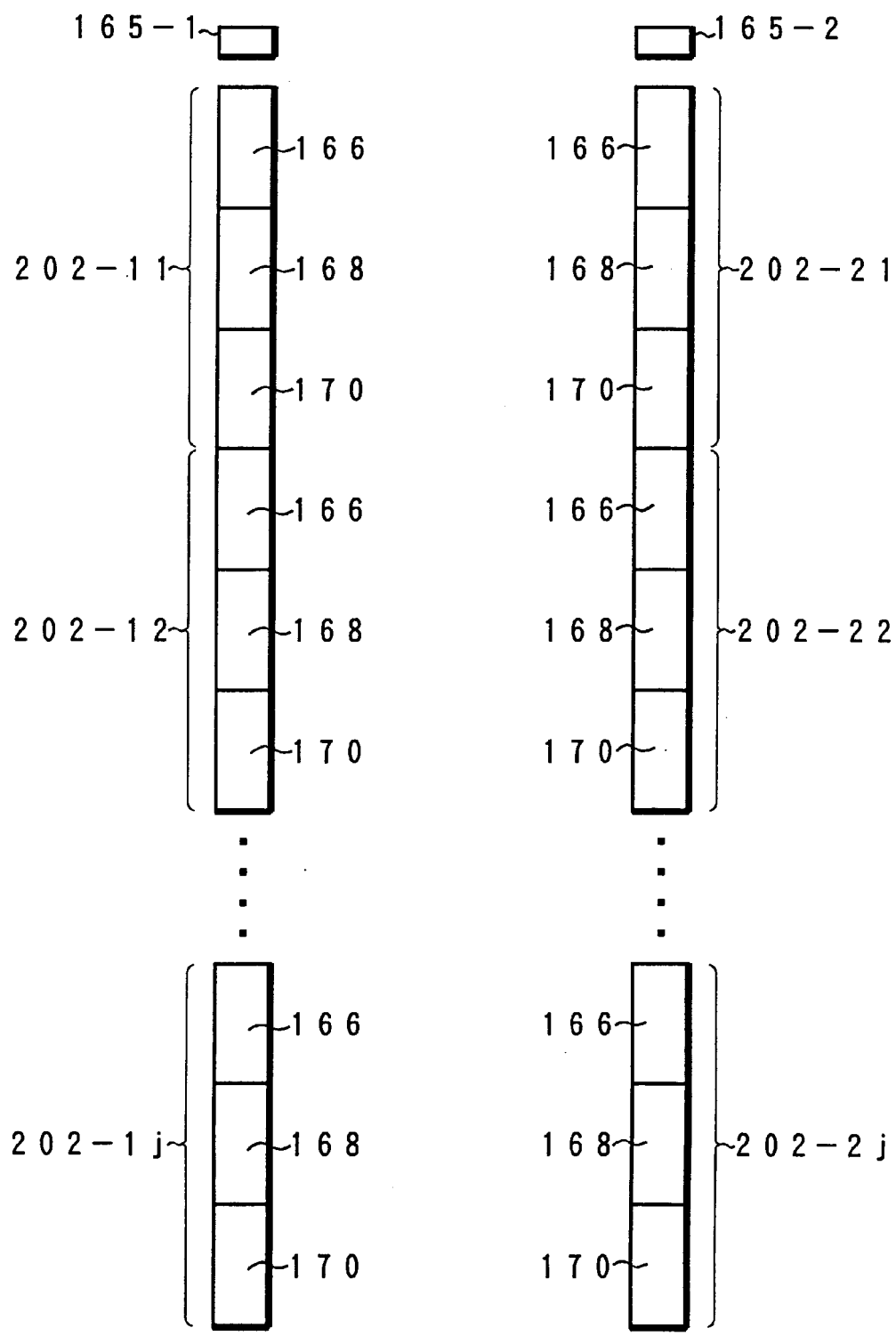
FIG. 25 is an explanatory diagram of the detailed arrangement of the transverse fine line mark trains of FIG. 11.

FIG. 25 illustrates generic schematic structures of the transverse fine line mark trains 156-1 and 156-2 of FIG. 11. In the case of the left side for example, a K premark 165-1 is followed by mark train groups 202-11 to 202-1j. The mark train groups 202-11 to 202-1j, for example the mark train group 202-11 consists of a K-C transverse fine line mark train 166, a K-M transverse fine line mark train 168 and a K-Y transverse fine line mark train 170, with the remaining groups iteratively having the same structure. In the case of the right side mark trains as well, a K premark 165-2 is followed by mark train groups 202-21 to 202-2j, with each mark train group iteratively having three types of mark trains of K-C, K-M and K-Y transverse fine line mark trains 166, 168 and 170. In this embodiment of the present invention, j is equal to 39, allowing the mark train group to be being iterated 39 times.

Figure 26:
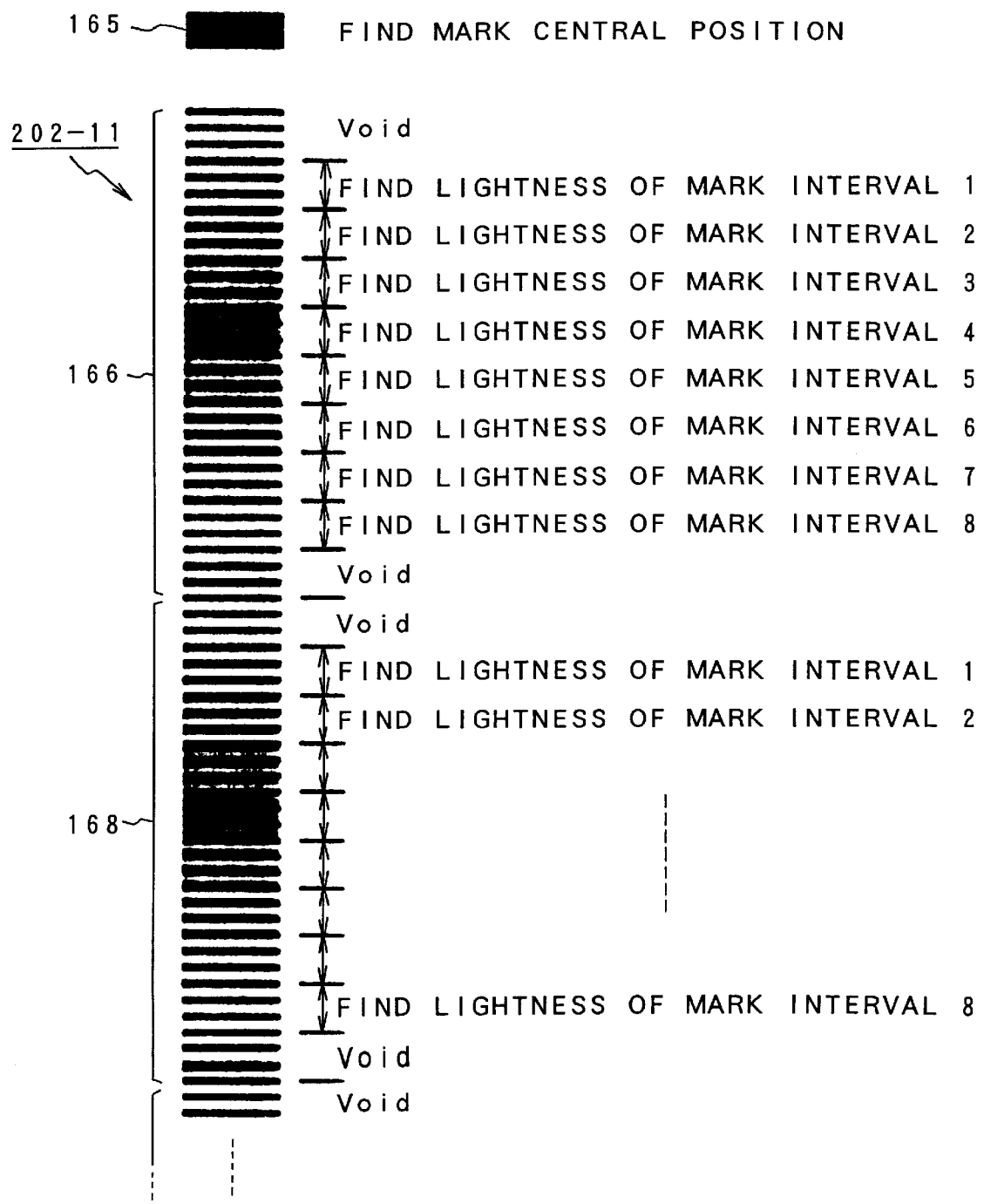
FIG. 26 is an explanatory diagram of a mark train arranged in the foremost mark train group of FIG. 25.
Figure 27:
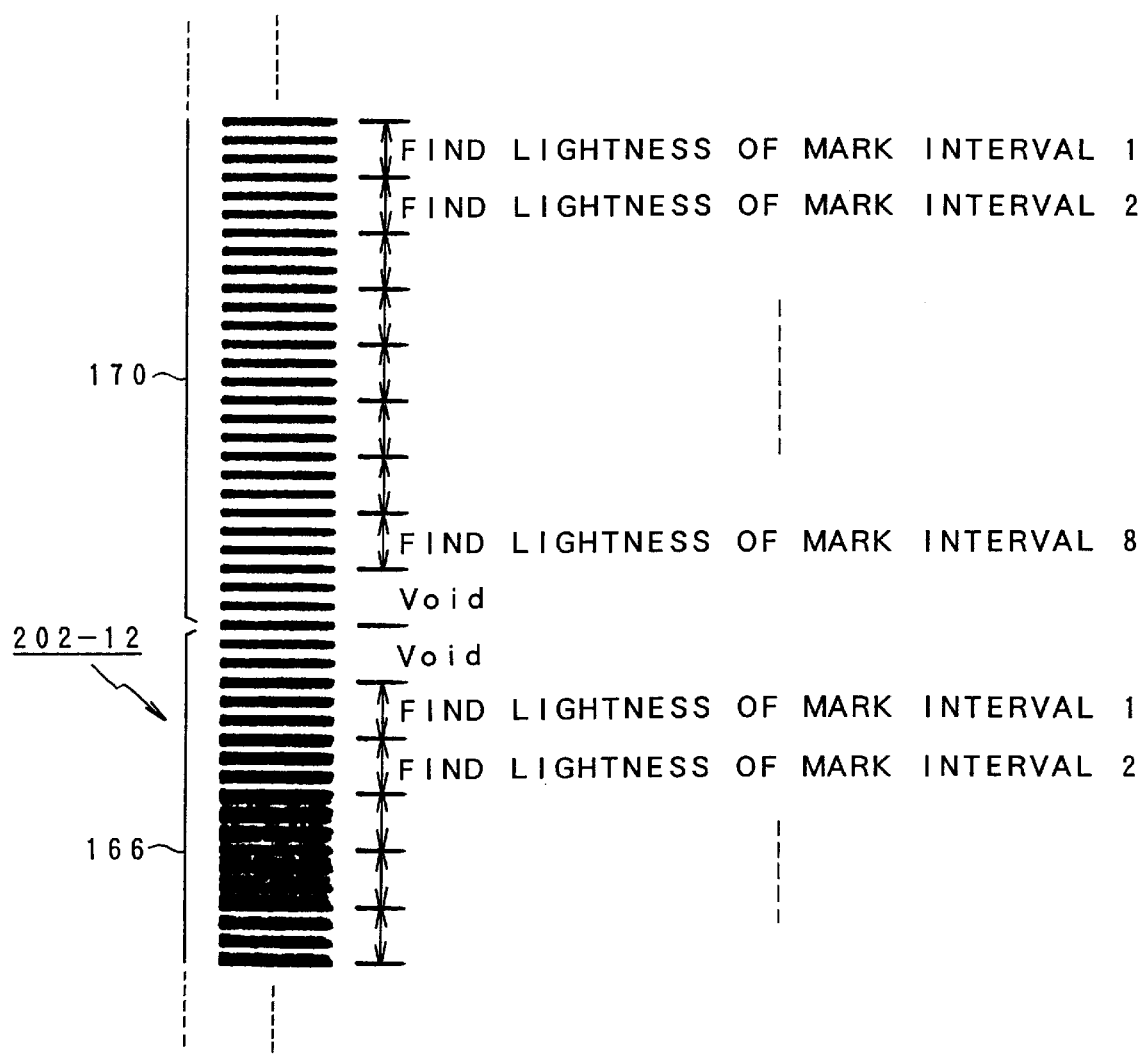
FIG. 27 is an explanatory diagram of a mark train arranged in the foremost mark train group, which follows FIG. 26.

FIG. 26 illustrates a specific example of the K-C and K-M transverse fine line mark trains 166 and 168 of FIG. 25, showing FIG. 14 in an enlarge manner. Furthermore, FIG. 27 illustrates the K-Y transverse fine line mark train 170 following FIG. 26.

Figures 28A, 28B, 28C:
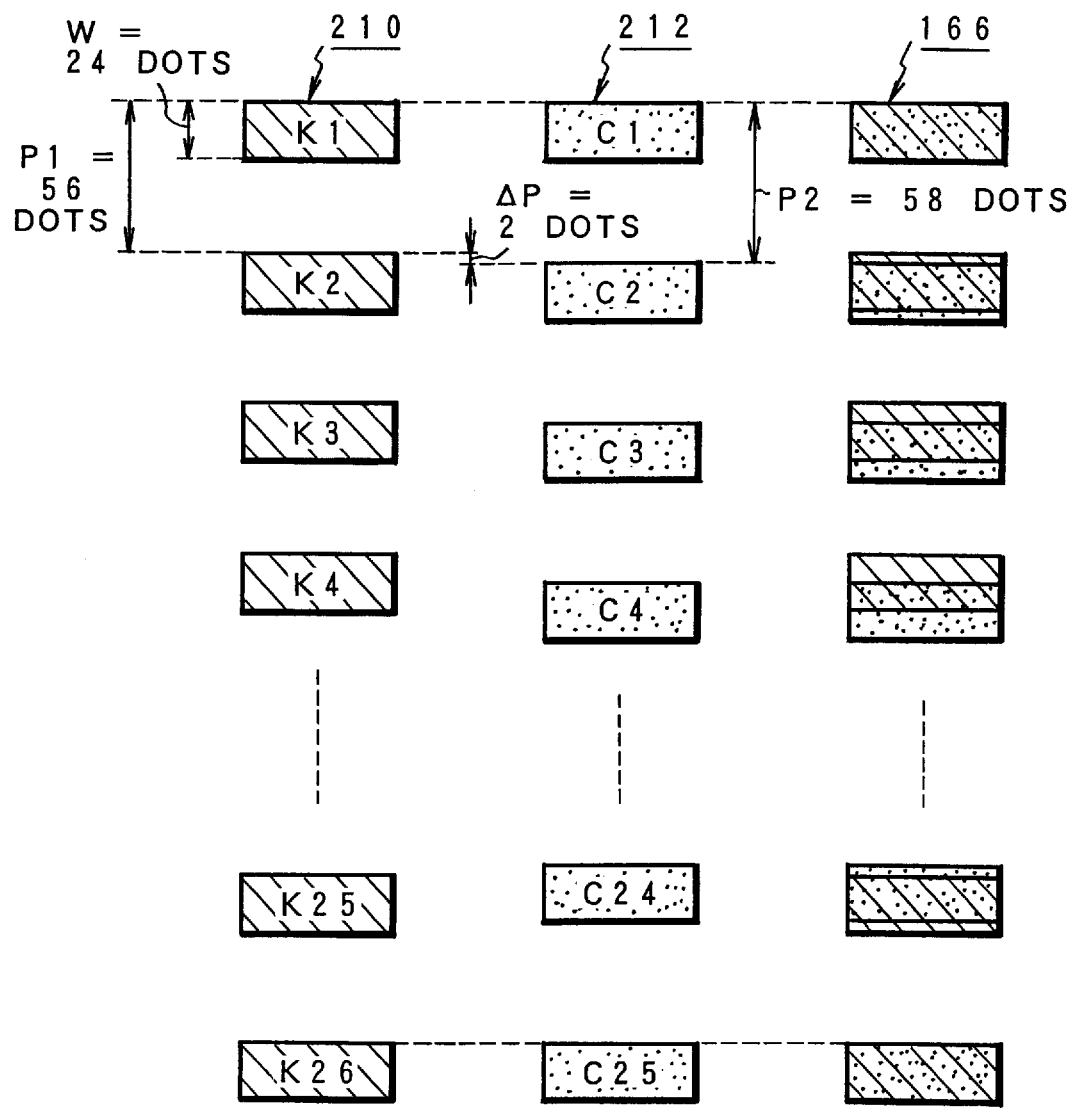
FIGS. 28A to 28C are explanatory diagrams of the arrangement structure of a K transverse fine line mark train and a C transverse fine line mark train for the formation of the K-C transverse fine line mark train of FIG. 27.

FIGS. 28A to 28C are explanatory diagrams for the formation of the K-C transverse fine line mark train 166 of FIG. 26. FIG. 28A shows the K mark train 210, with the mark line width W equal to 18 dots and with the pitch P1 equal to 48 dots. FIG. 28B shows the C transverse fine line mark train 212, with the mark line width again equal to 18 dots and with the pitch P2 equal to 50 dots. Therefore, the pitch difference ΔP between the K mark and the C mark results in 2 dots. From this line width W=18 dots, the range of ±π in the lightness pattern read by the sensor of the mark trains through the superposition of the K-C transverse fine line mark train 166 of FIG. 28C has a ±18 dot range corresponding to the line width W=18 dots. The resolving power (memory pitch) within ±18 dot range corresponding to the range of ±π results in 2 dots corresponding to the pitch difference ΔP. Furthermore, the number of marks is 26 of K1 to K26 for K marks and 25 of C1 to C25 for C marks from the above expressions (1) and (2).

The present invention achieves ±2 dot resolving power in the range of ±48 dots by adding image offsets detected in the K-C transverse line mark train 158 of FIG. 16 and in the K-C transverse line mark train 166 of FIG. 26, respectively. That is, as shown in FIG. 29A, the range ±π of the lightness pattern of FIG. 29B obtained from the K-C transverse line mark train 158 provides a range of ±48 dots in a manner corresponding to the line width W=48 dots. Furthermore, the resolving power in this case is so set as to correspond to the pitch difference ΔP=24 dots. On the other hand, in the case of the K-C transverse fine line mark train 166 of FIG. 29A, due to the line width W equal to 18 dots, a range ±12 dots is set correspondingly to ±π/4 of FIG. 29B so that within that range there is possessed the resolving power based on the pitch difference ΔP=2 dots. Such combination allows a stepwise setting of range having 2 dot resolving power with ±12 dots for each memory every 24 dots of ±48 dots as shown in FIG. 29B. Providing that the image offset A1 figured out from the K-C transverse line mark train 158 is +24 dots and that the image offset A5 figured out from the K-C transverse fine line mark train 166 is +2 dots, there is selected A5=+2 corresponding to A1=+24 dots of FIG. 29B, so that the image offset results in A1+A5=26 dots.

Figure 30:
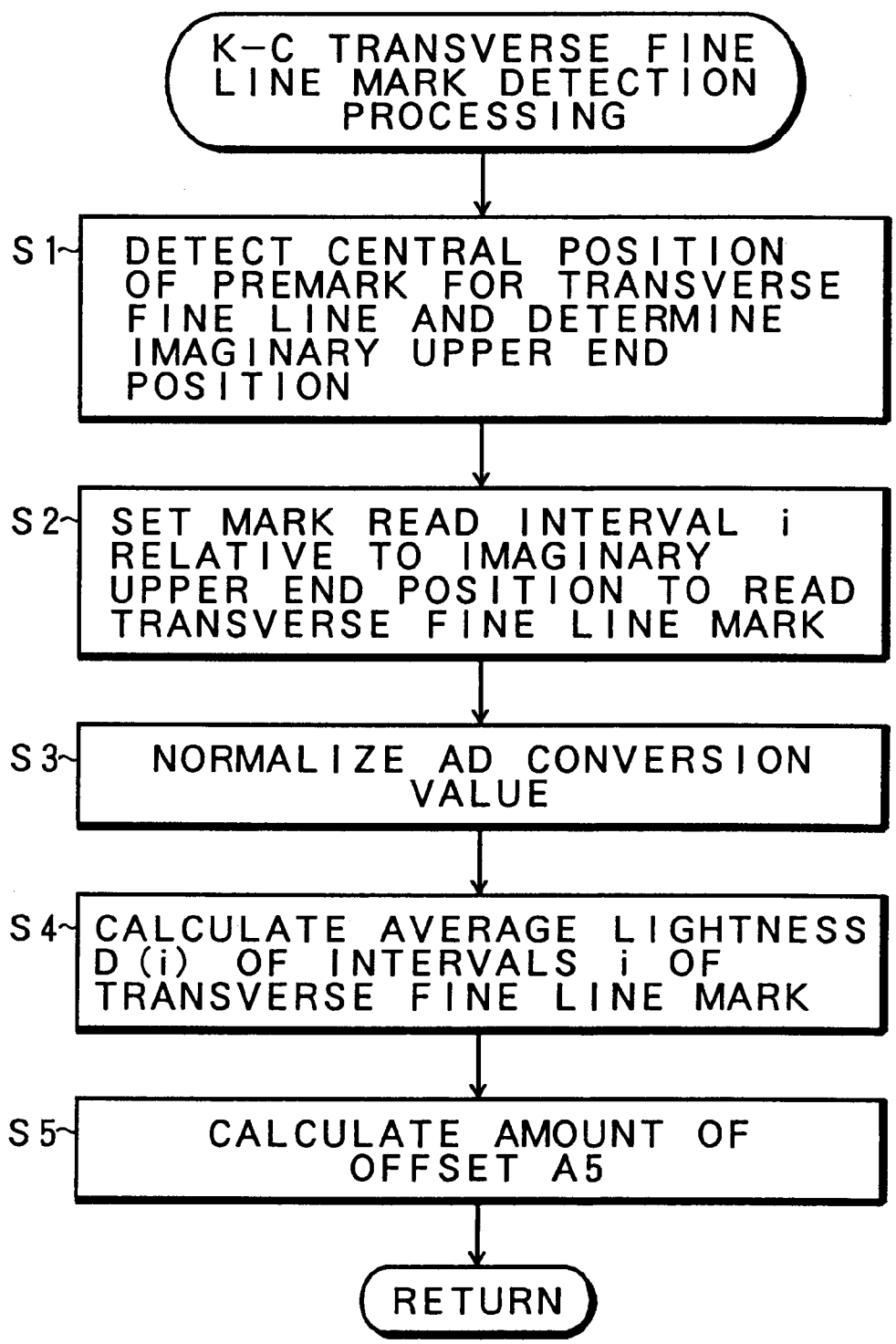
FIG. 30 is a flowchart of K-C transverse fine line mark detection processing effected by the correction value calculation unit of FIG. 7.

FIG. 30 is a flowchart for the detection of an image offset of the K-C transverse fine line mark train 166 of FIG. 26. First in step S1, a central position of the fore-end premark 165 for transverse fine line of FIG. 26 is detected to determine an imaginary upper end position defined as a half of the premark line width. Then in step S2, eight mark read intervals 1 to 8 are defined as shown in FIG. 26 with respect to the imaginary upper end position as the reference, to find the lightness pattern through the read of the marks. Then in step S3, the A/D conversion value is normalized in the same manner as the case of FIGS. 24A and 24B, and in step S4 the average lightness D(i) of the intervals is figured out. In this case, with i=1 to 8, D(1) to D(8) are figured out. Then in step S5, the image offset A5 is figured out. First on the basis of the lightness pattern, that is, the average lightness D(i) obtained in the step S4, the phase φ is figured out through the discrete Fourier transform using the following expression.

$$\phi = \text{Arc Tan}[\Sigma\{Di \times si(2\pi i/8)\}/\{\Sigma(Di \times \cos(2\pi i/8)\}] \quad (5)$$

where
i=1, 2, 3, . . . n
n=8
φ=−π to +π

Since the K-C transverse fine line mark train 166 of FIG. 26 is iterated over the intervals j=1 to 13, the image offset (A5) in an arbitrary interval j is given by the following expression.

Interval offset amount $(A5)j$=(segment number conversion value of phase φ)×(resolving power ΔP)−(iterative interval offset)={(φ/2π)×8−0.0}×2−{2/3−(j−1)×(x/3)}[dots]  (6)

where j=1 to 13
After the acquisition of the image offsets (A5)1 to (A5)13 of the intervals j=1 to 13 in this manner, the average image offset A5 is figured out from the following expression.

Average offset amount $A5 = \Sigma(A5)j/j = \{(A5)1+(A5)2+ \ldots , +(A5)13\}/13$  (7)

Such a detection of the image offset A5 based on the K-C transverse fine line mark train 166 applies similarly to the remaining K-M transverse fine line mark train 168 and K-Y transverse fine line mark train 170 shown in FIGS. 26 and 27.

(Image Offset Detection Based on Slanted Line Mark Train)

Figure 31:
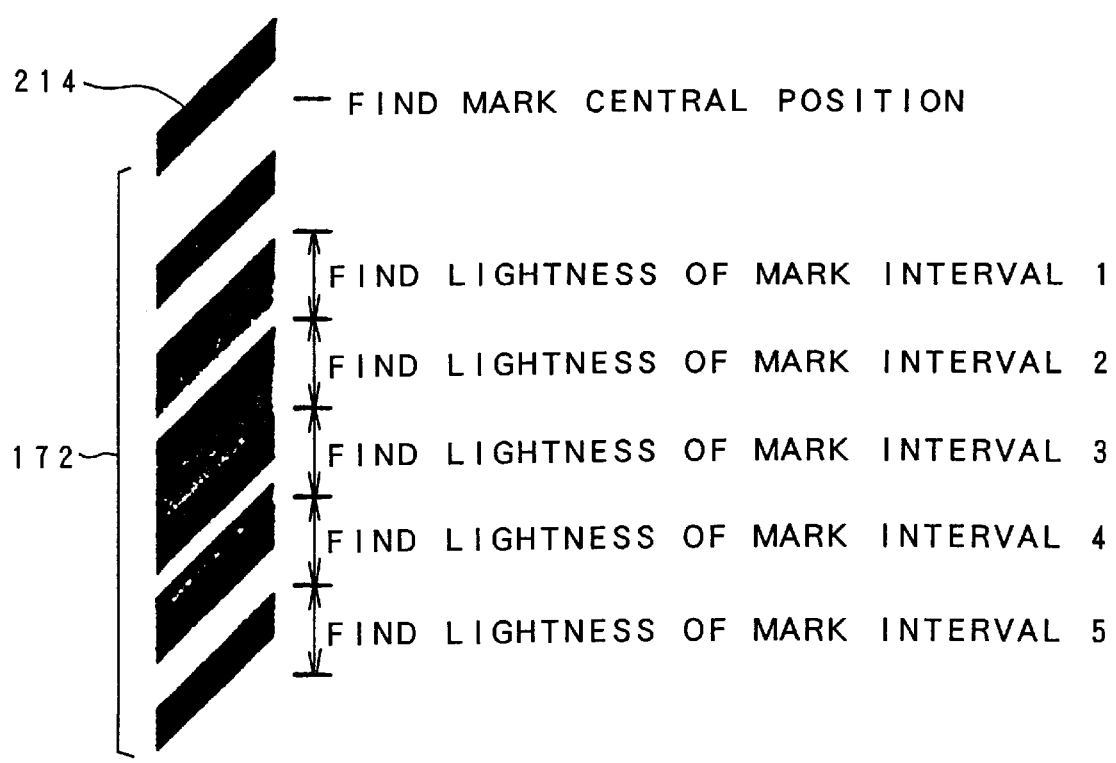
FIG. 31 is an explanatory diagram of the K-C slanted line mark train of FIG. 12, shown in an enlarged scale.

FIG. 31 illustrates the left side slanted line mark train 160-1 of FIG. 12 in an exclusive and enlarged scale. This slanted line mark train 160-1 consists of a K premark 214 at its fore-end followed by a K-C slanted line mark train 172.

Figure 32A:
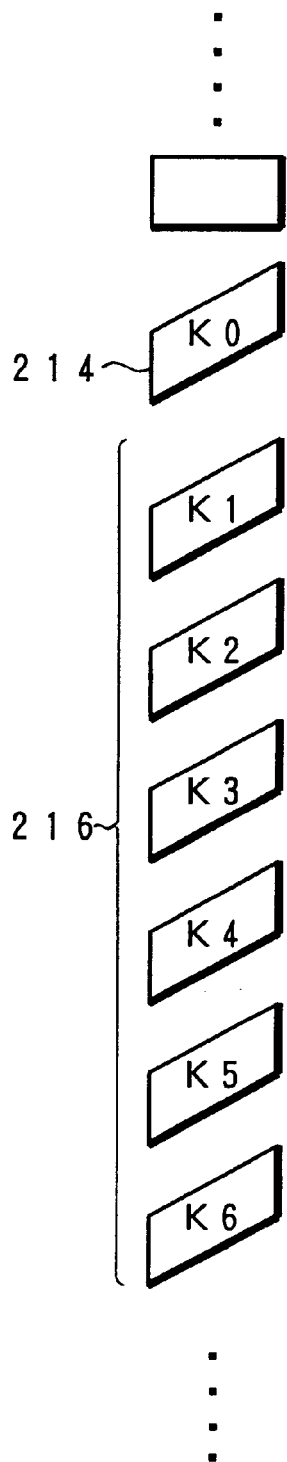
FIGS. 32A and 32B are explanatory diagrams of a K slanted line mark train and a C slanted line mark train which are superposed on each other to form a K-C slanted line mark train of FIG. 31.
Figure 32B:
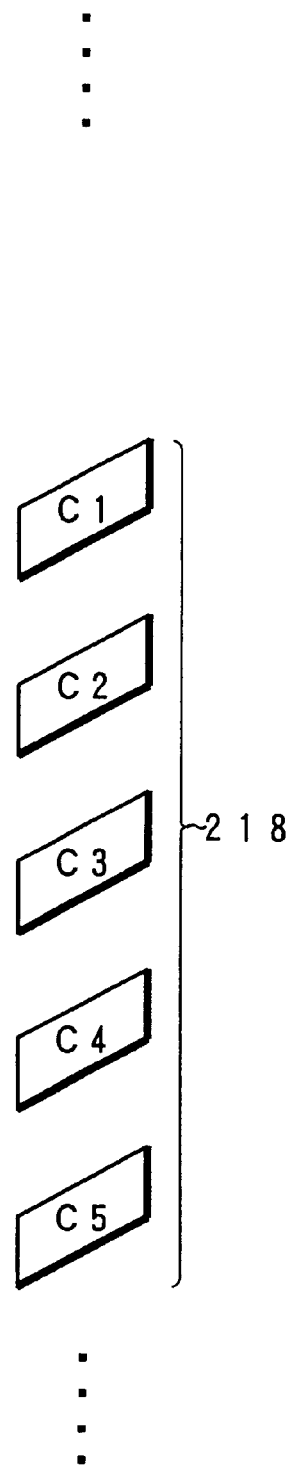

FIGS. 32A and 32B illustrate a K mark train and a C mark train, respectively, which are superposed on each other to obtain the K-C slanted line mark train 172 of FIG. 31. FIG. 32A shows K marks which include the K premark 214 at its fore-end followed by six marks K1 to K6 in the form of a K slanted line mark train 216, with the slanted line having a rightwardly upward inclination of 45 degrees. FIG. 32B shows a C slanted line mark train 218 consisting of five marks C1 to C5. In the two trains, the fore-end marks K1 and C1 lie at the same position and the tail-end marks K6 and C5 lie also at the same position, with shifts therebetween.

FIGS. 33A to 33E illustrate formation of the K-C slanted line mark train and lightness patterns obtained by the sensor read. The K slanted line mark train 216 of FIG. 33A includes slanted line marks having a rightwardly upward inclination of 45 degrees, with the mark line width W being a line width in the endless belt moving direction which is the sensor detecting position, and with the pitch P1. FIG. 33B shows the C slanted line marks 218 having the same line width W equal to that of the K marks, but having the pitch P2 which is larger than the pitch P1 by a pitch difference ΔP. In this embodiment, the line width W, the pitches P1 and P2 and the pitch difference ΔP take the following values.

Line width W=36 dots
Pitch P1=72 dots
Pitch P2=90 dots
Pitch difference=18 dots

Therefore, from the expressions (1) and (2), the K marks consist of six marks K1 to K6 and the C marks consist of five marks C1 to C5. FIG. 33C shows the K-C slanted line mark train 172 obtained by superposing the K slanted line mark train 216 and the C slanted line mark train 218 of FIGS. 33A and 33B on each other. When this K-C slanted line mark train 172 is read by the sensor, there is obtained a lightness pattern of the scattered light level of FIG. 33D or a lightness pattern of the transmitted light level of FIG. 33E.

In the case of the lightness pattern of the scattered light level of FIG. 33D, the minimum value Lmin lies at the position of the phase 0 since the image offset is zero. On the contrary, in the case of the lightness pattern of the transmitted light level of FIG. 33E, the maximum value Lmax lies at the position of the phase 0 which is again the central position 215. In this case, the range ±π of the lightness pattern has a range of ±36 dots correspondingly to the line width W=36 dots, with the resolving power being 18 dots in accordance with the pitch difference ΔP. A variation of the lightness pattern by the K-C slanted line mark train 172 when the C slanted line mark train 218 has an offset in the endless belt moving direction (vertical scanning direction) relative to the K slanted line mark train 216 is the same as the case of FIGS. 19A to 19E and FIGS. 20A to 20E about the transverse fine line mark trains. In addition to this, in the case of the K-C slanted line mark train 172, the degree of overlap varies also with respect to the offset in the horizontal scanning direction substantially orthogonal to the endless belt moving direction of the C-slanted line mark train 218, with the result that the phase of the lightness pattern varies. That is, the K-C slanted line mark train 172 is subjected to phase shifts of the lightness pattern in response to the image offsets both in the vertical scanning direction which is the belt moving direction and in the horizontal scanning direction substantially orthogonal to the belt moving direction.

Figure 34:
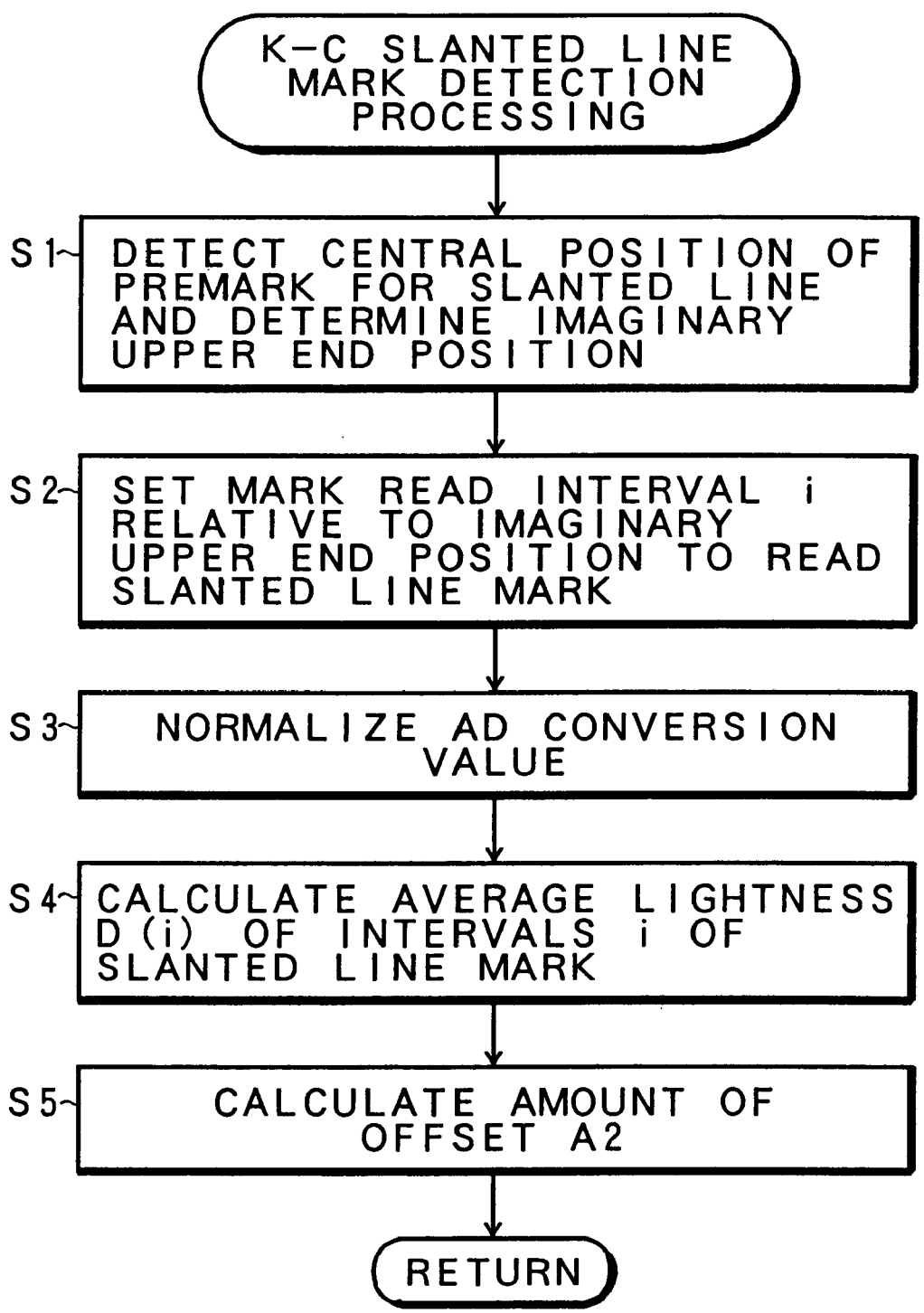
FIG. 34 is a flowchart of the K-C slanted line mark detection processing effected by the correction value calculation unit of FIG. 7.

FIG. 34 is a flowchart showing processing for detecting the image offset A2 of the K-C slanted line mark train 172 of FIG. 31. First in step S1, a central position of the K slanted line premark 214 of FIG. 31 is detected to determine an imaginary upper end position at a value equal to half of the previously defined mark width. Then in step S2, intervals 1 to 5 are set as mark read intervals i with respect to the imaginary upper end position, and the slanted line mark train is read by the sensor to acquire an A/C conversion value indicative of lightness. Then in step S3 the A/D conversion value is normalized as shown in FIGS. 24A and 24B, and in step S4 an average lightness D(i) of the intervals i=1 to 5 of the slanted line mark train is figured out. Finally in step S5 an image offset A2 is figured out. That is, a phase φ is figured out from the following expression based on the discrete Fourier transform.

$$\phi = \text{Arc Tan}[\Sigma\{Di \times \sin(2\pi i/5) - 0.5\}/(\Sigma(Di \times \cos(2\pi i/5))\}] \quad (8)$$

where i=1, 2, 3, ..., n
n=5
φ=−π to +π

Then the phase φ indicative of the image offset is converted into the dot count using the following expression.

$$A2 = -\{(\phi/2\pi) \times 5 - 0.5\} \times 18[\text{dots}] \quad (9)$$

Such calculation of the image offset A2 through the read of the K-C slanted line mark train 172 applies to the remaining K-M slanted mark train and the K-Y slanted line mark train.

Figure 35:
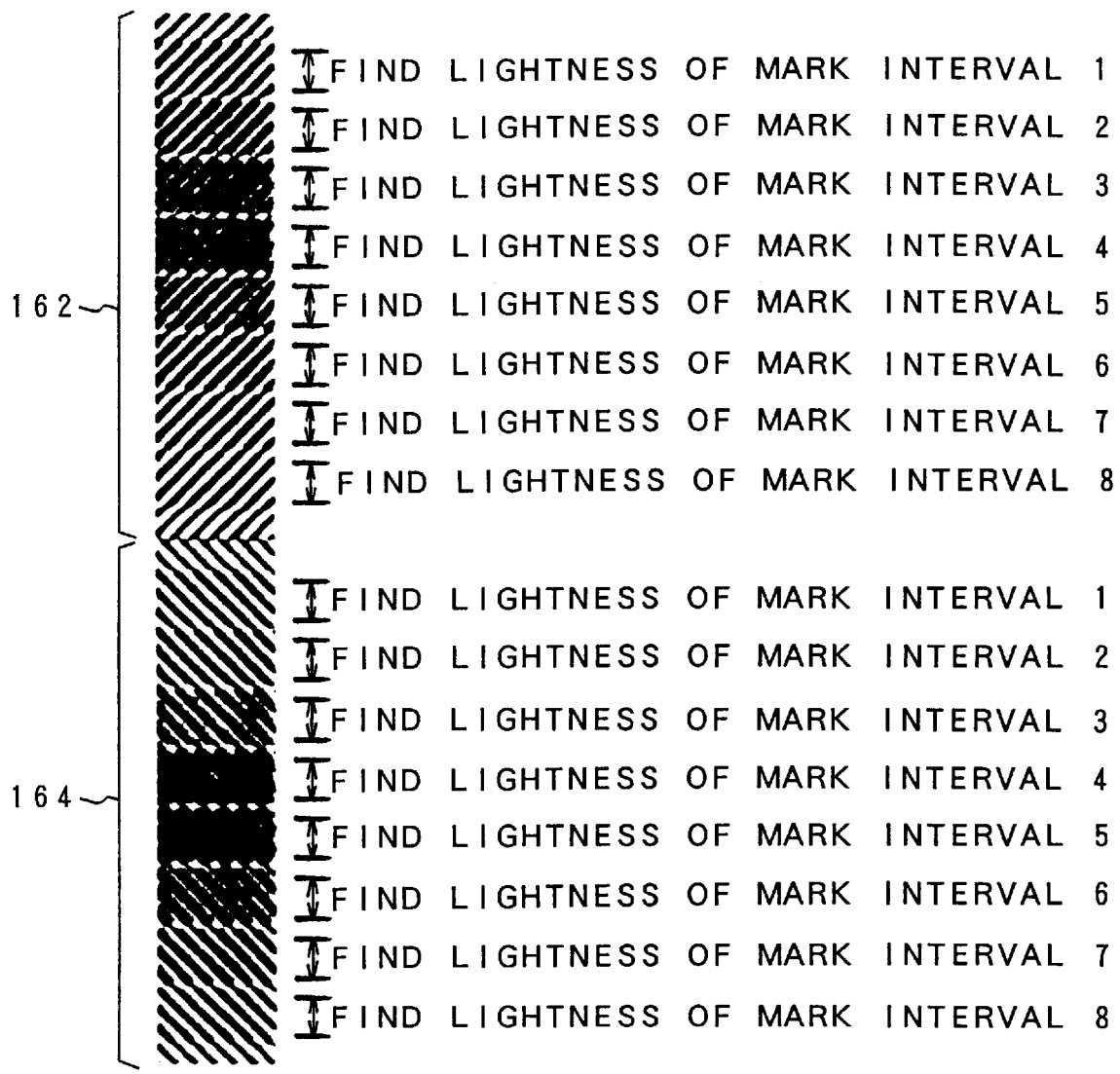
FIG. 35 is an explanatory diagram of the K-C slanted fine line mark train of FIG. 12 in an enlarged scale.
Figures 36A, 36B:
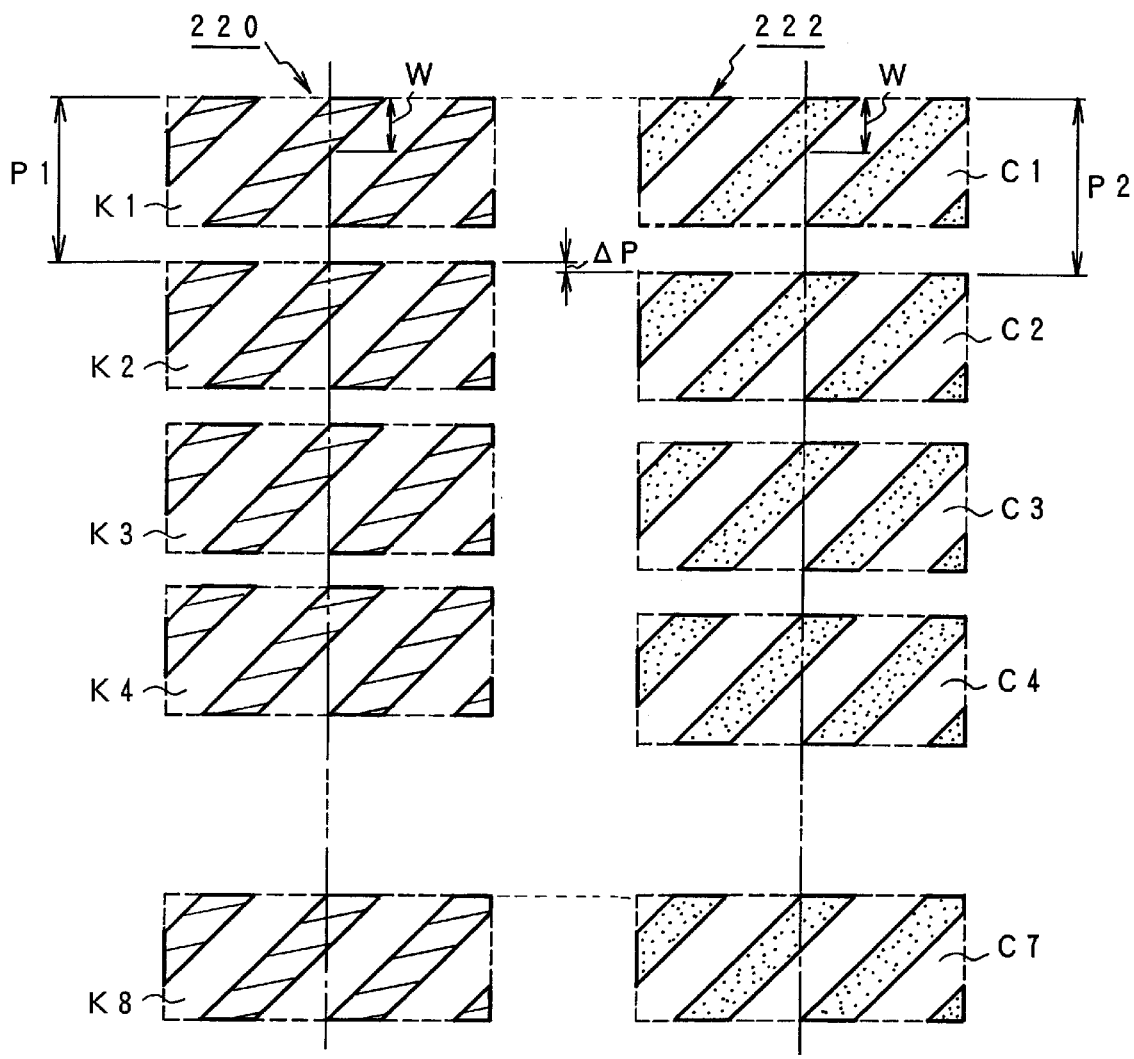
FIGS. 36A and 36B are explanatory diagrams of a K slanted fine line mark train and a C slanted fine line mark train which are superposed on each other to form a K-C slanted fine line mark train of FIG. 35.

FIG. 35 shows the left K-C slanted fine line mark trains 162 and 174 of FIG. 12 in an enlarged scale. The K-C slanted fine line mark train 162 is formed by superposing the K slanted fine line mark train 220 and the C slanted fine line mark train 222 on each other. The K slanted fine line mark train 220 of FIG. 36A has a line width W and a pitch P1. On the other hand, the C slanted fine line mark train 222 of FIG. 36B has the same line width W but has a pitch P2 larger than P1 by a pitch difference ΔP. Herein, the line width W, the pitches P1 and P2, and the pitch difference ΔP have the following values in this embodiment.

Line width W=6 dots
Pitch P1=48 dots
Pitch P2=50 dots
Pitch difference ΔP=2 dots For this reason, from the above expressions (1) and (2) there exist eight K marks K1 to K8 and seven C marks C1 to C7.

FIGS. 37A and 37B illustrate a K mark train and a C mark train, respectively, for the formation of the K-C reversely slanted fine line mark train 164 of FIG. 35. FIG. 37A shows a K reversely slanted fine line mark train 224, with the use of a slanted line mark train which is left upwardly inclined by 45 degrees relative to FIG. 36A. FIG. 37B shows a C reversely slanted fine line mark train 226, with the use of a slanted line mark train which has a left upward inclination which is reverse to FIG. 36B. The K reversely slanted fine line mark train 224 has a line width W of 6 dots which is the same as the case of FIGS. 36A and 36B, with the pitch of 48 dots. On the contrary, the C reversely slanted fine line mark train 226 is shifted toward the positive side by one dot relative to FIG. 36B. That is, in the case of FIG. 36B the image offsets of the marks C1 to C7 relative to the marks K1 to K7, respectively, are 2, 4, 6, 8, 10, 12 and 14 dots, respectively, whereas in FIG. 37B they are 1, 3, 5, 7, 9, 11, 13 and 15 dots, respectively.

Figure 38A:
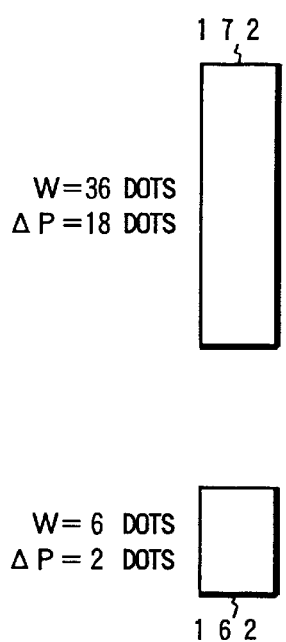
FIGS. 38A and 38B are explanatory diagrams of the image offset range and the resolving power, acquired by the combination of the slanted line mark train and the slanted fine line mark train.
Figure 38B:
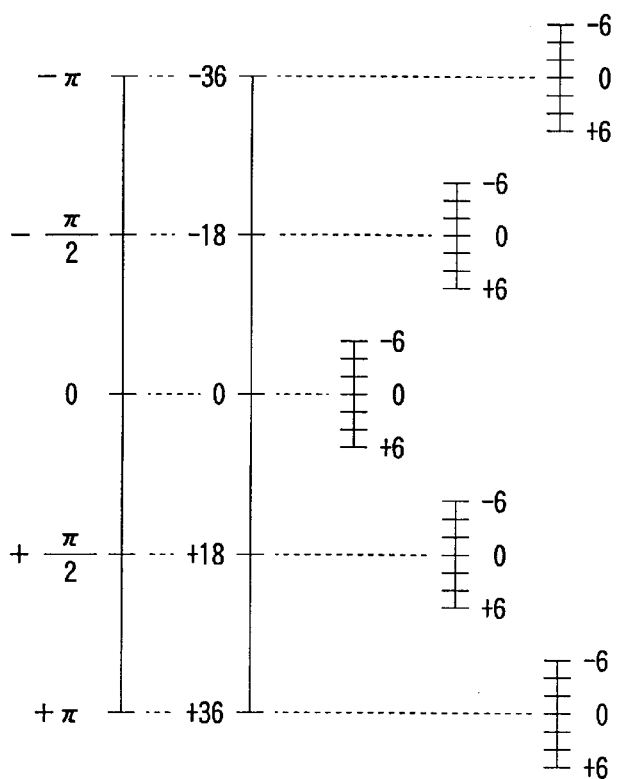

The K-C slanted fine line mark train 162 of FIG. 35 has two stages of image offset ranges and resolving powers through the combination with the K-C slanted line mark train 172 of FIG. 31. FIGS. 38A and 38B illustrate a relationship between the two stages of image offset ranges and resolving powers through the combination of the K-C slanted line mark train 172 and the K-C slanted fine line mark train 162. In this case, as shown in FIG. 38B, the K-C slanted line mark train 172 has a ±36 dot range within a range of ±π with the line width W=36 dots and at that time has a resolving power in 18-dot unit which is determined by the pitch difference ΔP=18 dots. On the other hand, the K-C slanted fine line mark train 162 has a range of ±6 dots with the line width W=6 dots and has a resolving power corresponding to the pitch difference ΔP=2 dots within that range. Through such a combination of the slanted line mark trains having a large range and a small range, it is possible to realize an image offset detection of ±36 dot range and ±2 dot resolving power using mark trains having a reduced length.

Furthermore, in the case of the K-C slanted fine line mark train 162 and the K-C reversely slanted fine line mark train 164 of FIG. 35, image offsets A3 and A4 detected therefrom are addition averaged to cancel the image offset in the vertical scanning direction which is the belt conveyance direction, thereby making it possible to eliminate the displacement attributable to the offset of the belt conveyance speed and to ensure accurate calculation of the image offset in the horizontal scanning direction which is substantially orthogonal to the belt conveyance direction.

Figure 39:
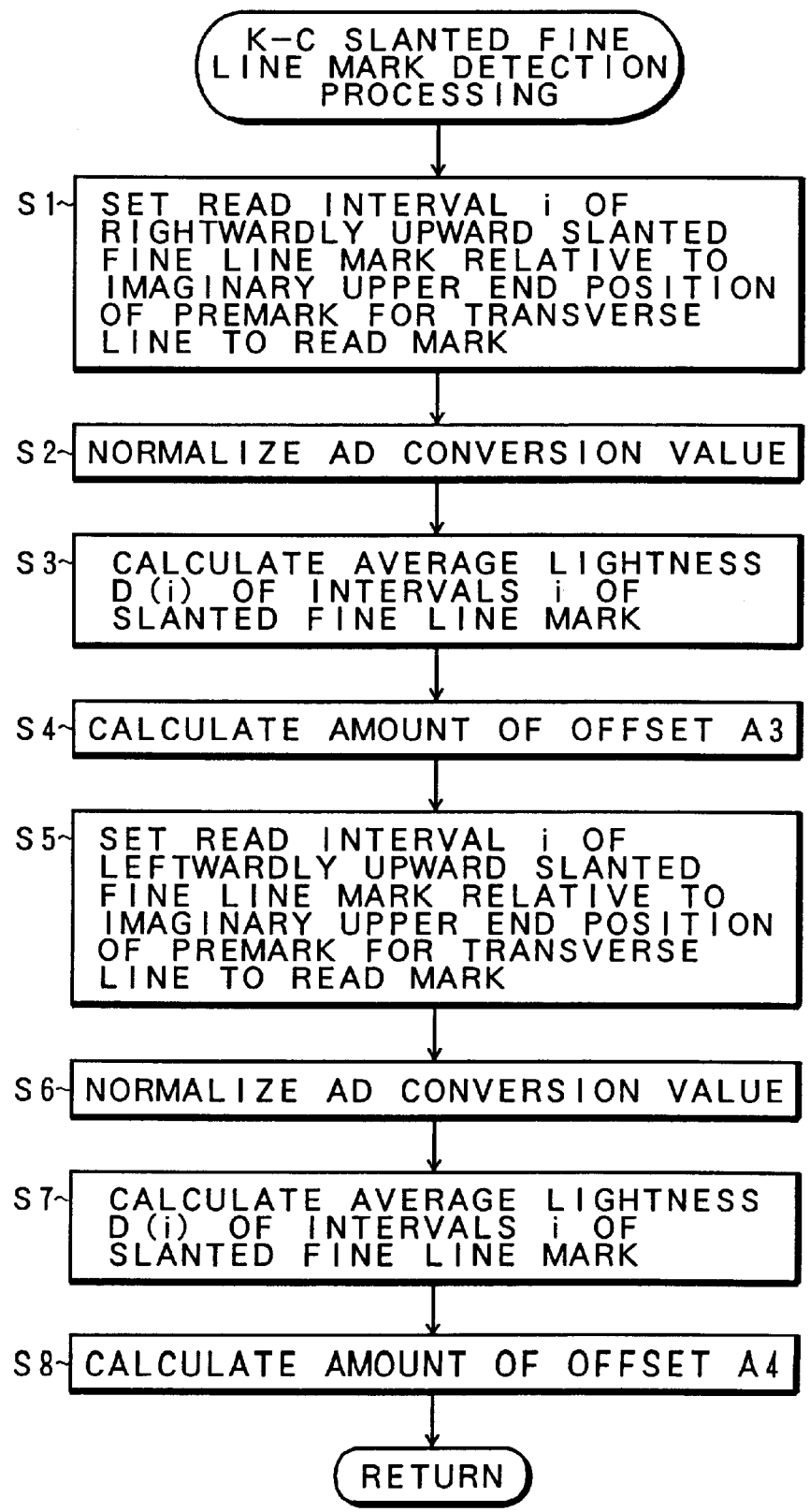
FIG. 39 is a flowchart of the K-C slanted fine line mark detection processing effected by the correction value calculation processing of FIG. 7.

FIG. 39 is a flowchart of image offset detection processing for the K-C slanted fine line mark train 164 and K-C reversely slanted fine line mark train 164 of FIG. 35. First in step S1, eight read intervals i=1 to 8 for the right upwardly slanted fine line mark train are defined with respect to the imaginary upper end position of the K premark 155-1 of FIG. 12 so that the marks are read to find lightness. Then in step S2 the A/D converter is normalized as in FIGS. 24A and 24B. Then in step S3 an average lightness D(i) of the intervals of the slanted fine line mark train is figured out, and in step S4 an image offset A3 is figured out on the basis of the discrete Fourier transform. That is, the phase φ is figured out based on the discrete Fourier transform from the following expression.

$$\phi = \text{Arc Tan}[\Sigma\{Di \times \sin(2\pi i/8)\}/\{\Sigma(Di \times \cos(2\pi i/8))\}] \quad (10)$$

where i=1, 2, 3, . . . , n n=5

φ=−π to +π

The thus calculated phase φ is converted into dots from the following expression to obtain the image offset A3.

$$A3 = \{(\phi/2\pi) \times 8 - 0.0\} \times 2 \text{ (dots)} \quad (11)$$

Then in step S5, in the same manner as the step S1, read intervals 1 to 8 for the reverse left upward K-C reversely slanted fine line mark train 164 is defined with respect to the imaginary upper end position of the foremost K premark 155-1 of FIG. 12, and the marks are read by the sensor to obtain an A/D conversion value indicative of lightness. Then in step S6 the A/D conversion value is normalized and in step S7 the average lightness D(i) of the intervals 1 to 8 of the K-C reversely slanted fine line mark train 164 is figured out. Then in step S8 an image offset A4 is figured out. First the phase φ is found on the basis of the discrete Fourier transform using the expression (10). Then the calculated phase φ is converted into the dot count of the image offset A from the following expression.

$$A4 = \{(\phi/2\pi) \times 8 - 0.5\} \times 2 \text{(dots)} \quad (12)$$

(Calculation of Correction Values ΔX, ΔY and ΔY)

FIGS. 40A and 40B are flowcharts of the calculation processing of image offset correction values ΔX, ΔY and ΔZ, which is performed on the basis of the results of calculation of image offsets A1, A2, A3 and A4 of the mark trains, which is performed by the correction value calculation unit 118 of FIG. 7. First in step S1 the correction value ΔY in the vertical scanning direction coincident with the belt conveyance direction is figured out. For the calculation of this correction value ΔY, as in the case of FIG. 11, the left side image offset Bl in the vertical scanning direction is figured out from the following expression, using for example the image offset A11 of the block 230 calculated from the K-C transverse line mark train 158-1 and the image offset A51 of the block 232 obtained from the K-C transverse fine line mark train 166-1.

Left side offset amount $Bl$ in vertical scanning (13)

direction = rounded off $\{(A11 - A51)/16\} \times 16 + A51$

= rounded off $(A11 - A51) + A51$

This image offset Bl is an image offset of 600 dpi in the horizontal scanning direction, and hence the correction value ΔY in the vertical scanning direction is figured out from the following expression in order to ensure the coincidence with 1800 dpi in the vertical scanning direction.

Correction value ΔY in the vertical scanning direction=rounded off $(3 \times Bl)$ (14)

Figure 42:
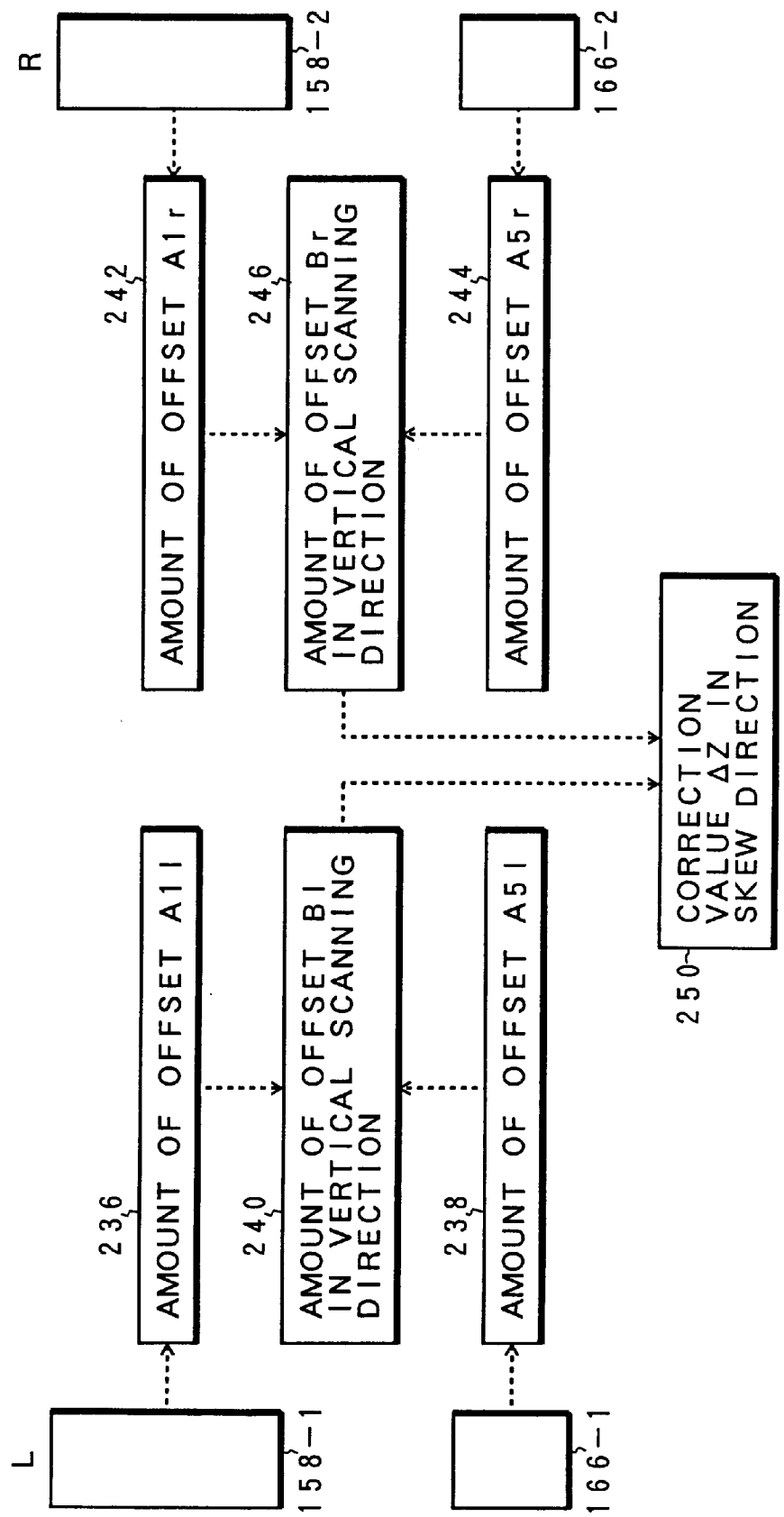
FIG. 42 is an explanatory diagram of a procedure of calculation of a correction value ΔZ in the skew direction in step S2 of FIG. 40A.

Referring again to FIGS. 40A and 40B, the procedure advances to the next step S2 to figure out the correction value ΔZ in the skew direction. This calculation of the correction value ΔZ in the skew direction is carried out following the procedure of FIG. 42. First the image offset Bl in the vertical scanning direction shown in the block 240 is figured out from the image offset A11 shown in the block 236 of the transverse line mark train 158-1 and from the image offset A51 of the block 238 of the transverse fine line mark train 166-1. This is derived from the expression (13). Since the image offsets A1r and A5r have been obtained for the blocks 242 and 244 of the right side transverse line mark train 158-2 and the transverse fine line mark train 166-2, the image offset Br in the vertical scanning direction for the block 246 is figured out from the following expression in the same manner as the case of the left side.

Right side offset amount $Br$ in the vertical scanning direction=
rounded off $(A1r-A5r)/16) \times 16+A5r$=rounded off $(A1r-A5r)+A5r$ (15)

After the acquisition of the right and left image offsets Bl and Br in the vertical scanning direction in the blocks 240 and 246 in this manner, the difference therebetween is found as in the block 250, and then conversion is made from 600 dpi into 1800 dpi so that the correction value ΔZ in the skew direction is figured out from the following expression.

Correction value ΔZ in the skew direction=rounded off $\{3 \times (Br-Bl)\}$ (16)

Referring again to FIGS. 40A and 40B, the correction value ΔZ in the horizontal scanning direction is figured out in the next steps S3, S4 and S5. Herein, the calculation processing of the left side correction value ΔXl in the horizontal scanning direction is carried out in the step S3, and the calculation processing of the right side correction value ΔXr in the horizontal scanning direction is carried out in the step S4. Finally in step S5 the correction value ΔX in the horizontal scanning direction is figured out by addition averaging the correction values ΔXl and ΔXr.

Figure 43:
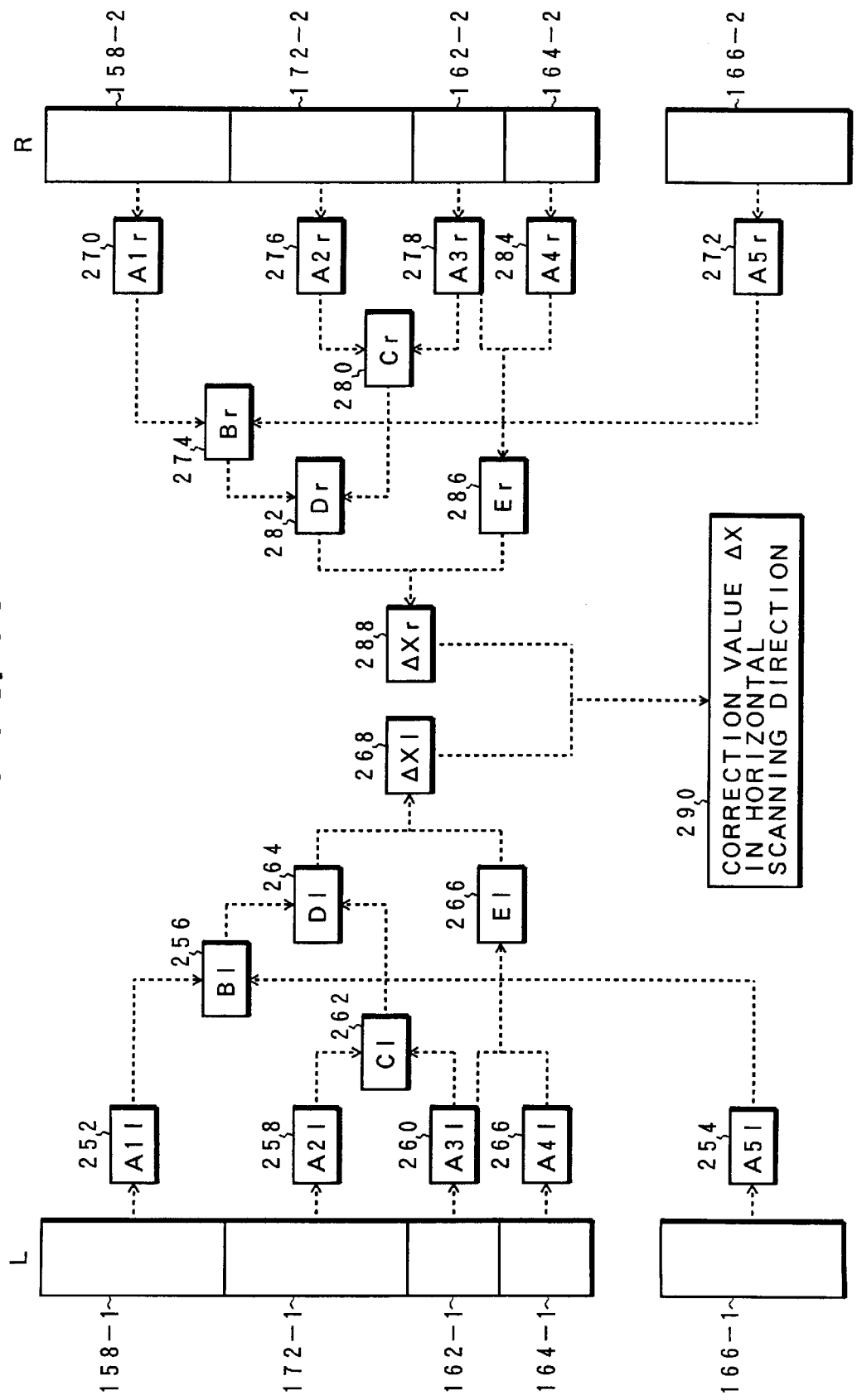
FIG. 43 is an explanatory diagram of a procedure of calculation of a correction value ΔX in the horizontal scanning direction in steps S3, S4 and S5 of FIG. 40B.

This calculation of the correction value ΔX in the horizontal scanning direction is performed using the procedure of FIG. 43. First used as the left side mark trains are the transverse line mark train 158-1, slanted line mark train 172-2, slanted fine line mark train 162-1, reversely slanted fine line mark train 164-1 and transverse fine line mark train 166-1. It is natural that since the transverse line mark train 160-1 is iterated 39 times, the image offset used is an average value thereof. As a result of this, image offsets A1l, A2l, A3l, A4l and A5l are found as in the blocks 252, 258, 260, 266 and 254 of the respective mark trains. First using the image offsets A1l and A5l of the blocks 252 and 254, the left side image offset Bl in the vertical scanning direction is figured out as in the block 256. This image offset Bl in the vertical scanning direction is figured out from the expression (13). Then using the image offsets A2l and A3l of the blocks 258 and 260, a combined image offset Cl containing image offsets in both the horizontal and vertical scanning directions is figured out as in the block 262 from the following expression.

Combined offset amount $Cl$=rounded off $(A2l-A3l)/16)\times 16+A3l$= rounded off $(A2l-A3l)+A3l$ (17)

By subtracting the image offset Bl in the vertical scanning direction of the block 256 from the thus obtained combined image offset Cl of the block 262, the image offset Dl in the horizontal scanning direction of the block 264 is figured out from the following expression.

Offset amount $Dl$ in the horizontal scanning direction=$Cl-Bl$ (18)

On the other hand, the image offset El in the horizontal scanning direction is figured out as in the block 266 using the image offsets A3l and A4l of the blocks 260 and 266 from the following expression.

Offset amount $El$ in the horizontal scanning direction= $(A3l-A4l)/2$ (19)

It is to be noted that the image offset amount Dl in the horizontal scanning direction obtained in the block 264 has a low resolving power with a large range whereas the image offset amount El in the horizontal scanning direction of the block 266 has a high resolving power with a small range. Thus, in the block 268, the two ranges are matched to calculate the correction value ΔXl in the horizontal scanning direction based on the side mark train from the following expression.

Correction value $\Delta Xl$ in the horizontal scanning (20)

direction = rounded off $\{(Dl - El)/16\} \times 16 + El$

= rounded off $(Dl - El) + El$

After the completion of the calculation processing of the left side mark train in this manner, the correction values ΔXr in the horizontal scanning direction of the right side mark trains are figured out using the image offsets A1r, A2r, A3r, A4r and A5r obtained in the blocks 270, 276, 278, 284 and 272, the right side mark trains including the right side transverse line mark train 158-2, slanted line mark train 172-2, slanted fine line mark train 162-2, reversely slanted fine line mark train 164-2 and transverse fine line mark train 166-2. First, the image offset Er in the vertical scanning direction of the block 274 is figured out from the image offsets A1r and A5r of the blocks 270 and 272. The calculation expression for this is the same as the expression (15). Then the combined image offset Cr of the block 280 is figured out from the image offsets A2r and A3r of the blocks 276 and 278 using the following expression.

Combined offset amount $Cr$=rounded off $(A2r-A3r)/16)\times 16+A3r$= rounded off $(A2r-A3r)+A3r$ (21)

Then the image offset Dr in the horizontal scanning direction of the block 282 is figured out from the image offsets Br and Cr of the blocks 274 and 280 using the following expression.

Offset amount $Dr$ in the horizontal scanning direction=$Cr-Br$ (22)

Furthermore, the image offset Er in the horizontal scanning direction of the block 286 is figured out from the image offsets A3r and A4r of the blocks 278 and 284 using the following expression.

Offset amount $Er$ in the horizontal scanning direction=$(A3r-A4r)/2$ (23)

Then using the range configuration by the image offsets Dr and Er of the blocks 282 and 286, the correction value ΔXr in the horizontal scanning direction based on the left side mark trains is figured out from the following expression.

Correction value $\Delta Xr$ in the horizontal scanning (24)

direction = rounded off $\{(Dr - Er)/16\} \times 16 + Er$

= rounded off $(Dr - Er) \times 16 + Er$

After the acquisition of the right and left correction values ΔXl and ΔXr in the horizontal scanning direction in the blocks 268 and 288 in this manner, the correction value ΔX in the horizontal scanning direction is finally figured out through the addition averaging of the two using the following expression, as in the block 290.

Correction value $\Delta X$ in the horizontal scanning direction=rounded off $\{(\Delta Xl+\Delta Xr)/2\}$ (25)

FIGS. 44A to 44D illustrate a principle of the image offset correction based on the correction values ΔX, ΔY and ΔZ which are obtained in the correction value calculation unit 118 of FIG. 7. The positional offset detection results of the object print line 140 of FIG. 10 are converted into positional offsets in the bitmap memory space 194 partitioned by one pixel pitch in both the horizontal and vertical scanning directions as in FIG. 44A. Since the ideal print line 148 is first determined in the bitmap memory space 294 of FIG. 44A, actual object print line 140 is set relative to the line 148. That is, using the already obtained correction value ΔX in the horizontal scanning direction, the correction value ΔY in the vertical scanning direction and the correction value ΔZ in the skew direction, it is possible to set the object print line 140 in the bitmap memory space 194. The conversion of this object print line 140 into the image data enables positional data 296-1 to 296-3 as in FIG. 44B to be created. Relative to the positional data 296-1 to 296-3 of FIG. 44B, the correction data 298-1 to 298-3 as in FIG. 44C are obtained by inverting the detection object line 140 to the negative side symmetrically with respect to the ideal print line 148 and by shifting it toward the negative side (leftward) in the horizontal scanning direction by the correction value ΔX in the horizontal scanning direction. When reading the correction data 298-1 to 298-3 of FIG. 44C to cause the LED array to emit a light, the positional offset of FIG. 44B is corrected as in FIG. 44D, allowing acquisition of the print result 300 corresponding to the ideal print line 148 of FIG. 44A.

(Plural Times Resist Mark Transfers and Measurements)

Figure 45:
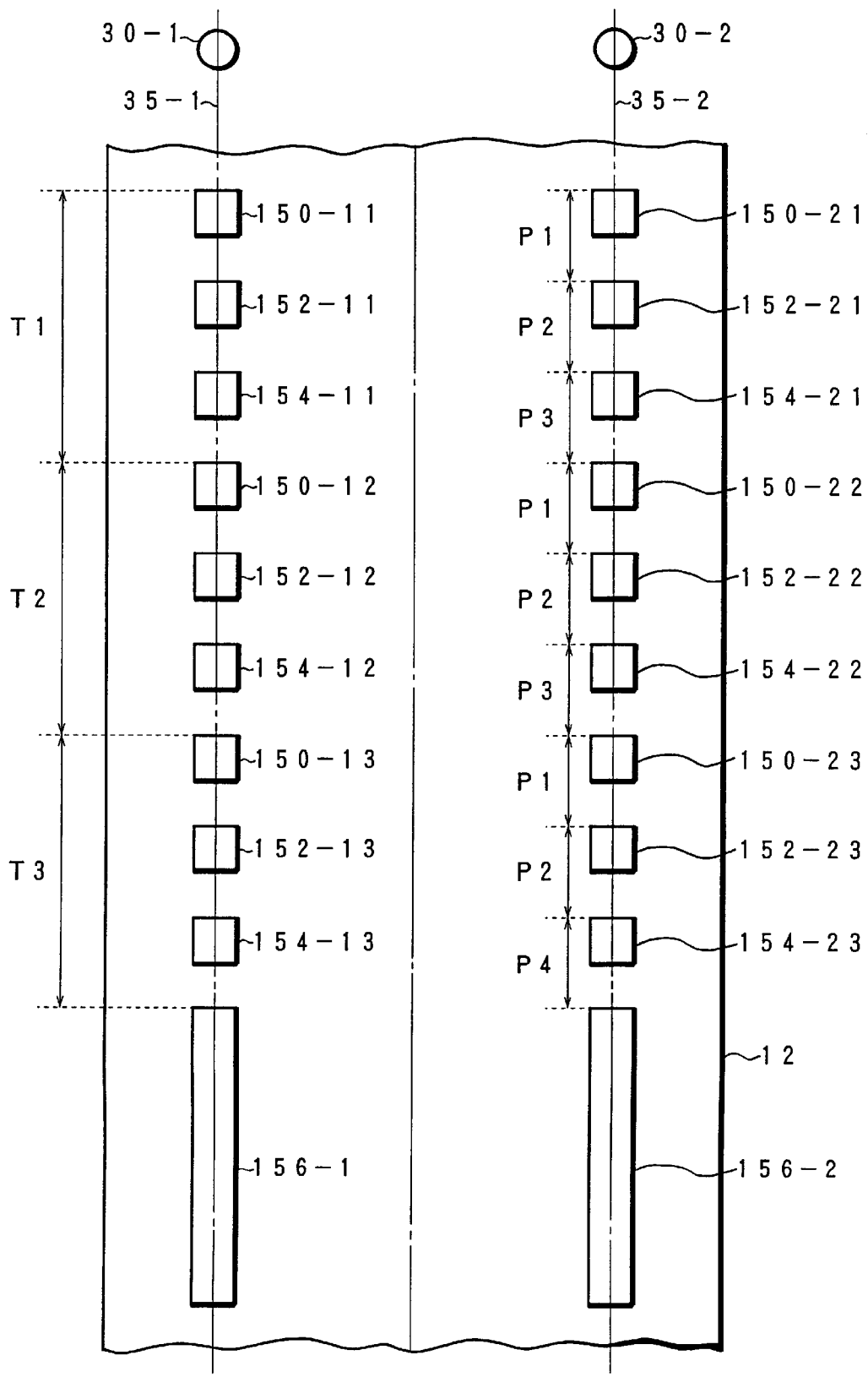
FIG. 45 is an explanatory diagram of another embodiment in which resist marks are iteratively transferred onto the endless belt over a plurality of cycles.

FIG. 45 is an explanatory diagram of a further embodiment of the resist mark which is transferred onto the endless belt for the detection of image offset correction values ΔX, ΔY and ΔZ. In this embodiment, to prevent any error of the calculation results of the positional offset amount which may be caused by the transfer of the resist mark onto the endless belt having a damaged surface or defects such as twisting, the resist mark is transferred on the endless belt a plurality of times for detection to calculate the correction values $\Delta X$, $\Delta Y$ and $\Delta Z$ so that if there exist ones far apart from the other values thereamong, they are eliminated to average the remaining effective values to thereby improve the accuracy of the positional offset amount to be finally figured out.

Three different mark trains are iteratively transferred onto the endless belt 12 in two lines in the move direction three times, that is, over a first cycle T1, a second cycle T2 and a third cycle T3. More specifically, transferred during the first cycle T1 are K-C mark trains 150-11 and 150-21, K-M mark trains 152-11 and 152-21, and K-Y mark trains 154-11 and 154-21. Then transferred during the second cycle T2 are similarly K-C mark trains 150-12 and 150-22, K-M mark trains 152-12 and 152-22 and K-Y mark trains 154-12 and 154-22. Furthermore transferred during the third cycle T3 are similarly K-C mark trains 150-13 and 150-23, K-M mark trains 152-13 and 152-23 and K-Y mark trains 154-13 and 154-23. In other words, in the case of the embodiment of FIG. 45, there is iterated three times in the belt moving direction the transfer of the K-C mark trains 150-1 and 150-2, the K-M mark trains 152-1 and 152-2 and the K-Y mark trains 154-1 and 154-2 which have been transferred onto the endless belt 12 in the embodiment of FIG. 11. Furthermore the three times iterated mark trains from the first cycle T1 to the third cycle T3 are transferred with the repetition of the pitches P1, P2 and P3 as shown in the resist mark which has been transferred on the right side to be detected by the sensor 30-2, and with a pitch P4 from the last K-Y mark trains 154-13 and 154-23 to the transverse fine line mark trains 156-1 and 156-2. In this case, if the endless belt 12 has a length P0=792 mm for one round, then the pitches P1 to P4 of the resist marks are for example P1=P2=360.68 mm P3=324.73 mm P4=503.90 mm Since the distance from the foremost K-C mark trains 150-11 and 150-21 to the rearmost transverse fine line mark trains 150-1 and 150-2 is 3317.44 mm with the distance of move of the belt for one turn being 792 mm, the amount of move of the endless belt 12 for one turn becomes 3317.44 m/792 mm=approx. 4.2 turns with the result that the endless belt 12 rotates four turns for the transfer from the first cycle T1 to the third cycle T3. Furthermore, due to the dimensional relationship between the pitches P1, P2 and P3 of the resist marks in the cycles T1 to T3, the positions of the resist marks in the cycles T1 to T3 are transferred onto the belt at different positions. The details of the resist marks of FIG. 45 and the calculation of the positional offset amount based on the resist mark detection result are the same as those in the embodiments of FIGS. 12 to 43 except that three cycle iteration is performed of the detection processing based on the transfer of the resist marks and of the calculation.

FIGS. 46A and 46B are flowcharts of the correction value calculation processing performed in the embodiment of FIG. 45 in which the resist marks are transferred onto the endless belt 12 over the three cycles. This correction value calculation processing is basically the same as the correction value calculation processing of FIGS. 40A and 40B which correspond to one cycle of FIG. 45. First in step S1, a left offset amount Bl in the vertical scanning direction is figured out on the basis of the result of detection of the resist marks for the first cycle. Then in step S2, a right offset amount Br in the vertical scanning direction is figured out. Furthermore in step S3, a left offset amount $\Delta Xl$ in the horizontal scanning direction is figured out. Then in step S4, a right offset amount $\Delta Xr$ in the horizontal scanning direction is figured out. After the completion of the calculation processing of the steps S1 to S4, a check is made in step S5 to see if the calculation has been completed three times. Because of the first cycle, the procedure goes again back to the step S1. From the sensor output for the result of transfer of the resist marks in the second cycle, the offset amounts Bl, Br, $\Delta Xl$, and $\Delta Xr$ are figured out in the same manner in the steps S1 to S4, and the iteration is made up to the third cycle in step S5. After the completion of the calculation of the offset amounts Bl, Br, $\Delta Xl$ and $\Delta Xr$ for three cycles through the processing of the steps S1 to S5, the procedure advances to step S6 in which error judgment of the calculation results is carried out for each offset amount. For this error judgment, comparison is made between the maximum value of the three calculation values and the other values, and difference is not less than 2 dots, that is, not less than 85.7 $\mu$m, it is judged that the maximum value involves an error due to the defects such as damages of the endless belt or twisting thereof, so that the maximum value is excluded from the calculation object. At the same time, comparison is made between the minimum value of the three calculation values and the other values, and if the difference is equal to or more than 2 dots, then it is judged that an error has occurred due to the defects such as damages of the endless belt or twisting thereof, so that the minimum value is excluded from the calculation result. After the completion of the error judgment of the calculation results in step S4, the procedure goes to step S7 to see if whether two or more effective values are present with respect to the calculated offset amounts Bl, Br, $\Delta Xl$ and $\Delta Xr$. If two or more effect values are present, the procedure goes to step S8 to figure out an average value of the effective values. On the basis of this average value, the image offset correction values $\Delta Y$, $\Delta Z$ and $\Delta X$ are figured out in step S9. On the contrary, if only one effective value has been obtained from the error judgment result in step S7, the three values obtained through the three cycles are diverse and lack in reliability, so that in step S10 a post on error is carried out, allowing the correction value calculation processing to abnormally terminate. In the case of the abnormal termination, retry processing is activated of the positional offset amount detection processing based on the transfer of the resist marks.

According to the present invention, as set forth hereinabove, two different color marks are superposed on each other in an offset manner to obtain a mark use for the image offset correction, the mark being transferred onto the belt so that its lightness pattern is read by the sensor to obtain an image offset correction value. Therefore, even though an image offset has occurred as a result of the influence of the offset in the belt conveyance speed between the transfer positions of the two colors by the photosensitive drum, the mark image offset attributable to the conveyance speed offset would not act substantially on the phase of the lightness pattern read from the mixed color mark train and simultaneously would not be affected by the belt conveyance speed offset, thus ensuring an accurate detection of the image offset correction value. Furthermore, due to the use of the mixed color train obtained by transferring two colors in an overlapped manner for the detection of the image offset correction values, the detection of the image offset correction values can be achieved in the form closer to the actual print results. Furthermore, the sensor detects the lightness of the mixed mark train obtained by transferring two colors in an overlapped manner, so that it is possible to detect accurately the lightness pattern by use of a simple sensor with a low optical accuracy such as a toner adhesion sensor having a large focus spot, instead of the sensor using a high accuracy laser beam with extremely reduced beam diameter.

Although in the above embodiments the other color mark train, e.g., C mark train has a different pitch P2 with respect to the pitch P1 of the K mark train so as to allow the lightness pattern of the mark train through the superposition free from any image offset to describe a sine curve, as in the transverse line mark train of FIG. 18 for example, the manner of determination of the pitches P1 and P2 of the two is not limited to this and the mark array can be of any arbitrary form as long as one is shifted relative to the other and as long as a lightness pattern is obtained which has only one minimum value or maximum value as a singularity for the detection of the phase conversion within a range of $\pm\pi$ which are the mark start point and the mark end point. For example, the pitches of the K mark train and the C mark train may be determined at random or may be determined depending on an appropriate function which defines a lightness pattern having a single minimum value or maximum value within the range of $\pm\pi$.

In the above embodiments, to improve the calculation accuracy, the phase $\phi$ is figured out by use of the discrete Fourier transform because the two color combined lightness pattern describes a sine curve. Alternatively, the image offset could directly be figured out from the lightness pattern level because the image offset is definitely judged if a mark is recognized which corresponds to the minimum value Lmin of the lightness pattern of the scattered light level of FIG. 18D for example.

Furthermore, the above embodiments have been described by way of example of the laser printer which is connected to the word processor or the personal computer for use, although the present invention is applicable directly to any apparatuses as long as they are multi-color recording apparatuses in which a plurality of color toners are transferred onto paper by use of electrostatic recording units which are arranged in tandem.

It is to be appreciated that the present invention is not limited by the numerical values shown in the embodiments and that it is possible to modify the present invention without impairing the objects and advantages thereof.

What is claimed is:

1. An apparatus for forming images on record paper, comprising:
   a moving member with record paper adhered thereon, conveyed at a certain speed;
   a plurality of image carrying units arranged in a record paper conveyance direction, for forming latent images in conformity with image data through optical scanning on a photosensitive drum, developing the latent images with different developing vessels and transferring the latent images onto record paper lying on said moving member;
   a correction mark formation unit for forming and transferring mixed color mark trains onto said moving member by means of said plurality of image carrying units, said mixed color mark trains serving as marks for correcting image offsets between color images, said mixed color mark trains each consisting of a plurality of marks which are superposed on each other in an offset manner;
   a correction value calculation unit for detecting a lightness pattern of said mixed color mark trains transferred onto said moving member, to calculate correction values for image offsets between color images from the phase of said lightness pattern; and
   a correction unit for automatically correcting offsets between color images on the basis of said correction values;
   wherein said correction mark formation unit forms, as said mixed color mark trains, a mixed color slanted line mark train consisting of a plurality of transverse line marks substantially orthogonal to the direction in which said moving member moves, and a mixed color slanted line mark train consisting of a plurality of slanted line marks which traverse substantially diagonally the direction in which said moving member moves.

2. The apparatus according to claim 1, wherein said correction mark formation unit forms a mixed color transverse line mark train by superimposing a first transverse line mark of one of two colors and a second transverse line mark of the other of said two colors on each other so as to have the same line width L in the moving direction but have different respective pitch P1 and P2 in the moving direction with offsets therebetween.

3. The apparatus according to claim 2, wherein said correction mark formation unit defines the line width L of said first transverse line mark and said second transverse line mark in a manner corresponding to a detection range of image offset correction values which are calculated by said correction value calculation unit, and wherein said correction mark formation unit defines a difference $\Delta P$ between the pitches P1 and P2 of said first transverse line mark and said second transverse line mark in a manner corresponding to a resolving power (accuracy) of correction values within said detection range.

4. The apparatus according to claim 3, wherein said correction mark formation unit forms a plurality of mixed color transverse line mark trains having different line widths L corresponding to said detection range and having different pitch differences $\Delta P$ corresponding to said resolving power, in the direction in which said moving member moves.

5. The apparatus according to claim 4, wherein said correction mark formation unit forms iteratively said mixed color mark trains in the direction in which said moving member moves.

6. The apparatus according to claim 3, wherein when the pitch P2 of said second transverse line mark is larger than the pitch P1 of said first transverse line mark, said correction mark formation unit defines a number N2 of marks of said second transverse line mark as $$N2 = (\text{line width } L)/\text{pitch difference } \Delta P) \times 2 = 1$$

and a number N1 of marks of said first transverse line mark as $$N1 = N2 + 1.$$

7. The apparatus according to claim 1, wherein said correction mark formation unit forms a mixed color slanted line mark train by superposing a first slanted line mark of one of two colors and a second slanted line mark of the other of said two colors on each other so as to have the same line width L in a moving direction but have different respective pitches P1 and P2 in the moving direction with offsets therebetween.

8. The apparatus according to claim 7, wherein said correction mark formation unit defines the line width L of said first slanted line mark and said second slanted line mark in a manner corresponding to a detection range of image offset correction values which are calculated by said correction value calculation unit, and wherein said correction mark formation unit defines a difference ΔP between the pitches P1 and P2 of said first slanted line mark and said second slanted line mark in a manner corresponding to a resolving power of correction values within said detection range.

9. The apparatus according to claim 8, wherein said correction mark formation unit forms a plurality of mixed color slanted line mark trains having different line widths L corresponding to said detection range and having different pitch differences ΔP corresponding to said resolving power, in the direction in which said moving member moves.

10. The apparatus according to claim 8, wherein when the pitch P2 of said second slanted line mark is larger than the pitch P1 of said first slanted line mark, said correction mark formation unit defines a number N2 of marks of said second slanted line mark as $$N2=(\text{line width } L)/(\text{pitch difference } \Delta P) \times 2 + 1$$

and a number N1 of marks of said first slanted line mark as $$N1=N2+1.$$

11. The apparatus according to claim 1, wherein said correction mark formation unit forms as said mixed color slanted line mark trains a first mixed color slanted line mark train consisting of a plurality of slanted line marks which traverse substantially diagonally the direction in which said moving member moves, and a second mixed color slanted line mark train consisting of a plurality of slanted line marks which traverse diagonally reversely to said marks of said first mixed color slanted line mark train, said first and second mixed color slanted line mark trains being juxtaposed in the direction of movement of said moving member.

12. The apparatus according to claim 1, wherein said correction mark formation unit forms as said mixed color slanted line mark trains a first mixed color slanted line mark train consisting of a plurality of slanted line marks which traverse substantially diagonally the direction in which said moving member moves, and a second mixed color slanted line mark train consisting of a plurality of slanted line marks which traverse diagonally reversely to said marks of said first mixed color slanted line mark train, said first and second mixed color slanted line mark trains being juxtaposed in the direction substantially orthogonal to the direction of movement of said moving member.

13. The apparatus according to claim 1, wherein said moving member is in the form of an endless belt and wherein said correction mark formation unit forms said mixed color mark trains a number of times over the circumferential length of said endless belt.

14. The apparatus according to claim 1, wherein said correction value calculation unit calculates, as a correction value for an image offset between color images, a correction value ΔY for an image offset in a vertical scanning direction which in coincident with the direction of movement of said moving member.

15. The apparatus according to claim 1, wherein said correction value calculation unit calculates, as a correction value for an image offset between color images, a correction value ΔX for an image offset in a horizontal scanning direction substantially orthogonal to the direction of movement of said moving member.

16. The apparatus according to claim 15, wherein said correction value calculation unit calculates said correction value ΔX for an image offset in the horizontal scanning direction, on the basis of the phases of lightness patterns of said mixed color transverse line mark train and said mixed color slanted line mark train.

17. The apparatus according to claim 16, wherein said correction value calculation unit subtracts an image offset Ab in the vertical scanning direction acquired from the lightness pattern phases of said mixed color transverse line mark train having large and small pitches, from a combined image offset Ad in the horizontal and vertical scanning directions acquired from the lightness pattern phases of said mixed color transverse line mark train having large and small pitches, said correction value calculation unit further adding to the difference an image offset Ae in the horizontal scanning direction acquired from said mixed color slanted line mark train having a different inclination and a small pitch, to calculate a correction value ΔX for an image offset in the horizontal scanning direction.

18. The apparatus according to claim 1, wherein said correction value calculation unit calculates, as a correction value for an image offset between color images, a correction value ΔZ for an image offset in a skew direction relative to the horizontal scanning direction substantially orthogonal to the direction of movement of said moving member.

19. An apparatus for forming images on record paper, comprising:
  a moving member with record paper adhered thereon, conveyed at a certain speed;
  a plurality of image carrying units arranged in a record paper conveyance direction, for forming latent images in conformity with image data through optical scanning on a photosensitive drum, developing the latent images with different developing vessels and transferring the latent images onto record paper lying on said moving member;
  a correction mark formation unit for forming and transferring mixed color mark trains onto said moving member by means of said plurality of image carrying units, said mixed color mark trains serving as marks for correcting image offsets between color images, said mixed color mark trains each consisting of a plurality of marks which are superposed on each other in an offset manner;
  a correction value calculation unit for detecting a lightness pattern of said mixed color mark trains transferred onto said moving member, to calculate correction values for image offsets between color images from the phase of said lightness pattern; and
  a correction unit for automatically correcting offsets between color images on the basis of said correction values wherein
  said correction mark formation unit transfers, onto said moving member, respective mixed color mark trains of black and cyan, black and magenta, and black and yellow; and wherein
  said correction value calculation unit detects lightness patterns of said respective mixed color mark trains of said black and cyan, black and magenta, and black and yellow, to figure out respective correction values for image offsets of images of cyan, magenta and yellow relative to a black image from the phases of respective lightness patterns.

20. An apparatus for forming images on record paper, comprising:
  a moving member with record paper adhered thereon, conveyed at a certain speed;

a plurality of image carrying units arranged in a record paper conveyance direction, for forming latent images in conformity with image data through optical scanning on a photosensitive drum, developing the latent images with different developing vessels and transferring the latent images onto record paper lying on said moving member;

a correction mark formation unit for forming and transferring mixed color mark trains onto said moving member by means of said plurality of image carrying units, said mixed color mark trains serving as marks for correcting image offsets between color images, said mixed color mark trains each consisting of a plurality of marks which are superposed on each other in an offset manner;

a correction value calculation unit for detecting a lightness pattern of said mixed color mark trains transferred onto said moving member, to calculate correction values for image offsets between color images from the phase of said lightness pattern; and a correction unit for automatically correcting offsets between color images on the basis of said correction values wherein said correction mark formation unit transfers iteratively said mixed color mark trains onto said moving member over a plurality of cycles; and wherein said correction value calculation unit calculates correction values for image offsets from said mixed color marks trains transferred over a plurality of cycles, said correction value calculation unit calculates effective values from said calculated correction values, said correction value calculation unit judging effective values among a plurality of correction values, to find a final correction value from an average value of said effective values.

21. The apparatus according to claim 20, wherein said correction mark formation unit forms, as said mixed color mark trains, a mixed color transverse line mark train consisting of a plurality of transverse line marks substantially orthogonal to the direction of movement of said moving member, and a mixed color slanted line mark train consisting of a plurality of slanted line marks which traverse substantially diagonally the direction of movement of said moving member, said correction mark formation unit transferring said mixed color transverse line mark train for each of said plurality of substantially orthogonal and substantially diagonal line marks onto said moving member over a plurality of cycles with a respective position shift for each cycle.

22. An apparatus for forming images on record paper, comprising:

a moving member with record paper adhered thereon, conveyed at a certain speed;

a plurality of image carrying units arranged in the record paper conveyance direction, for forming latent images in conformity with image data through optical scanning on a photosensitive drum, developing the latent images with different developing vessels and transferring the latent images onto record paper lying on said moving member;

a correction mark formation unit for transferring mixed color mark trains onto said moving member by means of said plurality of image carrying units, said mixed color mark trains serving as marks for correcting image offsets between color images, said mixed color mark trains each consisting of a plurality of marks which are superposed on each other in an offset manner such that the foremost amount of offset is equal to the endmost amount of offset;

a correction value calculation unit for detecting a lightness pattern of said mixed color mark trains transferred onto said moving member, to calculate correction values for image offsets between color images from the phase of said lightness pattern; and a correction unit for automatically correcting offsets between color images on the basis of said correction values.

23. An apparatus according to claim 22, wherein said correction value calculation unit figures out the transfer of said lightness pattern by use of Fourier transfer.

24. An apparatus for forming images on record paper, comprising:

a moving member with record paper adhered thereon, conveyed at a certain speed;

a plurality of image carrying units arranged in the record paper conveyance direction, for forming latent images in conformity with image data through optical scanning on a photosensitive drum, developing the latent images with different developing vessels and transferring the latent images onto record paper lying on said moving member;

a correction mark formation unit for transferring mixed color mark trains onto said moving member by means of said plurality of image carrying units, said mixed color mark trains serving as marks for correcting image offsets between color images, said mixed color mark trains each consisting of a plurality of marks which are superposed on each other in an offset manner;

a correction value calculation unit for detecting a lightness pattern of said mixed color mark trains transferred onto said moving member, to calculate correction values for image offsets between color images from the phase of said lightness pattern; and a correction unit for automatically correcting offsets between color images on the basis of said correction values; wherein said correction value calculation unit figures out the amount of offset of images from the combination of a lightness pattern of the mixed color mark trains superposed at rough pitches and of a lightness pattern of the mixed color mark trains superposed at fine pitches, said mixed color mark trains being transferred by said correction mark formation unit.

25. An apparatus for forming images on record paper, comprising:

a moving member with record paper adhered thereon, conveyed at a certain speed;

a plurality of image carrying units arranged in the record paper conveyance direction, for forming latent images in conformity with image data through optical scanning on a photosensitive drum, developing the latent images with different developing vessels and transferring the latent images onto record paper lying on said moving member;

a correction mark formation unit for transferring mixed color mark trains onto said moving member by means of said plurality of image carrying units, said mixed color mark trains serving as marks for correcting image offsets between color images, said mixed color mark trains each consisting of a plurality of marks which are superposed on each other in an offset manner;

a correction value calculation unit for detecting a lightness pattern of said mixed color mark trains transferred onto said moving member, to calculate correction values for image offsets between color images from the phase of said lightness pattern; and a correction unit for automatically correcting offsets between color images on the basis of said correction values; wherein said correction value calculation unit is provided with a sensor using a laser diode as its light source and serving to condense light from said laser diode to a small beam spot, for detecting said mixed color mark trains.

26. An apparatus for forming images on record paper, comprising:

a moving member with record paper adhered thereon, conveyed at a certain speed;

a plurality of image carrying units arranged in the record paper conveyance direction, for forming latent images in conformity with image data through optical scanning on a photosensitive drum, developing the latent images with different developing vessels and transferring the latent images onto record paper lying on said moving member;

a correction mark formation unit for transferring mixed color slanted line mark trains onto said moving member by means of said plurality of image carrying units, said mixed color slanted line mark trains serving as marks for correcting image offsets between color images, said mixed color slanted line mark trains each consisting of a plurality of slanted line marks which traverse substantially diagonally the direction in which said moving member moves and which are superposed on each other in an offset manner;

a correction value calculation unit for detecting a lightness pattern of said mixed color slanted line mark trains transferred onto said moving member, to calculate correction values for image offsets between color images from the phase of said lightness pattern; and a correction unit for automatically correcting offsets between color images on the basis of said correction values.

27. The apparatus according to claim 26, wherein said correction mark formation unit forms said mixed color slanted line mark trains by superposing a first slanted line mark of one of two colors and a second slanted line mark of the other of said two colors on each other so as to have the same line width L in a moving direction but have different respective pitches P1 and P2 in a moving direction with offsets therebetween.

28. An apparatus according to claim 27, wherein said correction mark formation unit defines the line width L of said first slanted line mark and said second slanted line mark in a manner corresponding to a detection range of image offset correction values which are calculated by said correction value calculation unit, and wherein said correction mark formation unit defines a difference $\Delta P$ between the pitches P1 and P2 of said first slanted line mark and said second slanted line mark in a manner corresponding to a resolving power of correction values within said detection range.

29. An apparatus according to claim 28, wherein said correction mark formation unit forms a plurality of mixed color slanted line mark trains having different line widths L corresponding to said detection range and having different pitch differences $\Delta P$ corresponding to said resolving power, in the direction in which said moving member moves.

30. An apparatus according to claim 28, wherein when the pitch P2 of said second slanted line mark is larger than the pitch P1 of said first slanted line mark, said correction mark formation unit defines a number N2 of marks of said second slanted line mark as $$N2=\text{(line width } L\text{)/(pitch difference }\Delta P\text{)}\times 2+1$$

and a number N1 of marks of said first slanted line mark as $$N1=N2+1.$$

31. An apparatus according to claim 26, wherein said correction mark formation unit forms as said mixed color slanted line mark trains a first mixed color slanted line mark train consisting of a plurality of slanted line marks which traverse substantially diagonally the direction in which said moving member moves, and a second mixed color slanted line mark train consisting of a plurality of slanted line marks which traverse diagonally reversely to said marks of said first mixed color slanted line mark train, said first and second mixed color slanted line mark trains being juxtaposed in the direction of movement of said moving member.

32. An apparatus according to claim 26, wherein said correction mark formation unit forms as said mixed color slanted line mark trains a first mixed color slanted line mark train consisting of a plurality of slanted line marks which traverse substantially diagonally the direction in which said moving member moves, and a second mixed color slanted line mark train consisting of a plurality of slanted line marks which traverse diagonally reversely to said marks of said first mixed color slanted line mark train, said first and second mixed color slanted line mark trains being juxtaposed in the direction substantially orthogonal to the direction of movement of said moving member.

33. An apparatus according to claim 26, wherein said moving member is in the form of an endless belt and wherein said correction mark formation unit forms said mixed color slanted mark trains over a length substantially integer times the circumferential length of said endless belt.

34. The apparatus according to claim 26, wherein said correction value calculation unit calculates, as a correction value for an image offset between color images, a correction value $\Delta X$ for an image offset in the horizontal scanning direction substantially orthogonal to the direction of movement of said moving member.

35. The apparatus according to claim 26, wherein said correction mark formation unit transfers, onto said moving member, respective mixed color mark trains of black and cyan, black and magenta, and black and yellow; and wherein said correction value calculation unit detects lightness patterns of said respective mixed color mark trains of said black and cyan, black and magenta, and black and yellow, to figure out respective correction values for image offsets of images of cyan, magenta and yellow relative to a black image from the phases of respective lightness patterns.

36. An apparatus for forming images on record paper, comprising:

a moving member with record paper adhered thereon, conveyed at a certain speed;

a plurality of image carrying units arranged in the record paper conveyance direction, for forming latent images in conformity with image data through optical scanning on a photosensitive drum, developing the latent images with different developing vessels and transferring the latent images onto record paper lying on said moving member;

a correction mark formation unit for transferring mixed color transverse line mark trains onto said moving member by means of said plurality of image carrying units, said mixed color transverse line mark trains serving as marks for correcting image offsets between color images, said mixed color transverse line mark trains each consisting of a plurality of transverse line marks which extend substantially orthogonal to the direction in which said moving member moves, and which are superposed on each other in an offset manner;

a correction value calculation unit for detecting a lightness pattern of said mixed color transverse line mark trains transferred onto said moving member, to calculate correction values for image offsets between color images from the phase of said lightness pattern; and a correction unit for automatically correcting offsets between color images on the basis of said correction values, wherein said correction mark formation unit forms said mixed color transverse line mark trains by superposing a first transverse line of one of two colors and a second transverse line of the other of said two colors on each other so as to have the same line width L in a moving direction but have different respective pitch P1 and P2 in the moving direction with offsets therebetween.

37. An apparatus for forming images on record paper, comprising:

a moving member with record paper adhered thereon, conveyed at a certain speed;

a plurality of image carrying units arranged in the record paper conveyance direction, for forming latent images in conformity with image data through optical scanning on a photosensitive drum, developing the latent images with different developing vessels and transferring the latent images onto record paper lying on said moving member;

a correction mark formation unit for transferring mixed color transverse line mark trains onto said moving member by means of said plurality of image carrying units, said mixed color transverse line mark trains serving as marks for correcting image offsets between color images, said mixed color transverse line mark trains each consisting of a plurality of transverse line marks which extend substantially orthogonal to the direction in which said moving member moves and which are superposed on each other in an offset manner;

a correction value calculation unit for detecting a lightness pattern of said mixed color transverse line mark trains transferred onto said moving member, to calculate correction values for image offsets between color images from the phase of said lightness pattern; and a correction unit for automatically correcting offsets between color images on the basis of said correction values, wherein said moving member is in the form of an endless belt and wherein said correction mark formation unit forms said mixed color transverse line mark trains over a length substantially integer times the circumferential length of said endless belt.

38. An apparatus according to claim 37, wherein said correction value calculation unit calculates, as a correction value for an image offset between color images, a correction value $\Delta Y$ for an image offset in the vertical scanning direction which is coincident with the direction of movement of said moving member.

39. An apparatus for forming images on record paper, comprising:

a moving member with record paper adhered thereon, conveyed at a certain speed;

a plurality of image carrying units arranged in the record paper conveyance direction, for forming latent images in conformity with image data through optical scanning on a photosensitive drum, developing the latent images with different developing vessels and transferring the latent images onto record paper lying on said moving member;

a correction mark formation unit for transferring mixed color transverse line mark trains onto said moving member by means of said plurality of image carrying units, said mixed color transverse line mark trains serving as marks for correcting image offsets between color images, said mixed color transverse line mark trains each consisting of a plurality of transverse line marks which extend substantially orthogonal to the direction in which said moving member moves and which are superposed on each other in an offset manner;

a correction value calculation unit for detecting a lightness pattern of said mixed color transverse line mark trains transferred onto said moving member, to calculate correction values for image offsets between color images from the phase of said lightness pattern; and a correction unit for automatically correcting offsets between color images on the basis of said correction values, wherein said correction value calculation unit calculates, as a correction value for an image offset between color images, a correction value $\Delta Z$ for an image offset in a skew direction relative to the horizontal scanning direction substantially orthogonal to the direction of movement of said moving member.

* * * * *